Figure 1:
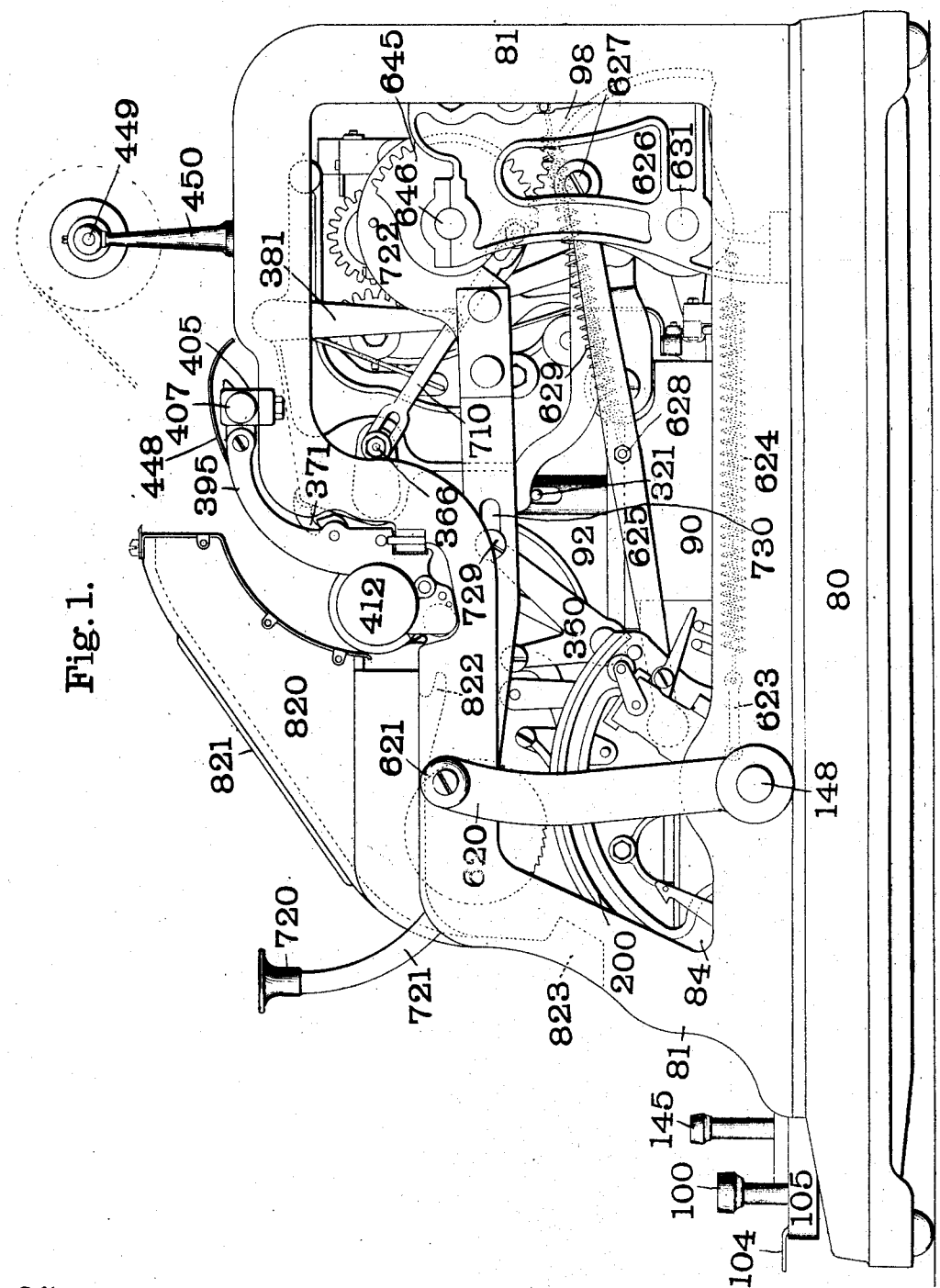

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 1.

Witnesses
W. H. Alexander
Fred Henke

Inventors
G. N. Hinchman
Henry Schroeder
By Attorneys
Fowler & Bryson

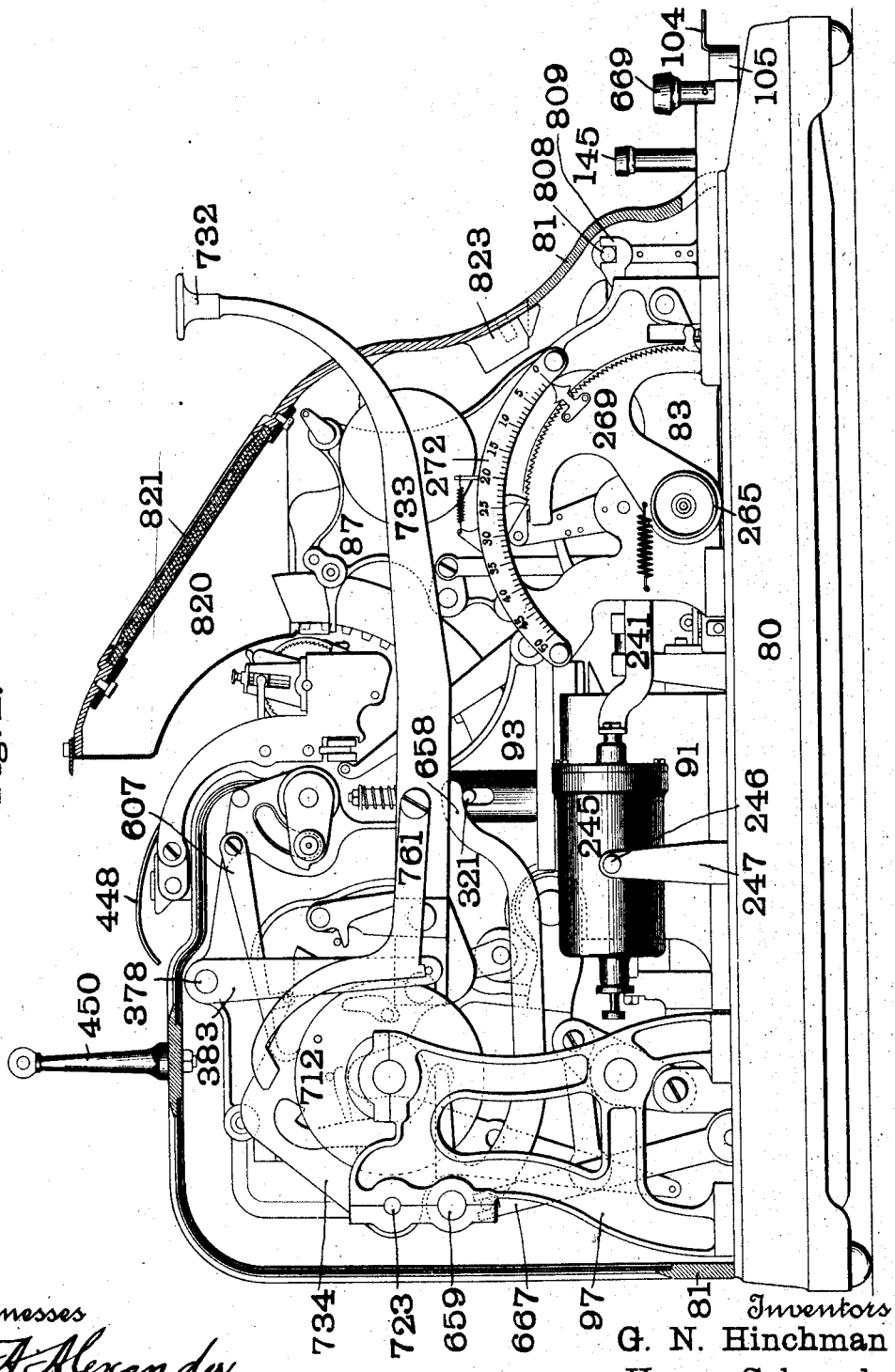

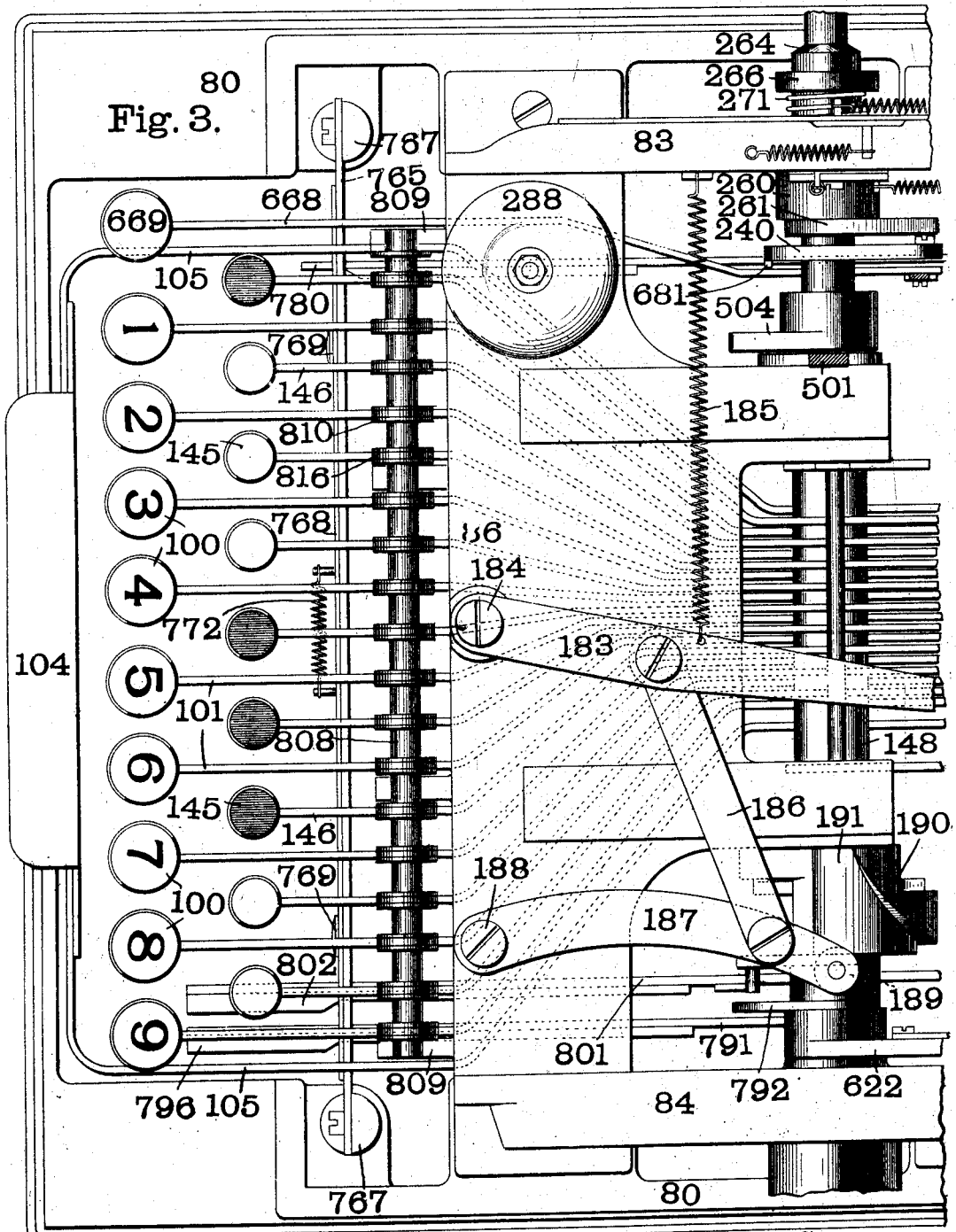

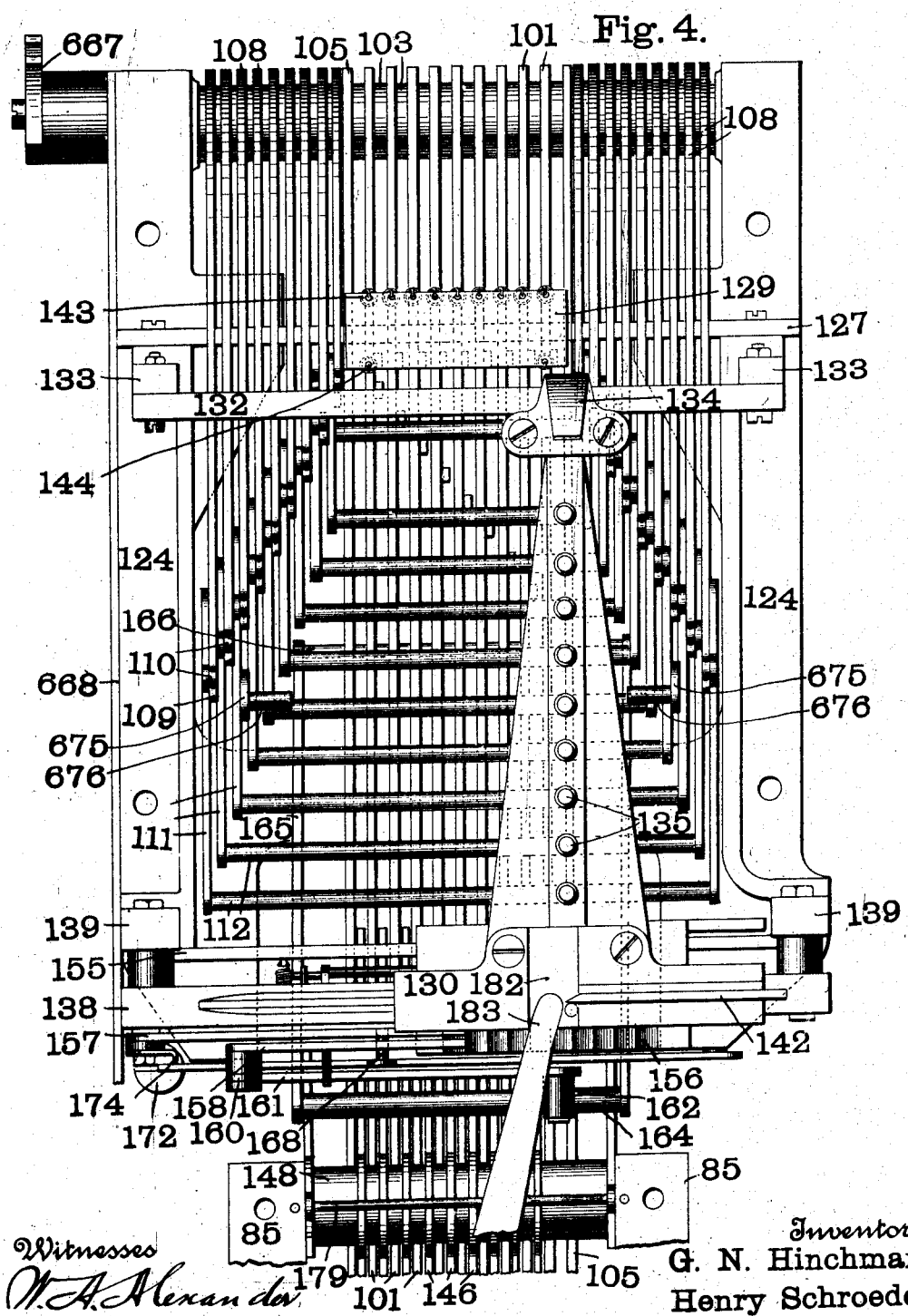

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 5.

No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 6.
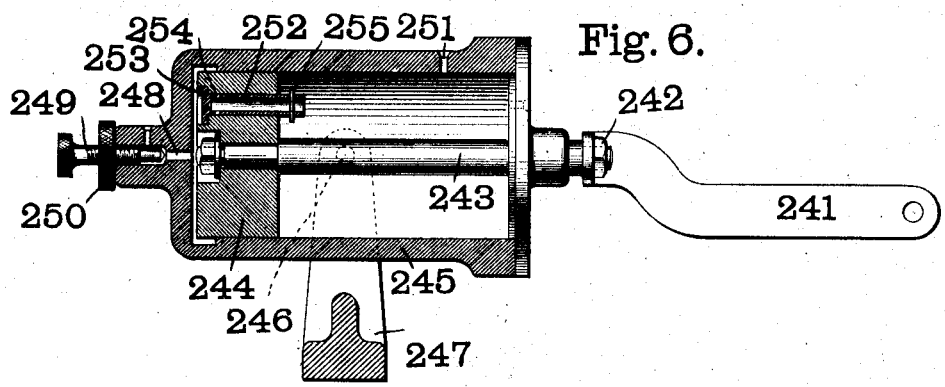
Fig. 6.
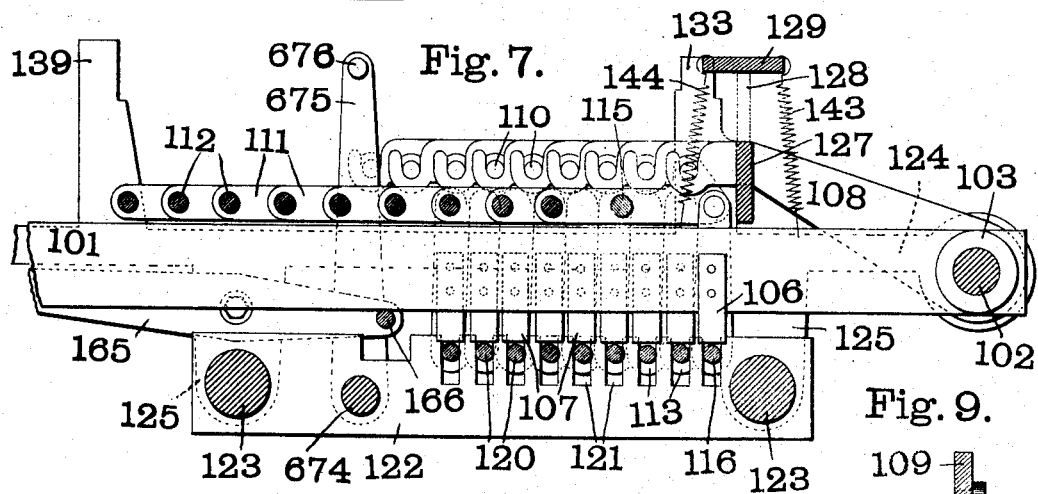
Fig. 7.
Fig. 9.
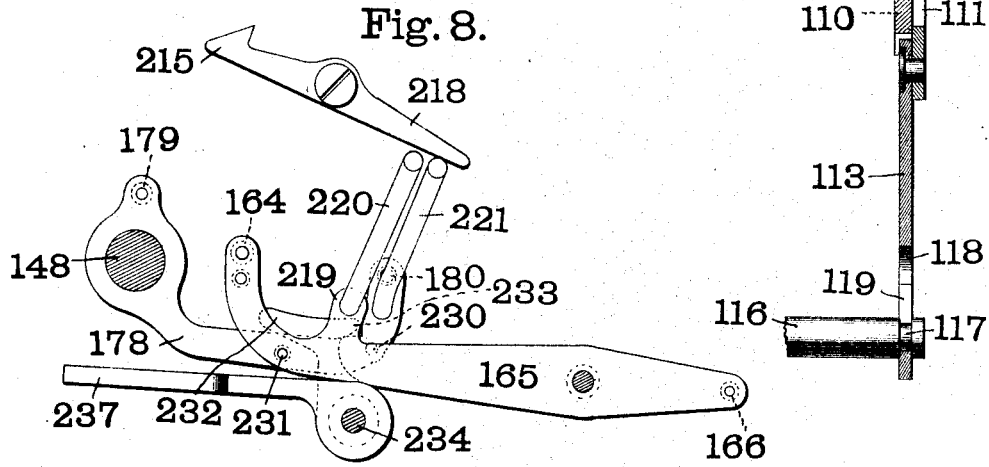
Fig. 8.
Witnesses
W. A. Alexander
Fred Henke
Inventors
G. N. Hinchman
Henry Schroeder
By Attorneys
Fowler & Bryson

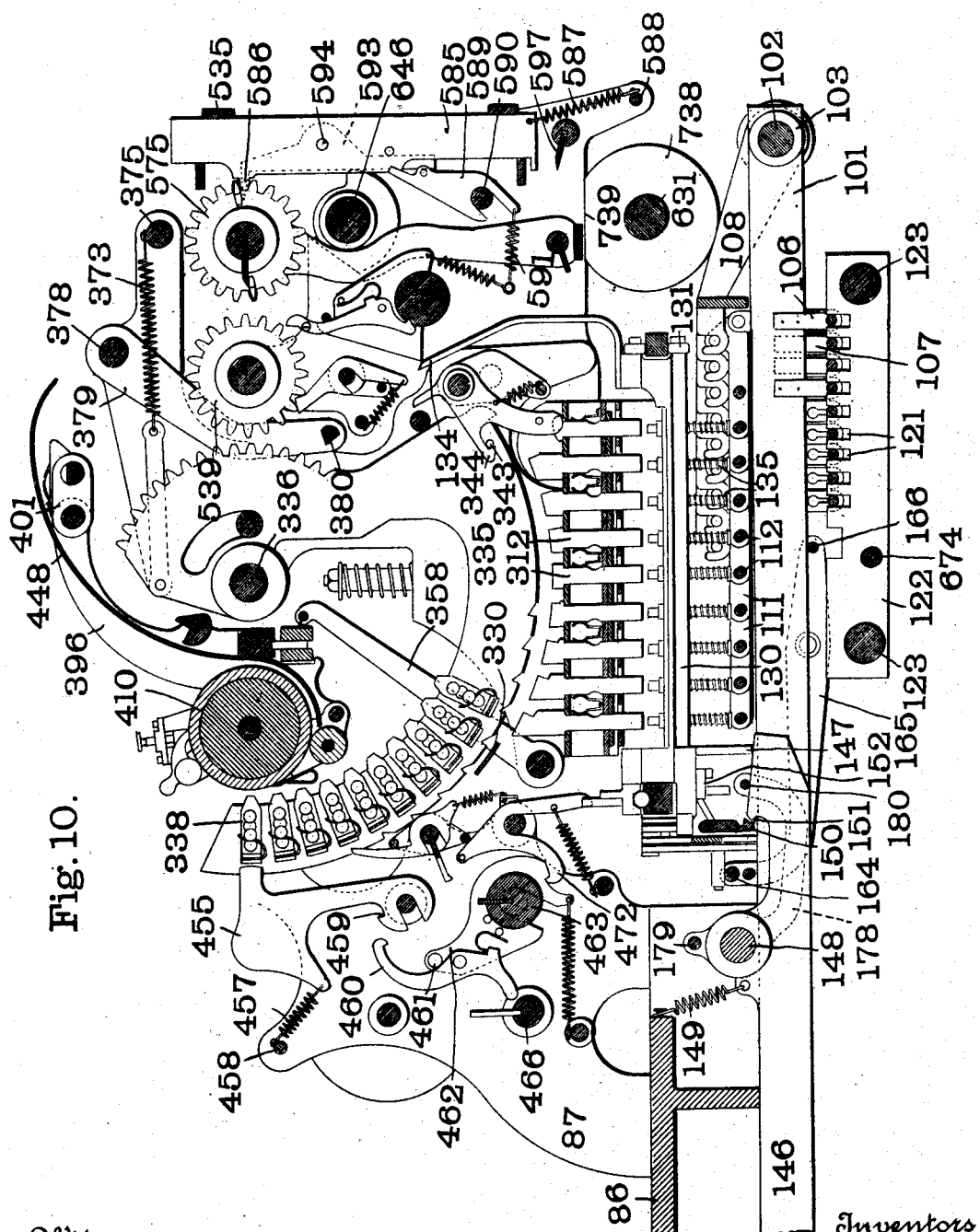

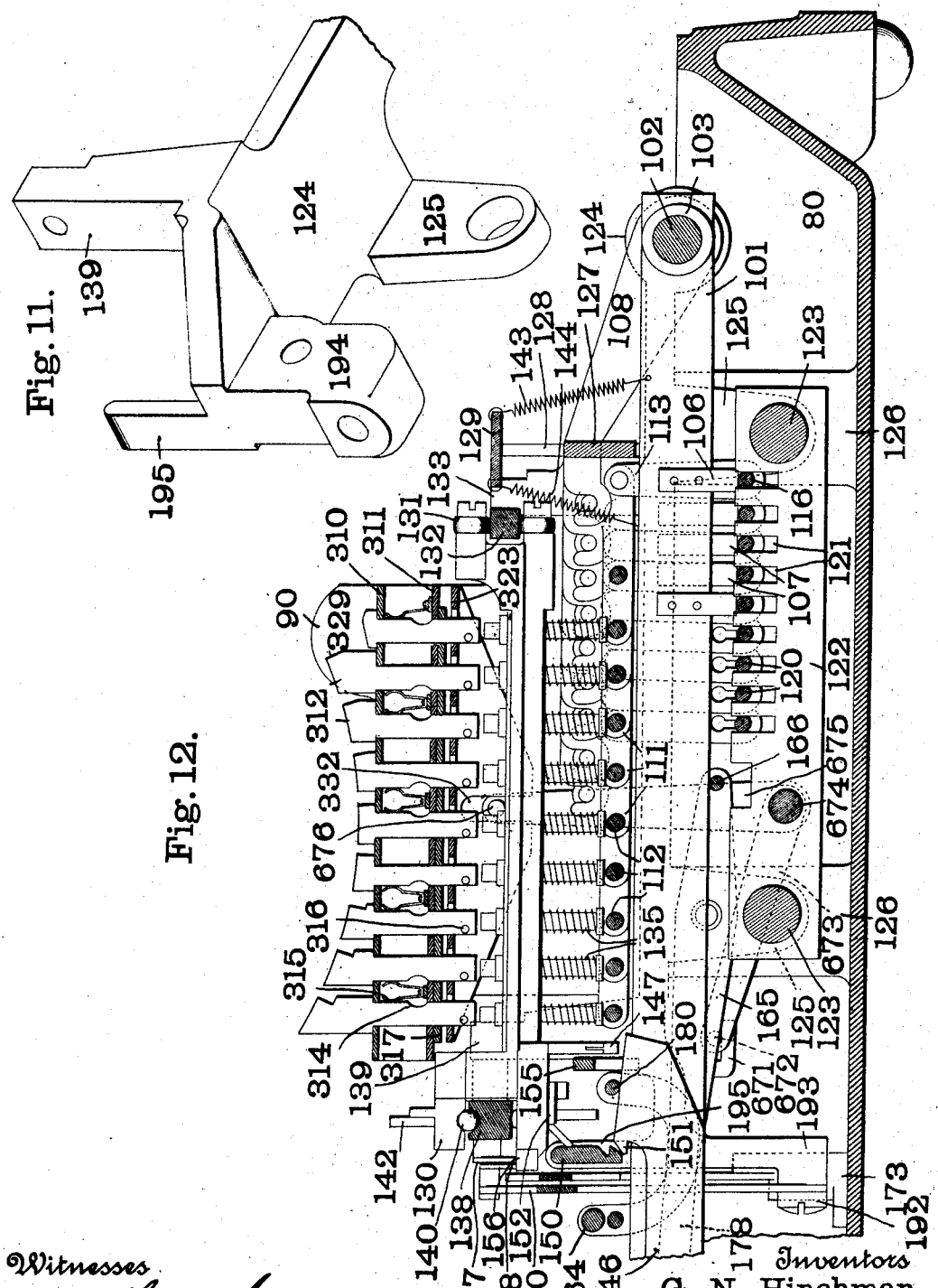

No. 811,920.  
PATENTED FEB. 6, 1906.  
G. N. HINCHMAN & H. SCHROEDER.  
ADDING MACHINE.  
APPLICATION FILED JAN. 25, 1904.

29 SHEETS—SHEET 9.

Witnesses  
W. A. Alexander  
Fred Henke

Inventors  
G. N. Hinchman  
Henry Schroeder  
By Attorneys

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 10.

Witnesses
W. A. Alexander
Fred Henke

Inventors
G. N. Hinchman
Henry Schroeder
By Attorneys

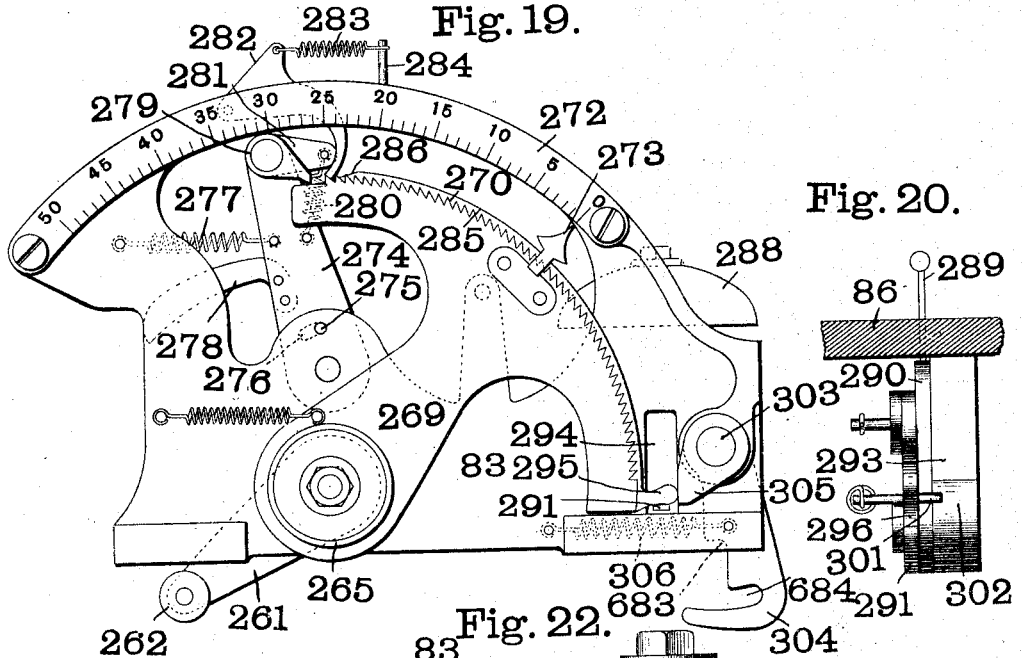

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 12.

Witnesses
W. A. Alexander
Fred Henke

Inventors
G. N. Hinchman
Henry Schroeder
By Attorneys
Fowler & Bryson

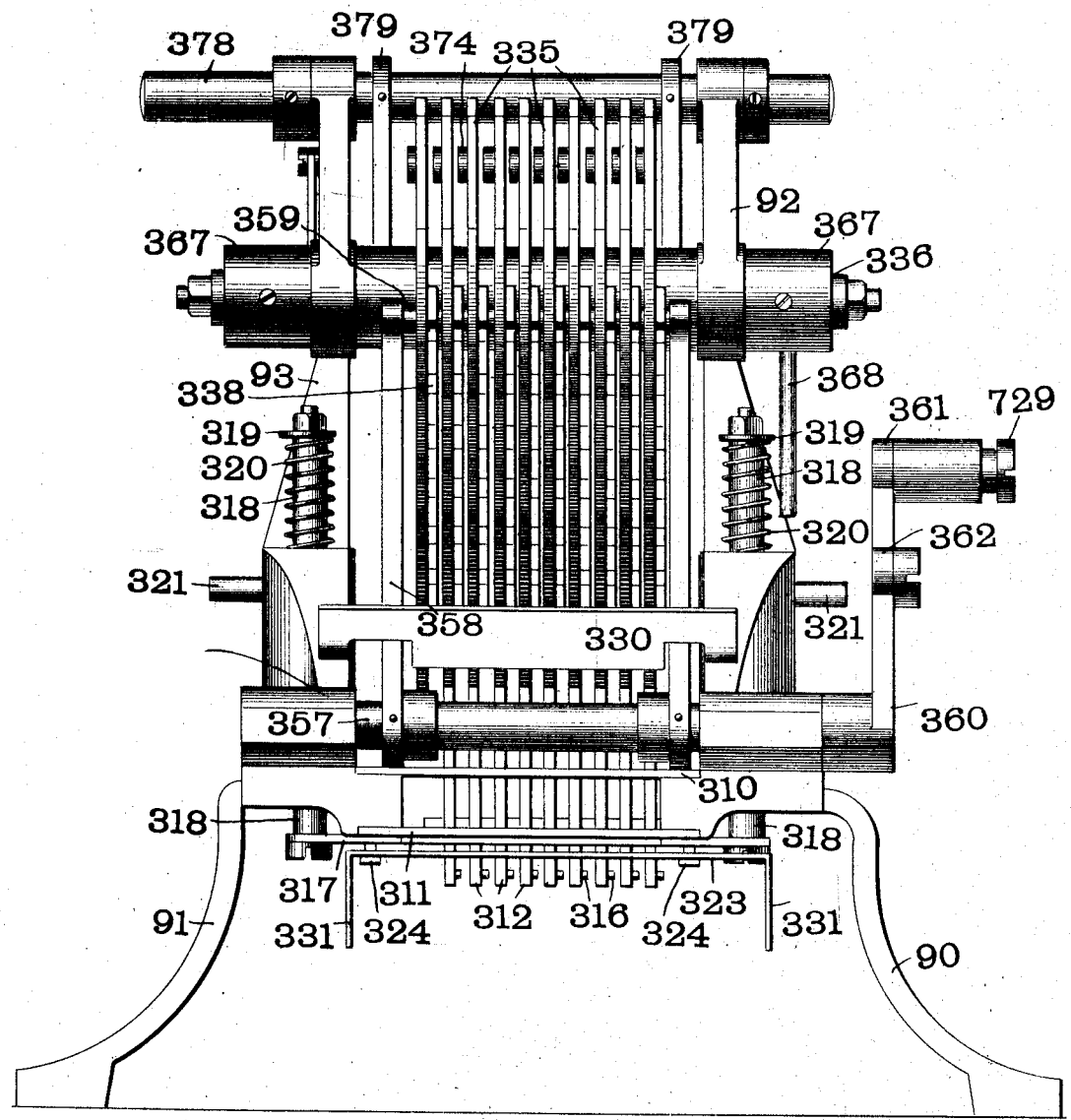

No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 14.
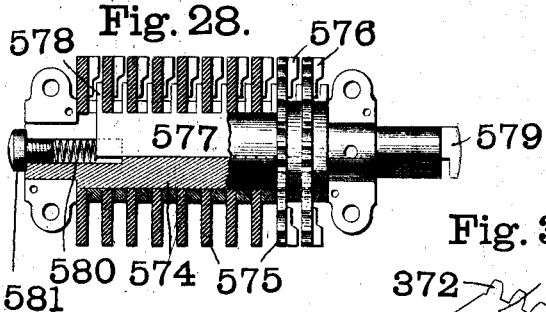
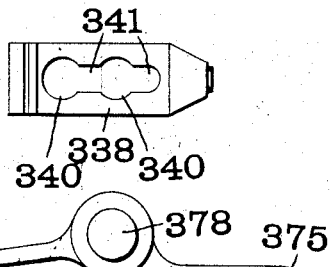
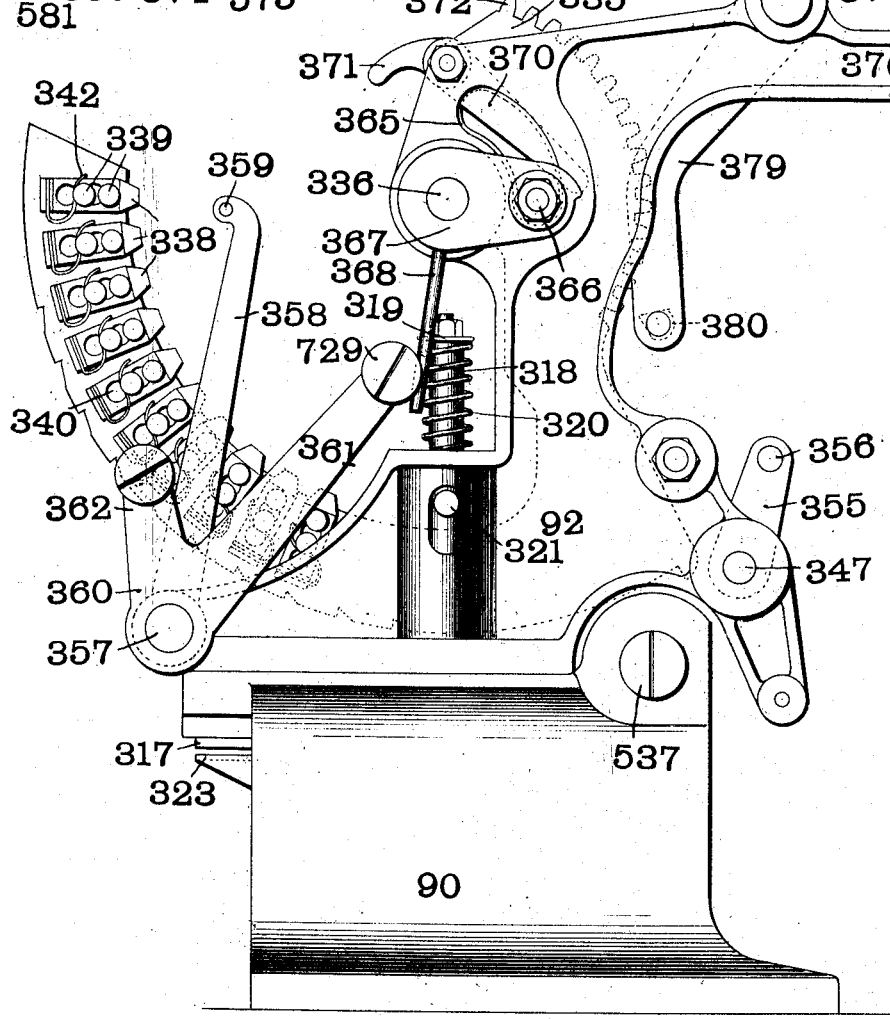

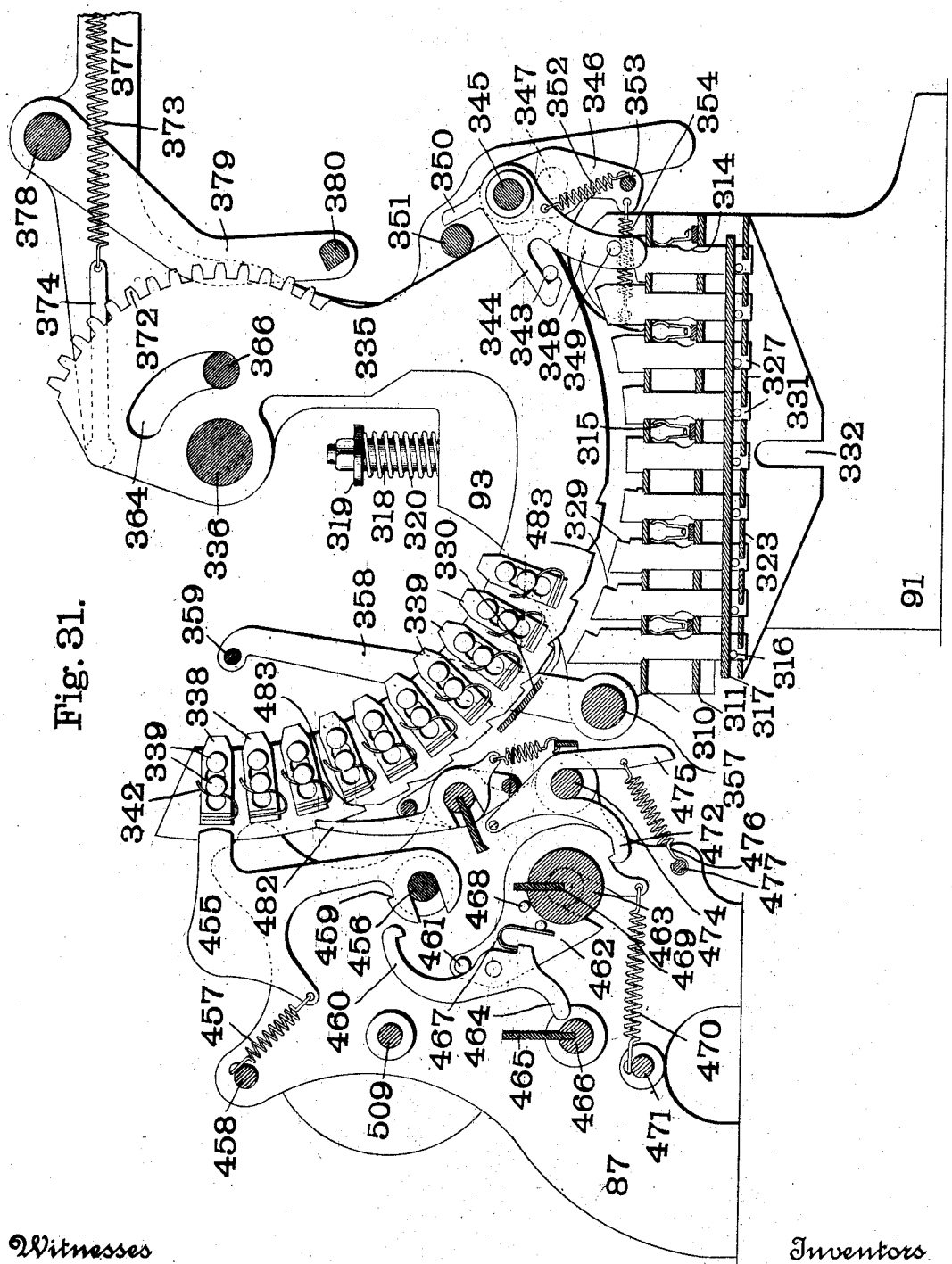

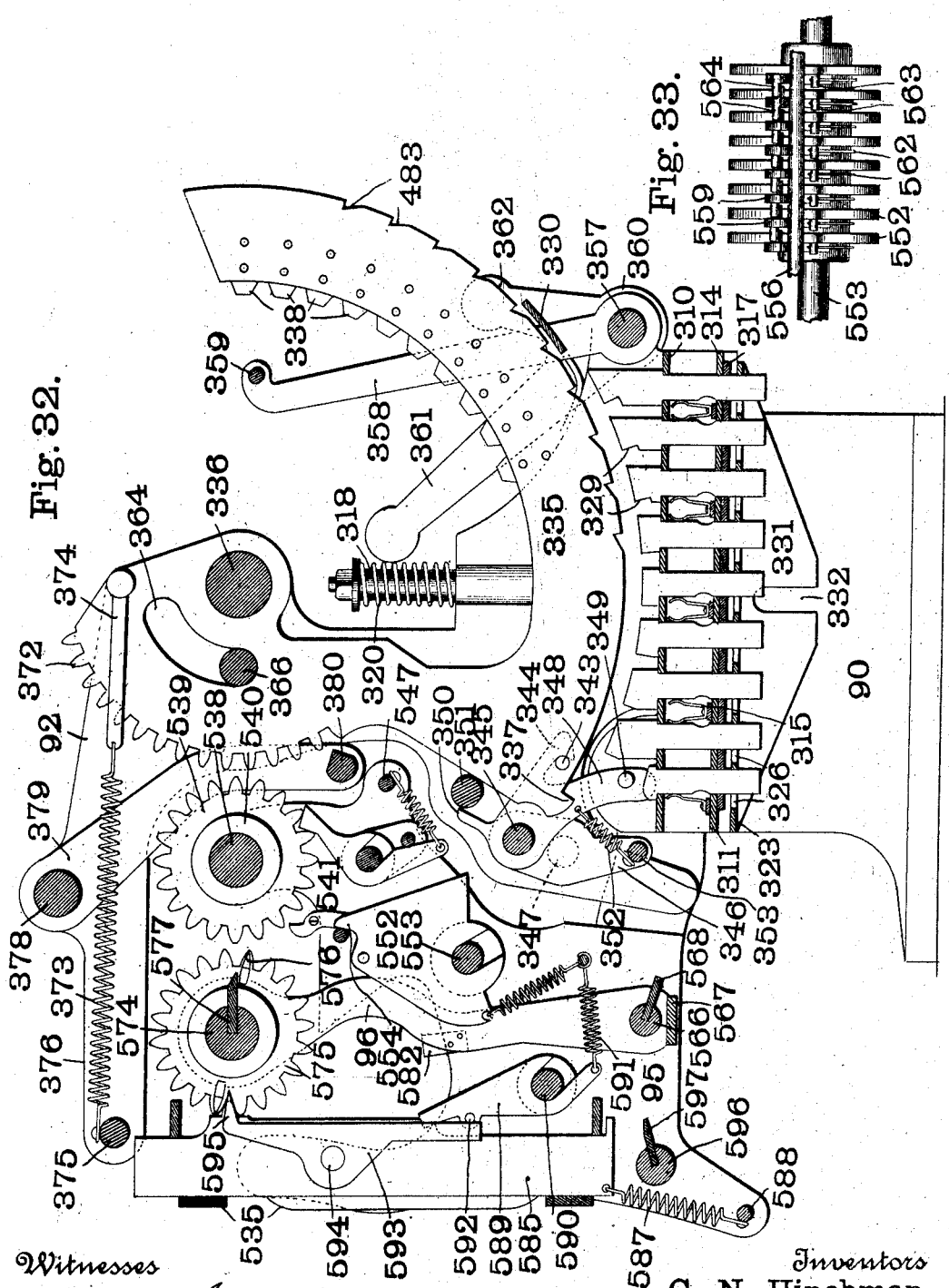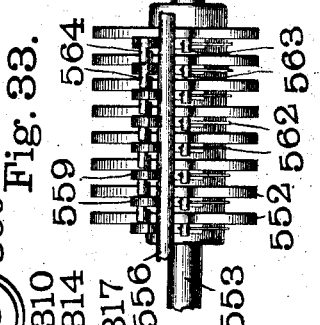

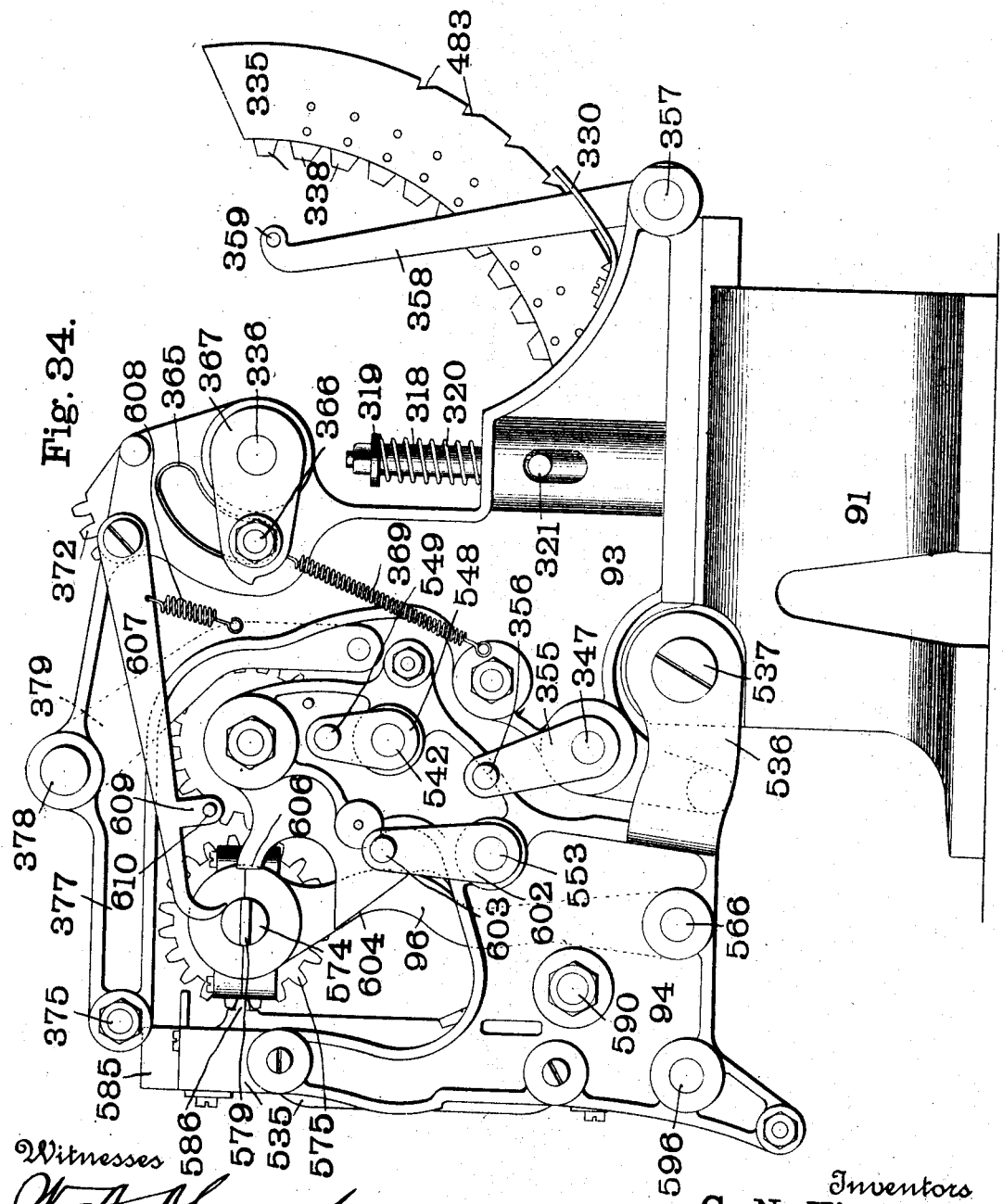

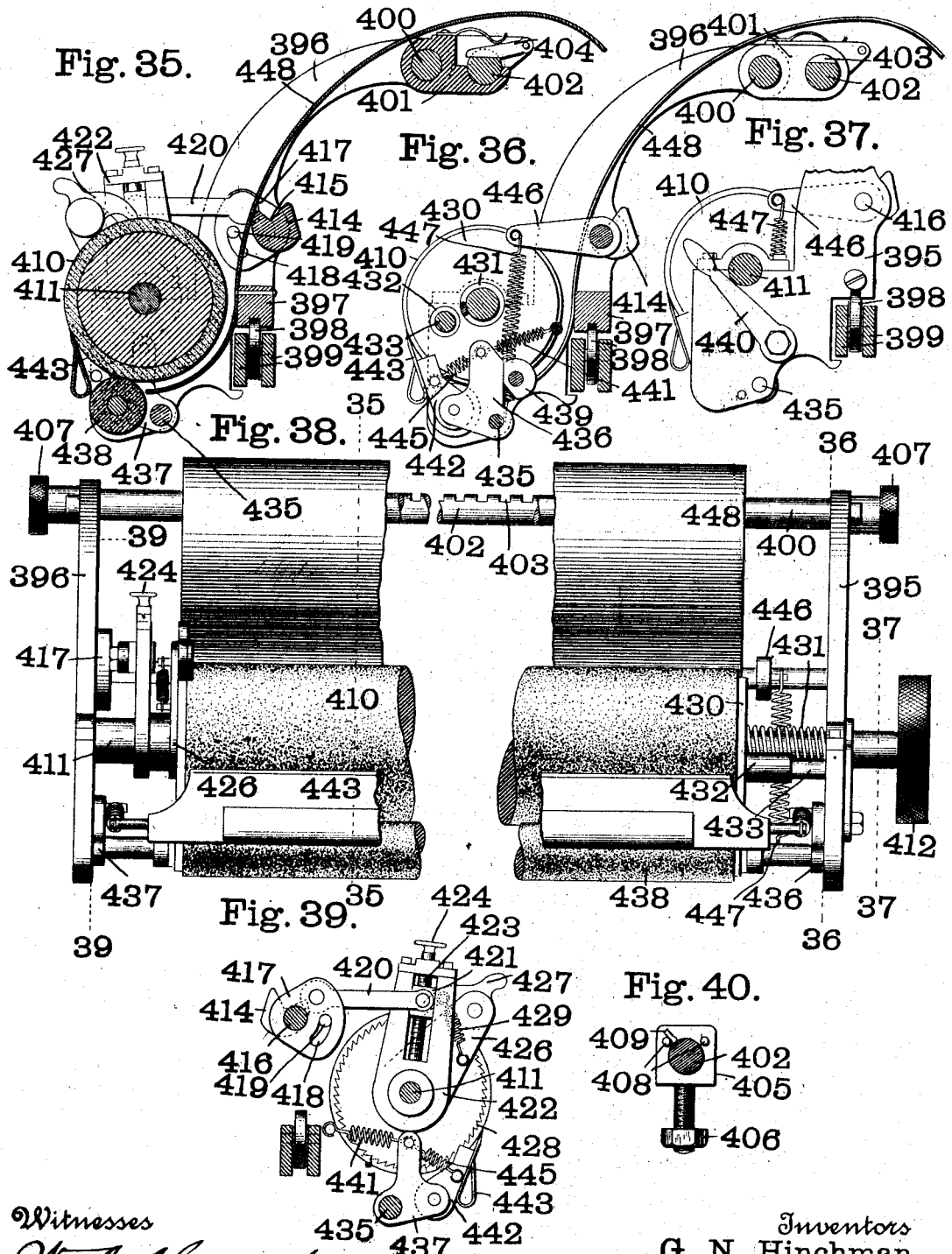

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 19.

Witnesses
W. A. Alexander
Fred Henke

Inventors
G. N. Hinchman
Henry Schroeder
By Attorneys
Fowler & Bryson

No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 20.
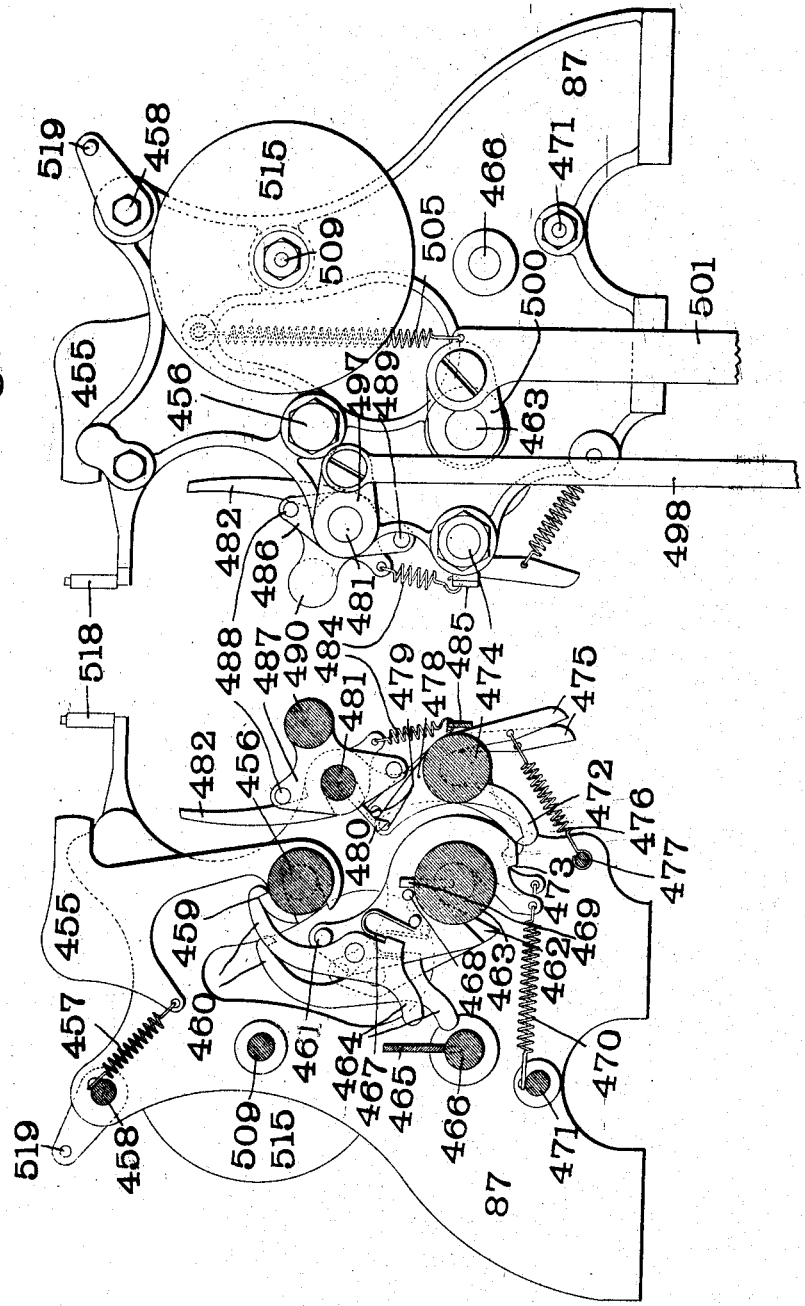
Witnesses
W. A. Alexander
Fred Henke
Inventors
G. N. Hinchman
Henry Schroeder
By Attorneys No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 21.
Fig. 45.
Fig. 46.
Fig. 47.
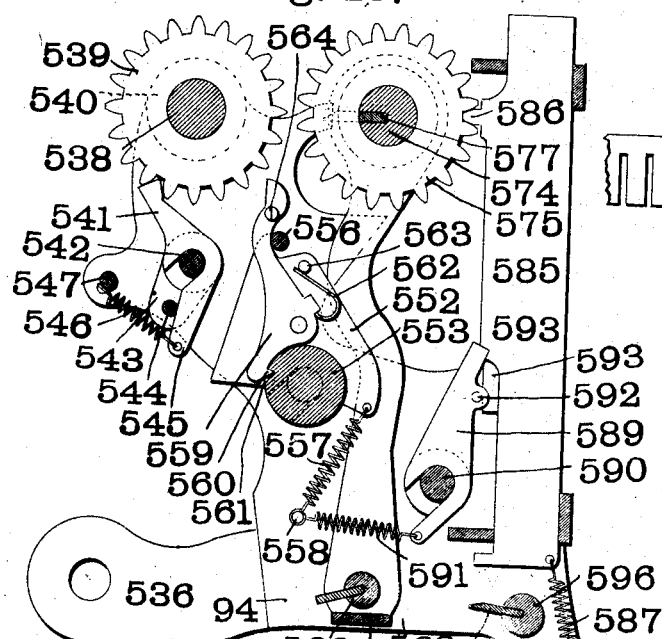
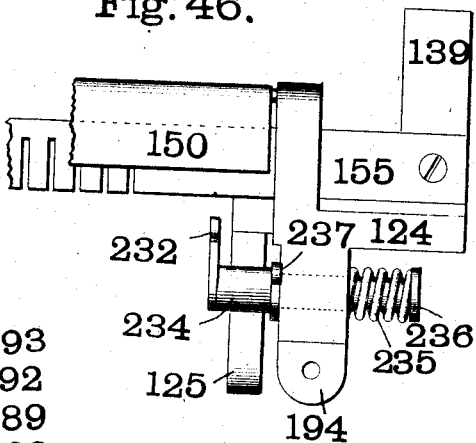
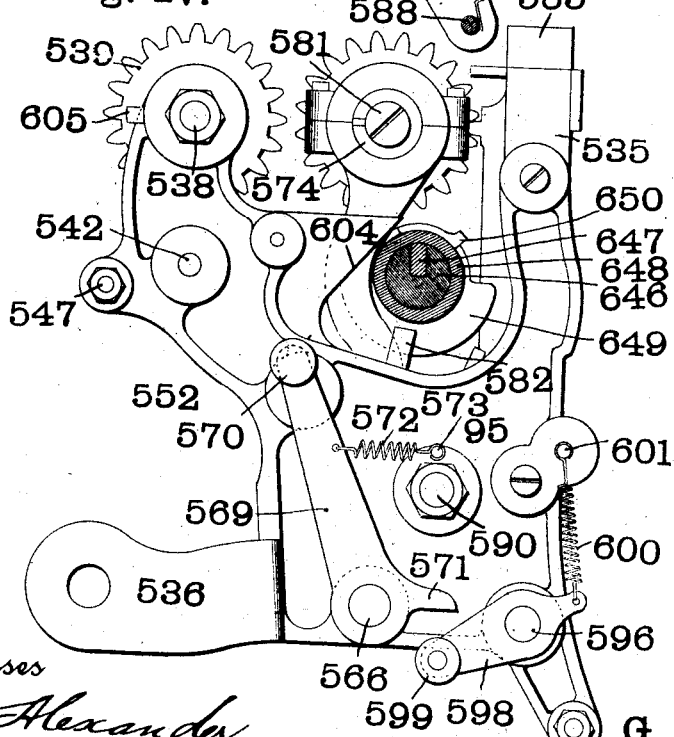
Witnesses
W. A. Alexander
Fred Henke
Inventors
G. N. Hinchman
Henry Schroeder
By Attorneys No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 22.
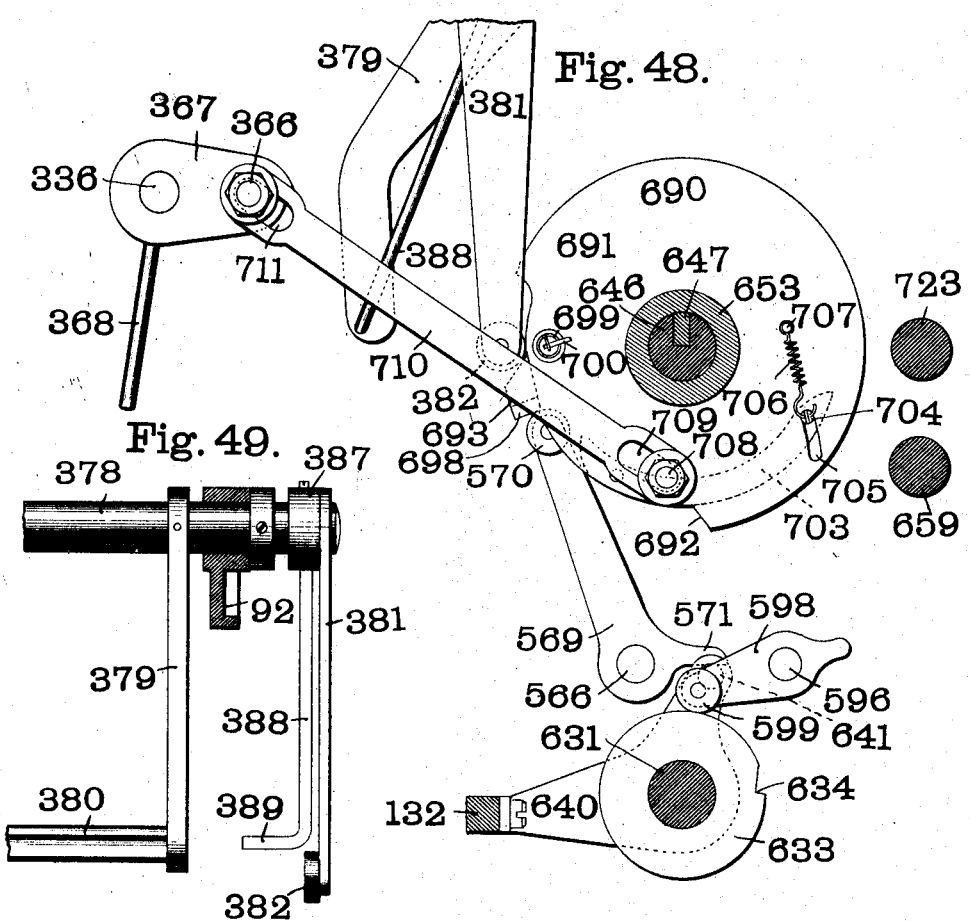
Fig. 48.
Fig. 49.
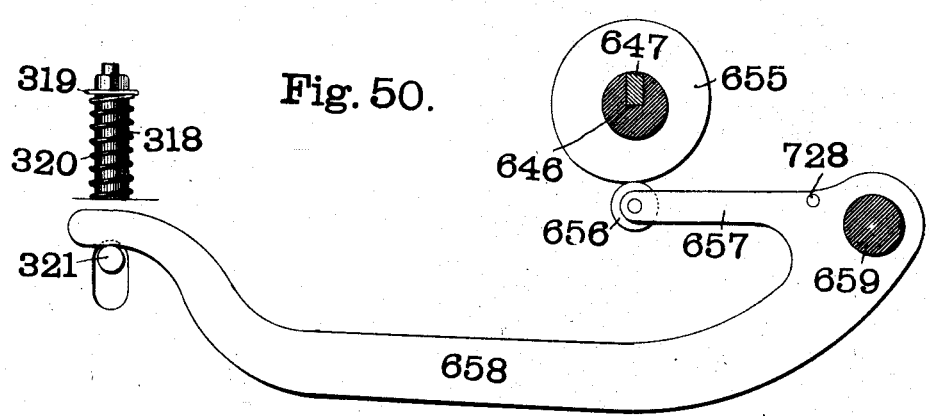
Fig. 50.
Witnesses
W. H. Alexander
Fred Henke
Inventors
G. N. Hinchman
Henry Schroeder
By Attorneys
Fowler & Thompson No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 23.
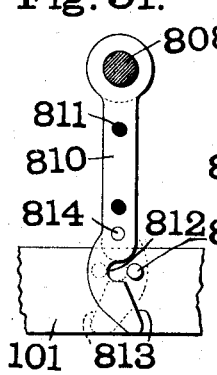
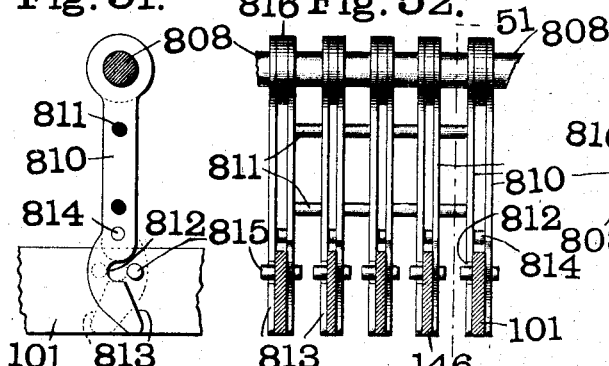
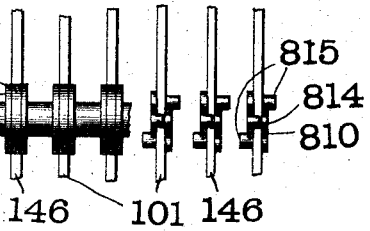
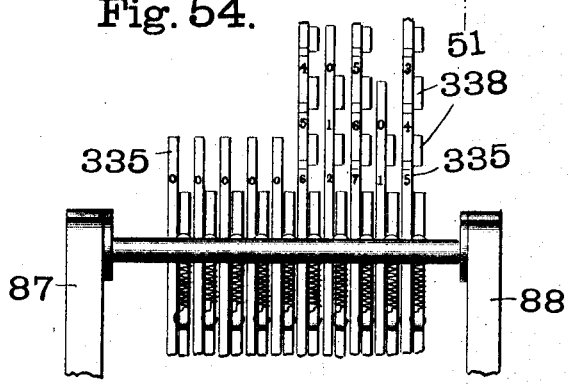
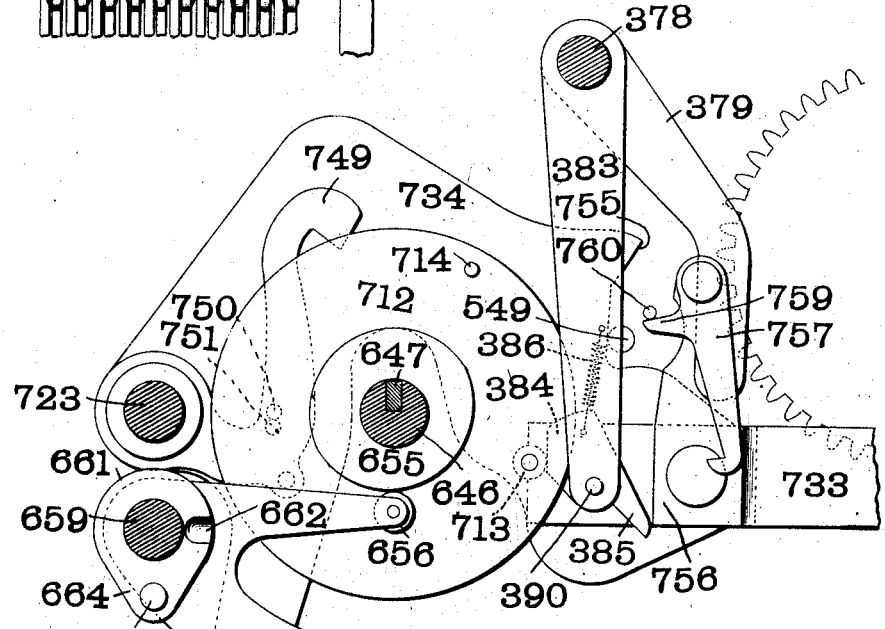

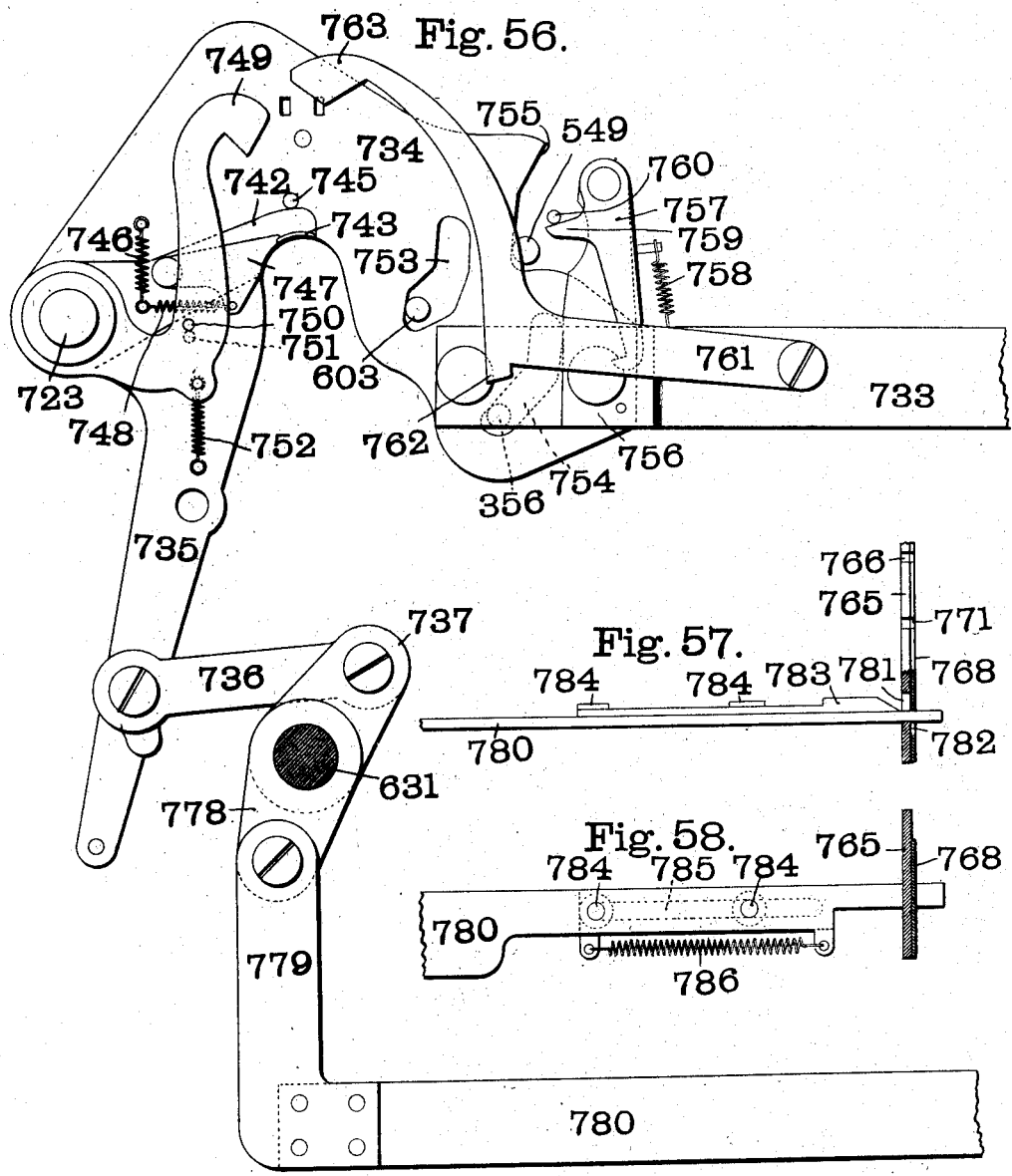

No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 25.
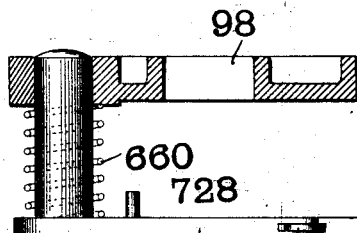
Fig. 59.
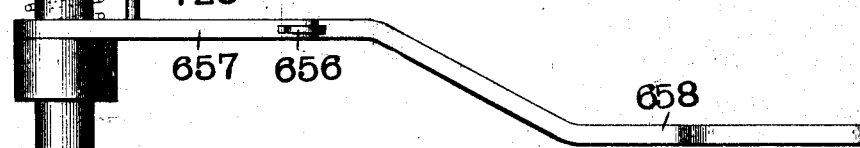
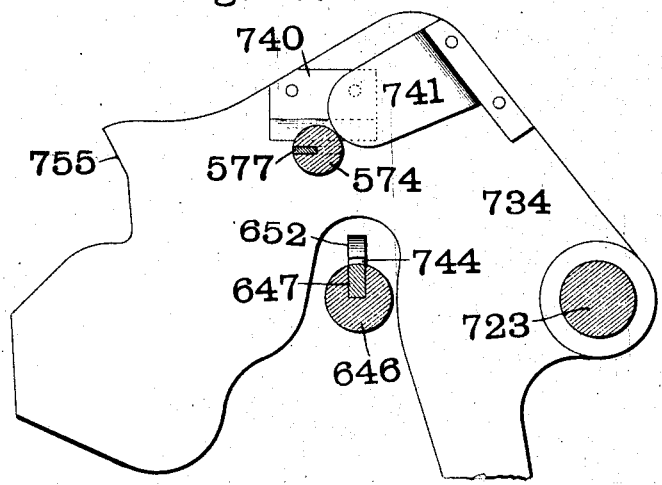
Fig. 60.
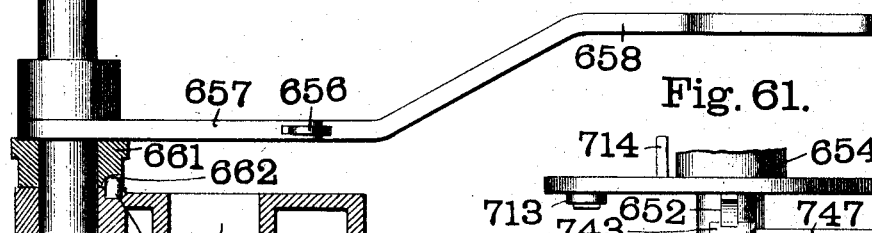
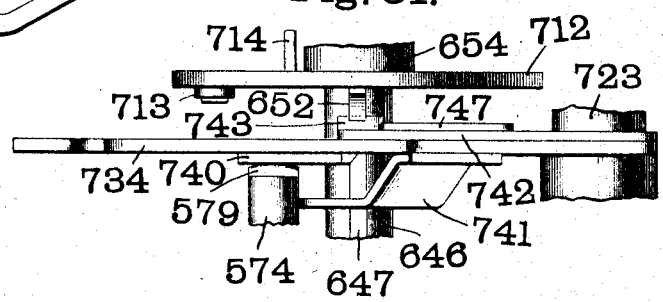
Fig. 61.
Witnesses
W. A. Alexander
Fred Henkel
Inventors
G. N. Hinchman
Henry Schroeder
By Attorneys
Fowler & Bryson No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 26.

Witnesses
W. A. Alexander
Fred Henke

Inventors
G. N. Hinchman
Henry Schroeder
By Attorneys
Fowler & Bryson

No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 27.

Witnesses
W. H. Alexander
Fred Hinkle

Inventors
G. N. Hinchman
Henry Schroeder
By Attorneys
Fowler & Bryson

No. 811,920. PATENTED FEB. 6, 1906.
G. N. HINCHMAN & H. SCHROEDER.
ADDING MACHINE.
APPLICATION FILED JAN. 25, 1904.
29 SHEETS—SHEET 28.
Fig. 71. Fig. 72. Fig. 73. Fig. 74. Fig. 75.
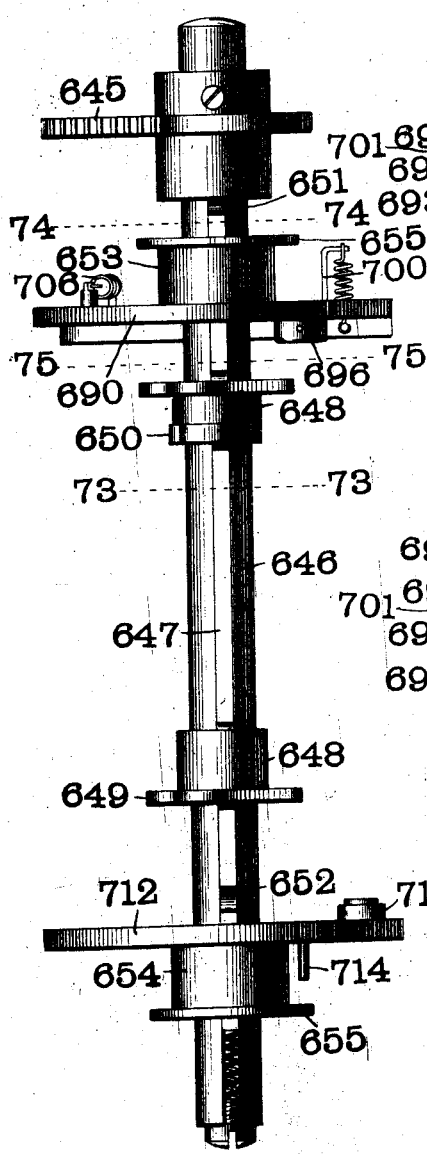
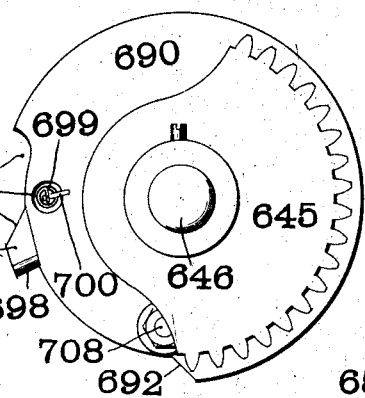
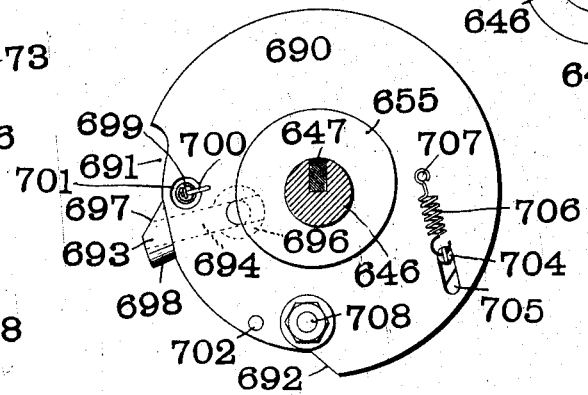
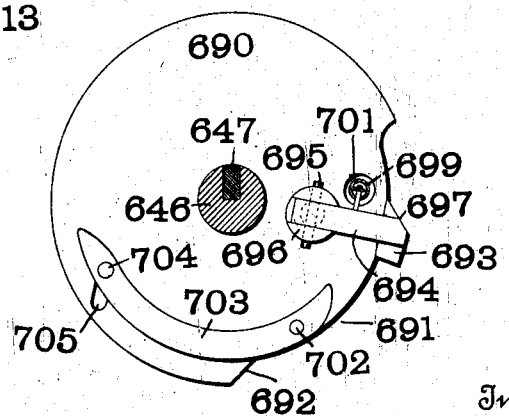
Witnesses
W. A. Alexander
Fred Henke
Inventors
G. N. Hinchman
Henry Schroeder
By Attorneys No. 811,920. PATENTED FEB. 6, 1906.
G. N. HINCHMAN & H. SCHROEDER.
ADDING MACHINE.
APPLICATION FILED JAN. 25, 1904.

29 SHEETS—SHEET 29.

Witnesses
W. A. Alexander
Fred Henke

Inventors
G. N. Hinchman
Henry Schroeder
By Attorneys

UNITED STATES PATENT OFFICE.

GEORGE N. HINCHMAN AND HENRY SCHROEDER, OF ST. LOUIS, MISSOURI, ASSIGNORS TO THE STANDARD ADDING MACHINE COMPANY, OF ST. LOUIS, MISSOURI, A CORPORATION OF MISSOURI.

ADDING-MACHINE.

No. 811,920. Specification of Letters Patent. Patented Feb. 6, 1906.

Application filed January 25, 1904. Serial No. 190,508.

*To all whom it may concern:*

Be it known that we, GEORGE N. HINCHMAN and HENRY SCHROEDER, citizens of the United States, residing at the city of St. Louis, in the State of Missouri, have invented a certain new and useful Adding-Machine, of which the following is such a full, clear, and exact description as will enable any one skilled in the art to which it appertains to make and use the same, reference being had to the accompanying drawings, forming part of this specification.

Our invention relates to adding-machines, and more particularly to that class of adding-machines in which a plurality of adding devices corresponding to the numerical orders are successively placed under the control of a series of digit-keys by means of a translating device interposed between said keys and adding devices.

One object of our invention is to dispense with a spring or other motor communicating power to the adding devices through the translating device.

Another object of our invention is to provide the machine with a repeat-key by means of which the same number can be added into the machine any desired number of times without again striking the digit-keys.

Another object of our invention consists in providing the machine with an error-key for removing the last number placed in the machine from the machine without disturbing the adding devices.

Another object of our invention is to so construct the machine that the sum or total can be printed and either left in the machine or taken out and also so that the sum can be exhibited without either printing it or taking it out of the machine.

Another object of our invention is to so construct the machine that the number is visible before being printed in the machine and so that the printed number is visible immediately after being printed in the machine.

Another object of our invention is to provide the machine with a paper-carriage which will accommodate any width of paper.

Our invention has for its object also the improvement of many other features of the machine, which need not be now set forth in detail, but which are fully described in the following specification.

Our invention consists in part in the combination, with adding devices corresponding to the numerical orders, of a set of stops controlling each adding device, a series of keys, and a translating device bringing said sets of stops successively within control of said keys.

Our invention also consists in various other novel features and details of construction, all of which are described in the following specification and pointed out in the claims affixed hereto.

Figure 13:
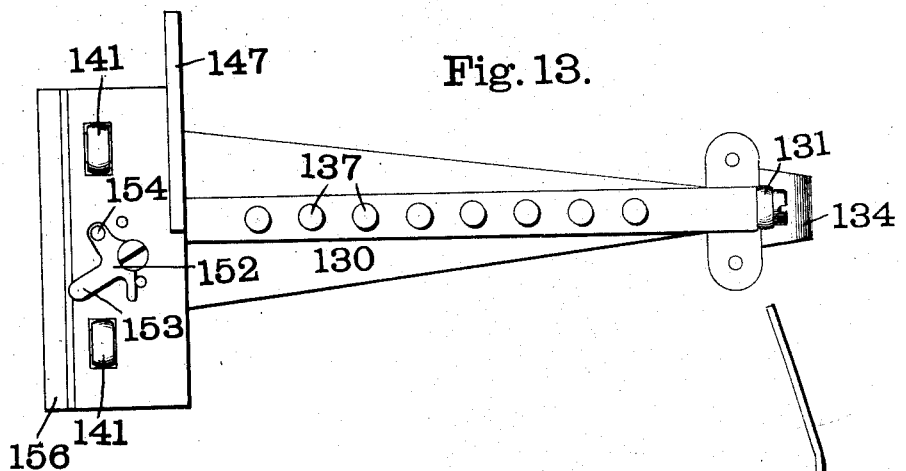
Figure 14:
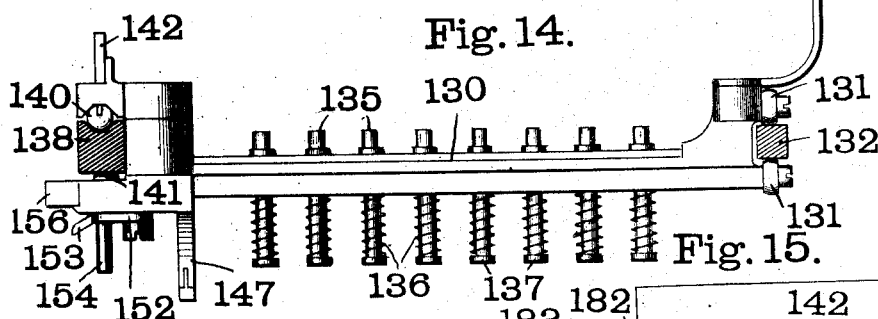
Figure 15:
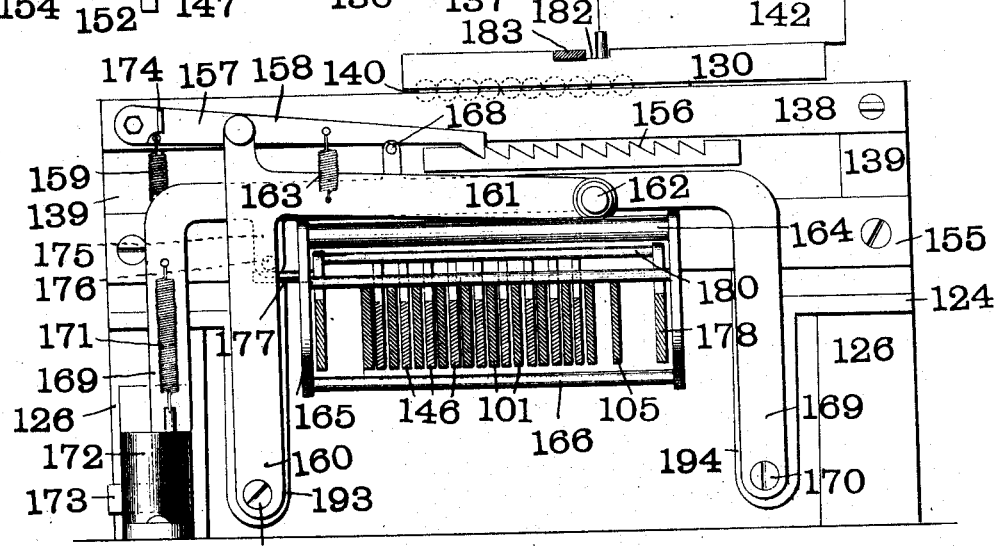
Figure 16:
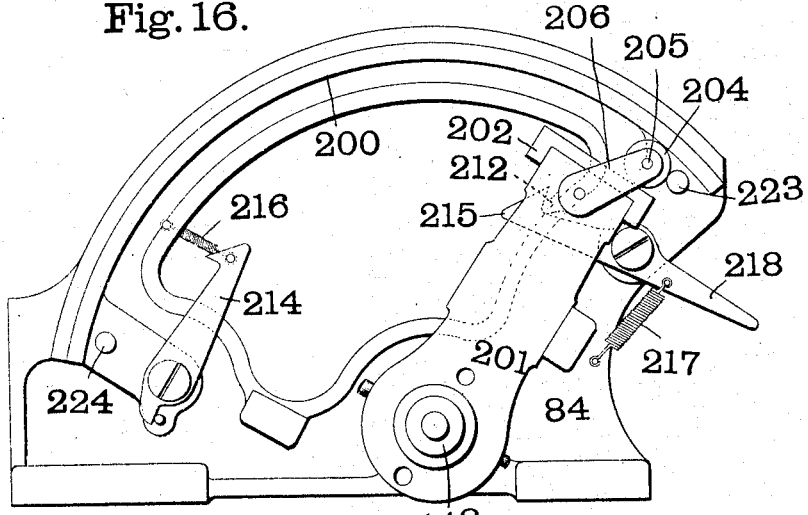
Figure 17:
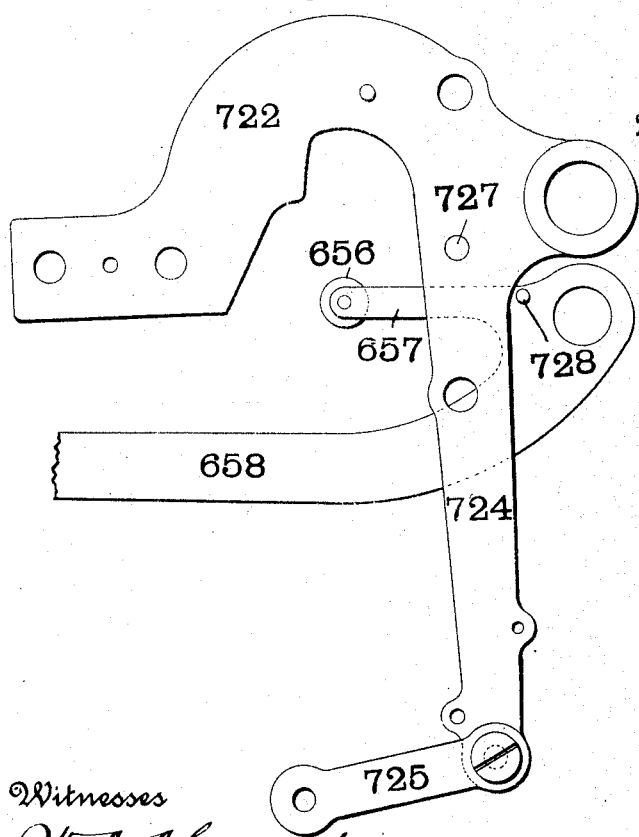
Figure 18:
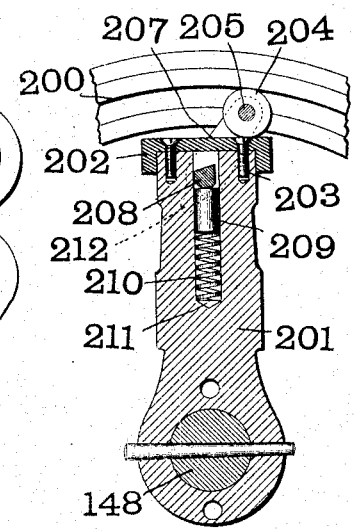
Figure 24:
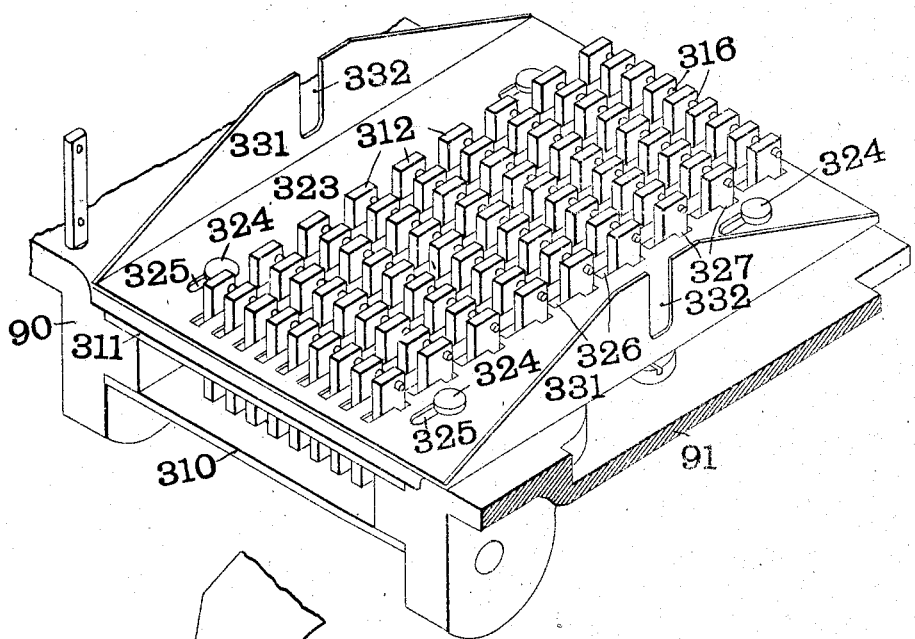
Figure 25:
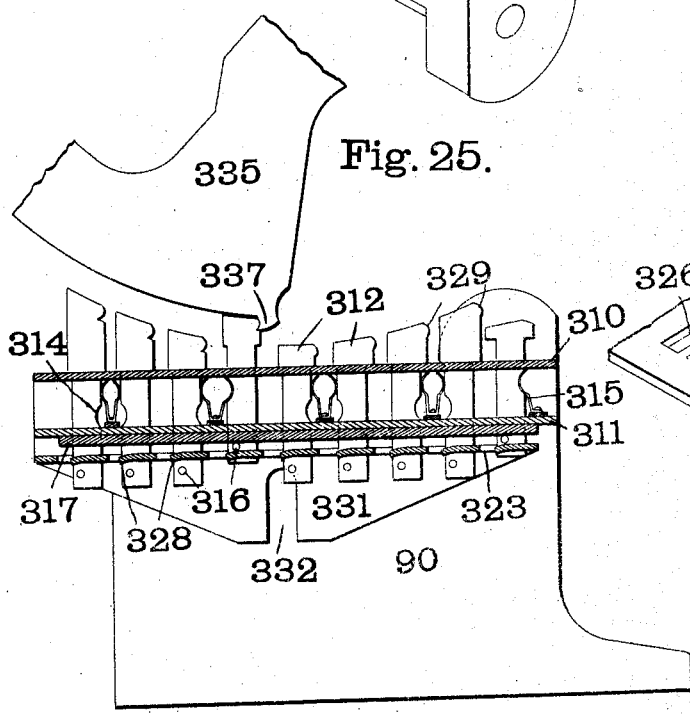
Figure 26:
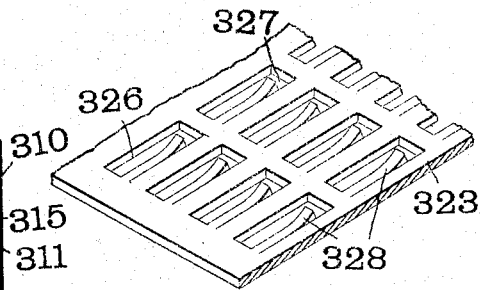
Figure 41:
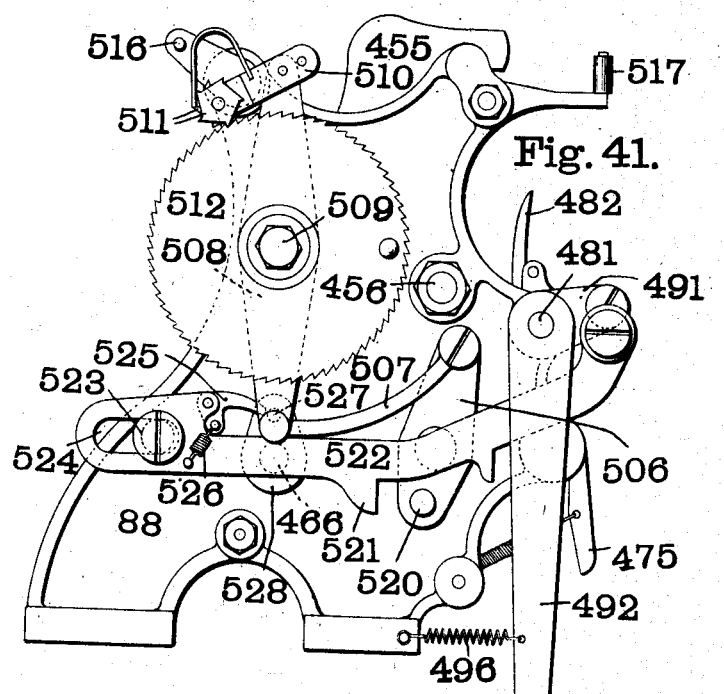
Figure 42:
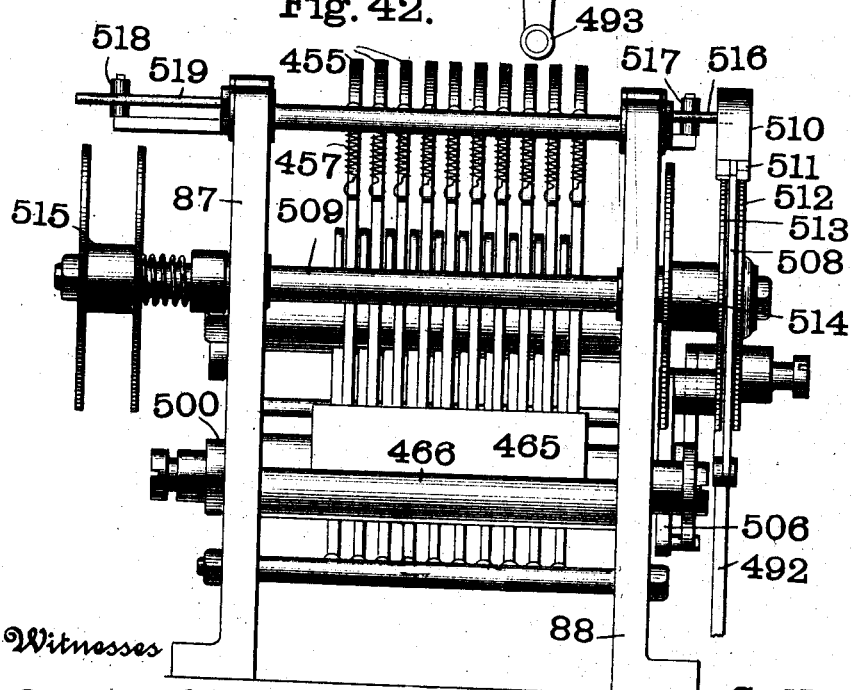
Figures 62, 63, 64, 65:
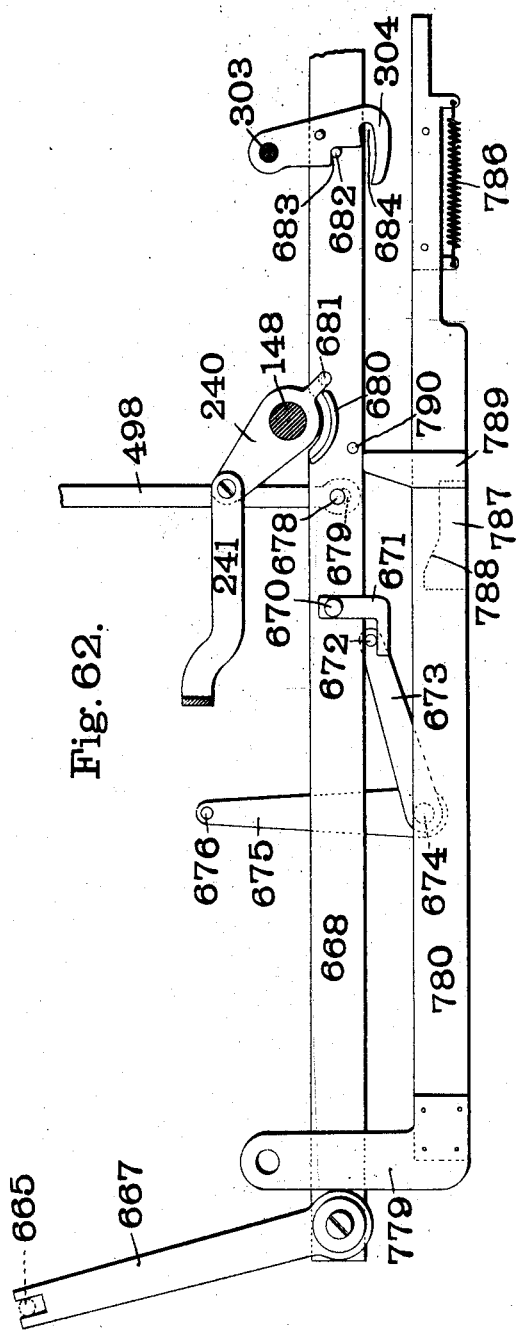
Figure 66:
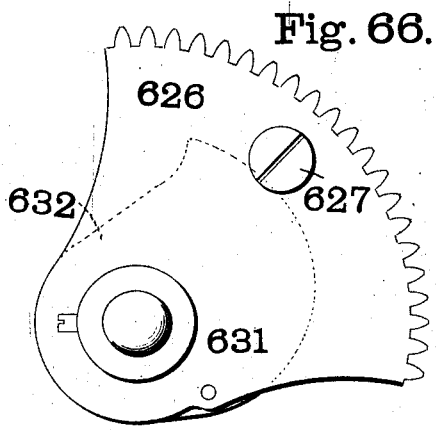
Figure 67:
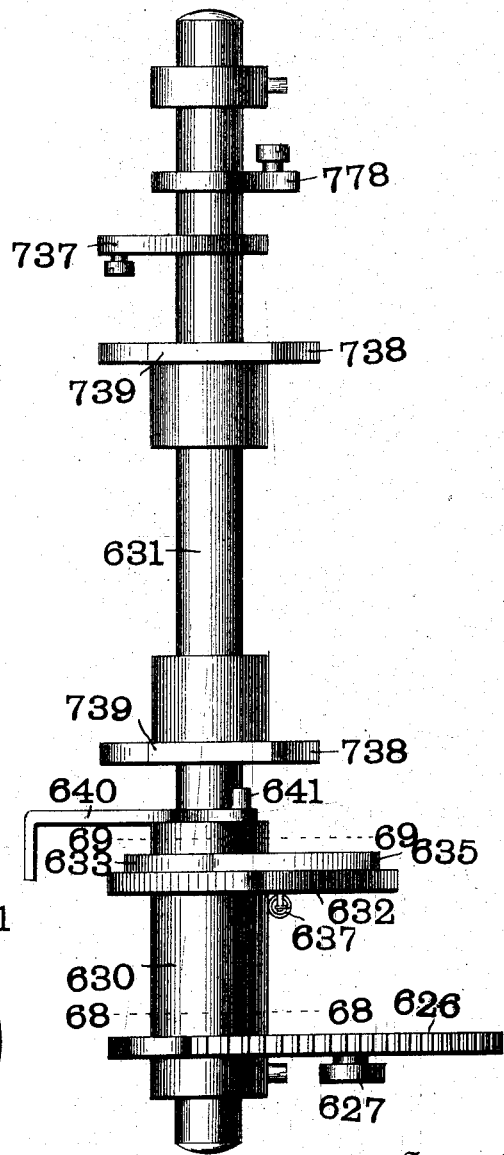
Figure 68:
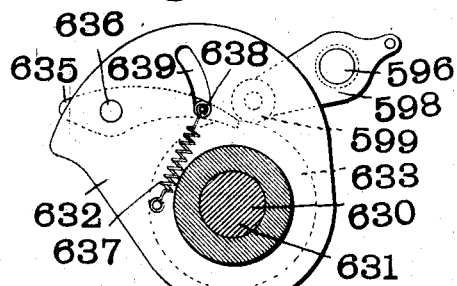
Figure 69:
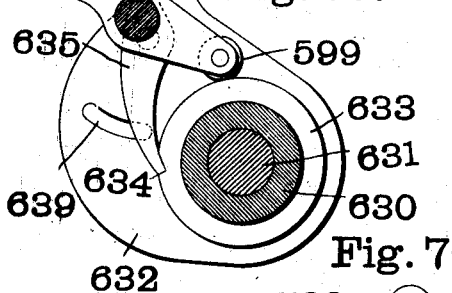
Figure 70:
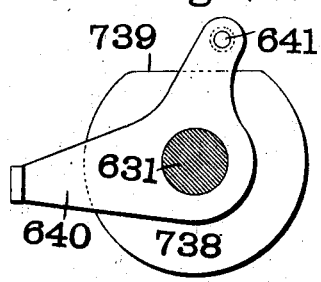
Figure 76:
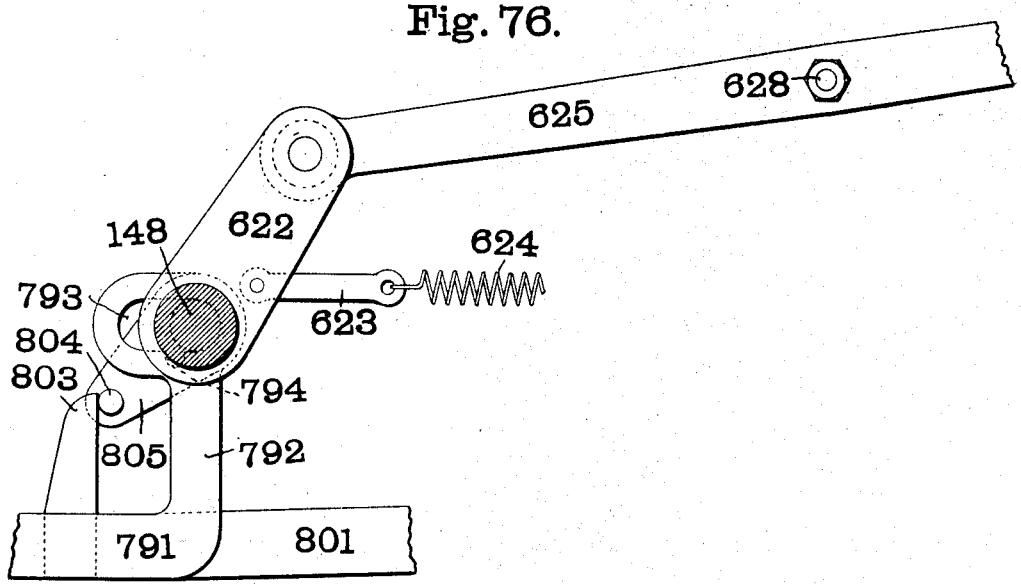
Figure 77:
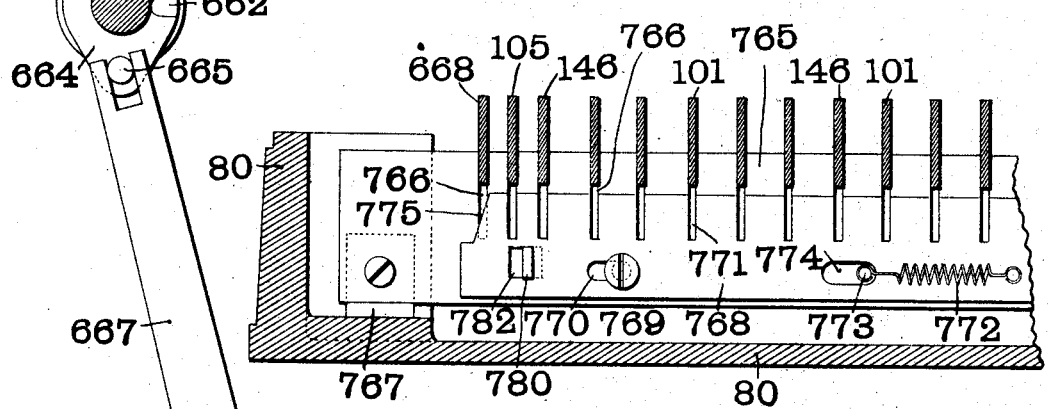
Figure 78:
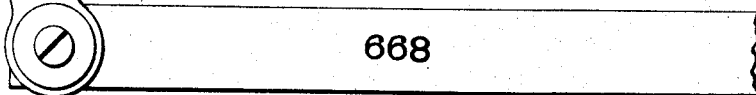

In the accompanying drawings, which illustrate one form of adding-machine made in accordance with our invention, Figure 1 is a side elevation of the complete machine. Fig. 2 is a view similar to Fig. 1, but looking at the opposite side of the machine and showing the case in section. Fig. 3 is an enlarged top plan view of the keyboard and some of the adjacent mechanism. Fig. 4 is a top plan view showing the cradle-field. Fig. 5 is a top plan view of the key-bar field. Fig. 6 is an enlarged section of the dash-pot. Fig. 7 is an enlarged sectional view of a portion of the key-bars and cradles. Fig. 8 is a detail view showing devices for locking the handle by the movement of the key-bars. Fig. 9 is an enlarged sectional view showing a detail of construction. Fig. 10 is a vertical central section through the main portion of the machine. Fig. 11 is an isometric projection of a portion of the frame of the machine. Fig. 12 is an enlarged view of some of the parts shown in Fig. 10. Fig. 13 is a bottom view of the translating device or carriage. Fig. 14 is a side view of the carriage. Fig. 15 is a front elevation showing the carriage-feed. Fig. 16 is an elevation of the device for preventing the premature return of the handle. Fig. 17 is a view of the plate attached to the error-key bar, together with some of the adjacent parts. Fig. 18 is a section of the arm shown in Fig. 16. Fig. 19 is a side elevation of the counting device. Fig. 20 is a section on the line 20 20 of Fig. 22. Fig. 21 is a section on the line 21 21 of Fig. 22. Fig. 22 is an enlarged view of some of the parts shown in Fig. 19. Fig. 23 is a section on the line 23 23 of Fig. 21. Fig. 24 is an isometric projection showing the lower ends of the sector-stops. Fig. 25 is a sectional view showing a modified form of sector-stop. Fig. 26 is an isometric projection showing a modified form of the locking-plate for the sector-stops. Fig. 27 is a front elevation of the type-sector section. Fig. 28 is partly a plan view and partly a section of the adding-wheels. Fig. 29 is an enlarged view of one of the type. Fig. 30 is a side elevation of the type-sector section. Fig. 31 is a central section of the type-sector section and printing-hammer section. Fig. 32 is a central section of the type-sector section and adding-wheel section. Fig. 33 is a detail view showing the pawls for controlling the carriage when taking the total. Fig. 34 is a side elevation of the type-sector section and adding-wheel section. Fig. 35 is a section on the line 35 35 of Fig. 38. Fig. 36 is a section on the line 36 36 of Fig. 38. Fig. 37 is a section on the line 37 37 of Fig. 38. Fig. 38 is a front elevation of the paper-carriage, the central portion being broken away. Fig. 39 is a section on the line 39 39 of Fig. 38. Fig. 40 is a detail view of one of the lugs for supporting the paper-carriage. Fig. 41 is a side elevation of the printing-hammer section. Fig. 42 is a front view of the printing-hammer section. Fig. 43 is a central section of the printing-hammer section. Fig. 44 is a side elevation of the printing-hammer section taken from the opposite side to that shown in Fig. 41. Fig. 45 is a central section through the adding-wheel section. Fig. 46 is an enlarged view showing details of construction. Fig. 47 is a side elevation of the adding-wheel section. Fig. 48 is a detail view of the devices for returning the printing-sectors to normal position, together with some of the adjacent parts. Fig. 49 is a view showing a detail of construction. Fig. 50 is a view of the cradle for returning the sector-stops to normal position. Fig. 51 is a section on the line 51 51 of Fig. 52. Fig. 52 is an elevation of a portion of the key-bar-locking devices. Fig. 53 is partly a plan view and partly a section of the mechanism illustrated in Fig. 52. Fig. 54 is a front elevation of a portion of the type-sector section. Fig. 55 is a detail view of parts operated by the total-lever. Fig. 56 is a view similar to Fig. 55, but showing some of the parts omitted. Figs. 57 and 58 are a plan view and elevation, respectively, of the end of one of the locking-bars. Fig. 59 is a top plan view of the cradle for returning the sector-stops to normal position. Fig. 60 is a view of a portion of the total-key bar, taken from the opposite side to that shown in Fig. 56. Fig. 61 is a top plan view of the parts shown in Fig. 60. Fig. 62 is a side elevation, on a reduced scale, of the repeat-key bar and one of the locking-bars, together with adjacent parts. Fig. 63 is a view showing a detail of construction. Fig. 64 is a view showing the cam-block on the main shaft, together with some of the parts operated thereby. Fig. 65 is a view of the mechanism for locking the key-bars by means of error key or handle. Fig. 66 is an end view of the parts shown in Fig. 67. Fig. 67 is a plan view of one of the shafts of the machine. Fig. 68 is a section on the line 68 68 of Fig. 67. Fig. 69 is a section on the line 69 69 of Fig. 67. Fig. 70 is a detail view of some of the parts shown in Fig. 67. Fig. 71 is a plan view of one of the shafts of the machine. Fig. 72 is an end view of the parts shown in Fig. 71. Fig. 73 is a section on the line 73 73 of Fig. 71. Fig. 74 is a section on the line 74 74 of Fig. 71. Fig. 75 is a section on the line 75 75 of Fig. 71. Fig. 76 is an enlarged detail view. Fig. 77 is a sectional view showing the key-bars and combs for locking the same by means of error-key, total-key, or repeat-key; and Fig. 78 is a detail view of a portion of the repeat-key bar.

Before proceeding to describe our machine in detail we will give a brief description of the general operation of the machine. The machine is provided with two sets of keys, one of which we term "order-keys" and the other "numeral-keys." The order-keys are used to position the carriage or other translating device in the proper order to begin the number. After the order-key has been depressed to bring the carriage into the proper position the numeral-keys are successively depressed to register the desired number in the machine. The depression of the first numeral-key locks the entire set of order-keys, so that no order-key can be depressed until the handle is pulled forward to complete the addition of the number. Each depression of a numeral-key feeds the carriage one order toward the right. When a numeral-key is depressed, it raises one of a set of stops to release a type-sector and also, except in the case of the "9" key, operates a second stop to determine the amount of movement of the sector. In the case of the "9" key only the release-stop is set up, and a permanent stop acts as the "9" stop for all the type-sectors. The various digits in the number are thus set up by depressing the required numeral-keys. The type-sectors during this part of the operation are entirely disconnected from the idle wheels and adding-wheels, and consequently the number is not added into the machine until after the handle is drawn forward. Owing to this, the type-sectors can all be returned to their normal position by the depression of an error-key before pulling the handle forward, and no record of the number will be made, and the number will not be added into the machine. In case, however, the correct number is set up by means of the numeral-keys the operating-handle is drawn forward. The movement of this handle throws the idle wheels into engagement with the type-sectors and also throws the adding-wheels into engagement with the type-wheels, so that when the type-sectors are returned to their normal position the number is transferred to the adding-wheels. The forward movement of the operating-handle also returns all the sector-stops to their normal position and operates printing-hammers to print the number set up on the type-sectors. When it is desired to take the sum of the numbers accumulated on the adding-wheels, the total-key is depressed. The depression of the total-key throws the idle wheels into engagement with the type-sectors and the adding-wheels into engagement with the type-wheels and then releases all of the type-sectors. Consequently the sectors will be allowed to move a distance corresponding to the various amounts added into the adding-wheels. If the handle is now drawn forward, the amount will be printed. If, however, it is only wished to ascertain the amount without printing it, the error-key can be depressed to return the various parts to the same position which they occupied before the depression of the total-key. If it is desired to take the sum and at the same time bring all the adding-wheels to zero, the total-key is first depressed, then allowed to rise back to its normal position, and the operating-handle is drawn forward. If, however, it is desired to print the sum and at the same time to retain it in the machine, the total-key is depressed and the operating-handle is drawn forward while the total-key is in its depressed position. This will cause the idle wheels and adding-wheels to remain in engagement with the printing-sectors not only during their forward movement, but also during their return, so that the sum will be transferred back from the type-sectors to the adding-wheels and will remain in the machine. A repeat-key is also provided which locks the various sector-stops in position after the number has been set up in the machine and also locks the various printing-hammers, so that each time the handle is pulled while the repeat-key remains depressed the number will be printed and added in the machine.

Like marks of reference refer to similar parts of the several views of the drawings.

80 is the base of the machine, upon which rests the main portion of the casing 81. This casing 81 supports the paper-carriage, as will be hereinafter described. The remainder of the working portions of the machine are carried by means of frames supported by the base 80 and contained within the casing 81.
Secured to the base 81 at the forward end of the machine are two side frames 83 and 84. (Shown in detail in Figs. 19 and 16, respectively.) These frames 83 and 84, together with standards 85, Figs. 4 and 5, formed integral with the base 81, support a plate 86, Fig. 3. This plate in turn has secured to it the side frames 87 and 88, Fig. 42, respectively, of the printing-hammer section. Secured to the base 81, immediately at the rear of the printing-hammer section, are the side frames 90 and 91, Fig. 27, of the sector-stop section. Secured to the top of the sector-stop section are the side frames 92 and 93 of the sector-section. Pivoted to the rear end of the sector-stop section are side frames 94 and 95, Figs. 32, 34, 45, and 47, forming the adding-wheel section. Pivoted within the adding-wheel section is an auxiliary frame 96, which carries the adding-wheels. Secured to the base 80 at the sides of the adding-wheel section are frames 97 and 98, Figs. 1 and 2, in which some of the main shafts of the machine are journaled.

100, Figs. 1 and 3, are the digit-keys, which are numbered from "1" to "9." The digit-keys 100 are carried by key-bars 101. These key-bars 101 are pivoted upon a rod 102, Figs. 10 and 12, and are separated by washers 103.

104, Fig. 3, is the zero-key or space-key. This zero or space key 104 is carried by two key-bars 105, which are pivoted on the rod 102 outside of the bars 101, as best shown in Fig. 5. Each of the key-bars 101 is provided with a downwardly-projecting stop 106, (see also Figs. 7 and 12,) and each of the said key-bars, except the bar carrying the "9" key, is also provided with a second stop 107. The stops 106 act by the same cradle, so as to release the type-sectors of the order in which the machine is operating. The stops 107 operate upon a series of cradles in order to set up a sector-stop to limit the movement of the sector. The "9" key is not provided with the stop 107, because a fixed stop is used to limit the movement of the various type-sectors whenever the "9" key is depressed. Carried on the rod 102 outside of the bars 105 are arms 108, each of which is provided at its forward end with a hook-shaped portion 109. In these hook-shaped portions 109 rest trunnions 110, carried by cradles 111, each of which is provided with a cross-bar 112 for actuating the stops of the carriage, as will be hereinafter described. At the rear end of each of the cradles 111 is pivoted a link 113. These links 113 are pivoted to the inner sides of the cradles 111, so as to come directly below the arms 108, and thus prevent the cradle from being displaced. The rear cradle 111, in addition to the cross-bar 112, is provided with a strengthening-bar 115. The links 113 of the rear cradle are provided with a cross-bar 116, which has at each end a circumferential groove 117, Fig. 9. The said bar 116 is inserted in the links 113 by being passed through openings 118 and dropped in slots 119, as shown in Fig. 9. The links 113 of each of the remaining cradles are provided with bars 120, similar to the bar 116 and secured in the links in the same manner. The bars 116 and 120 are guided by slots 121, formed in plates 122, carried on shafts 123. The shafts 123 are supported from side frames 124 by downwardly-projecting lugs

125. The said side frames are secured to supports 126, Figs. 12 and 15, on the base 80. In the rear end of the side pieces 124 the rod 102, hereinbefore referred to, is carried.

130, Figs. 4, 12, and 15, is the carriage, which is supported at its rear end by means of rollers 131, bearing upon the upper and lower sides of a guide-bar 132. The guide-bar 132 is secured to upwardly-projecting posts 133, carried by the side frame 124, as shown in Fig. 4. To the rear sides of the posts 133 is secured a cross-bar 127 for supporting the arm 108, hereinbefore described. Supported from the bar 127 by posts 128 is a plate 129 for the attachment of the springs for the various key-bars, as will be hereinafter described. The rear end of the carriage 130 is provided with an upwardly-projecting tailpiece 134 for limiting the movement of the carriage when the total is taken. Slidingly mounted in the carriage 130 are nine pins 135, which are adapted to operate the sector-stops. The pins 135 are held in their normal position by means of coil-springs 136 and surrounding their lower ends and abutting against the carriage 130 and against heads 137, formed on the lower ends of the pins 135. These heads 137 are arranged adjacent to the cross-bars 112, as best shown in Fig. 12, so that the said pins will be raised when the cradles 111 are operated by the digit-keys. The front end of the carriage 130 is supported by means of a guide-bar 138, secured to upwardly-projecting posts 139, carried by the side pieces 124. (Shown in Fig. 4.) Between the upper edge of this guide-bar 138 and the carriage 130 are interposed antifriction-balls 140, as shown in Figs. 14 and 15. The carriage 130 is also provided with rollers 141, which bear upon the lower edge of said guide-bar 139. Projecting upwardly from the front end of the carriage 130 is a blade 142 for the purpose of controlling the printing-hammers, as will be hereinafter described. The key-bars 101 are held in their normal position by springs 143, Fig. 12, secured at one end to said bars and at the other end to the plate 129. The key-bars 105 are held in position by a similar spring 144, also attached to the plate 129.

145, Figs. 1 and 3, are the order-keys, each of which is attached to a key-bar 146. These key-bars 146 terminate beneath the forward portion of the carriage 130, as best shown in Figs. 9, 10, and 12, and are adapted to be thrown into the path of a downwardly-projecting stop 147, (see also Fig. 14,) carried by said carriage 130. The key-bars 146 are pivoted upon the handle-shaft 148 of the machine and are held in normal position by means of springs 149, Fig. 10, secured at one end of said key-bars and at the other to plate 86, hereinbefore described.

150 is a swinging lock-plate adapted to engage with projections 151 on the key-bars 146, and thus retain the keys in their depressed position until the carriage 130 has reached the desired position. In order to release the keys after the carriage has traveled the required distance, the lower side of the carriage is provided with a release 152. (Shown in detail in Fig. 13.) This release 152 has a forwardly-projecting finger 153, adapted to bear against the plate 150, and a downwardly-projecting pin 154, adapted to strike against the key-bars 146. As soon as the pin 154 comes in contact with the key-bar 146 the releasing-plate 152 will be rotated on its pivot, and thus cause the finger 153 to force the locking-plate 150 forward and release the key-bar. The key-bars 146 are preferably prevented from yielding laterally to the impact of the carriage 130 by a comb 155, Fig. 12. The comb 155 is secured to the front faces of the lugs 139, as shown in Figs. 4, 12, and 15.

The front end of the carriage 130 is provided with a rack-bar 156. Engaging with the rack-bar 156 are pawls 157 and 158, Figs. 4 and 15. The pawl 157 is pivoted to the guide-bar 138 and is held in normal engagement with the rack 156 by means of a spring 159. The pawl 158 is pivoted to a lever 160. The lever 160 is provided with an arm 161, carrying a forwardly-projecting pin 162. The pawl 158 is held in normal engagement with the rack 156 by means of a spring 163, secured at one end to said pawl and at the other to said arm 161. The forwardly-projecting pin 162 extends over a cross-bar 164, carried by a cradle 165, pivoted to the front pair of lugs 125, hereinbefore described. (See also Fig. 8.) The rear end of the cradle 165 is provided with a cross-bar 166, which extends beneath the digit-key bars 101 and zero-key bars 105, as best shown in Fig. 12, so that the said cradle is operated each time one of the digit-keys or the zero-key is depressed. Extending below the pawls 157 and 158 is a pin 168, carried by a U-shaped lever 169. The lever 169 is held in its normal position by means of a coil-spring 171, secured to said lever, and to a guide-post 172, in which the end of the lever 169 plays. The lever 169 is also provided with a finger 173 for a purpose hereinafter to be described. The lever 169 is provided with a downwardly-projecting lug 175, carrying a pin 176. (See also Fig. 5.) This pin 176 rests upon a pin 177, carried by a cradle 178. The said cradle 178 is pivoted on the handle-shaft 148 and is preferably connected at its forward end by a strengthening-bar 179. The rear end of the cradle 178 is provided with a cross-bar 180, which rests upon the order-key bars 146. The lever 160 is held in normal position by a spring 167, Fig. 5, and its rearward movement is limited by a stop 174, Figs. 4 and 15, carried by the pawl 157. It will be evident that when one of the order-keys is depressed the rear end of the bar will raise the rod 180, and thus swing the cradle 178. This will cause the pin 177 to raise the pin 176, and consequently to raise the pawls 157 and 158 out of engagement with the rack-bar 156, so as to release the carriage. The carriage will be stopped by the order-key depressed, as has been hereinbefore described.

In order to move the carriage 130 toward the left of the machine when it has been released, as above described, the upper face of the carriage is provided with a groove 182, Fig. 4, in which rests the end of a lever 183. This lever 183 is pivoted at its forward end by means of a screw 184, Fig. 3, to the plate 86, hereinbefore described.

185 is a coil-spring which is secured at one end to the lever 183 and at the other to the side frame 83, so that the said spring draws the carriage toward the left-hand side of the machine when it is released.

Pivoted to the lever 183 is one end of a link 186, the opposite end of which is pivoted to a curved lever 187. The lever 187 is pivoted at its forward end by means of a screw 188 to the plate 86. The rear end of said lever 187 is provided with a downwardly-projecting roll 189, which is adapted to engage with a spiral cam 190 (see also Fig. 64) in order to return the carriage to its normal position. The cam 190 is formed in a cam-block 191, mounted on the handle-shaft 148.

The lever 160, hereinbefore described, is pivoted by a screw 192, Fig. 15, to a downwardly-projecting lug 193, carried by one of the said pieces 124, and the lever 169 is pivoted by a screw 170 to a similar lug 194, carried by the other side piece 124. The lock-plate 150 is pivoted in upwardly-projecting lugs 195, Figs. 5, 11, and 12, carried by said side pieces 124. The cam-block 191 is loosely mounted on the handle-shaft 148, but is connected with it by means of a pin 196 in said shaft working in a slot 197 in the cam-block, as shown in Fig. 64.

When the carriage has been released, as has been hereinbefore described, the pressure of the spring 185 will cause the lever 183 to move the carriage toward the left-hand side of the machine. If the carriage is not completely returned to the right hand of the machine by the depression of the numeral-keys, it will be returned upon the operation of the handle by reason of the cam 190 striking the roller 198, and thus moving the lever 187 toward the right of the machine. The movement of this lever will be communicated through the link 186 to the lever 183, which moves the carriage toward the right. It is also necessary to move the carriage toward the right without the aid of either the numeral-keys or the handle in case the wrong number isset up in the machine and the error-key is depressed. The error-key, therefore, has connections which will be hereinafter described for operating the cam 190. The cam 190 is therefore made movable independently of the shaft 148 by means of the pin 196 and slot 197, above described.

The side frame 84, above referred to, is provided with a segmental track 200, as best shown in Figs. 1, 16, and 18. Secured to the handle-shaft 148 is an arm 201, the end of which moves adjacent to the said track 200. The end of the arm 201 is provided with a steel wearing-cap 202, which is secured in position by means of screws 203. Interposed between the cap 202 and track 200 is a roller 204. This roller 204 is mounted upon a spindle 205, connecting the outer ends of two links 206 and 207. The inner ends of these links 206 and 207 are connected by a bearing 208. This bearing 208 passes through a slot in the arm 201 and bears upon a movable pin 209, which in turn rests upon a coil-spring 210, which is placed within an opening 211 in the said arm 201. The inner end of the link 207 is provided with an extension 212. The roller 204 is reversed by means of hooks 214 and 215, carried on the side frame 84 and adapted to engage with the extension 212. The hook 214 is adapted to reverse the roller when the handle is in its forward position, and said hook is held in its normal position by means of a spring 216. The hook 215 is adapted to reverse the roller 204 when the handle is in its rearward position, and said hook is held in its normal position by means of a spring 217.

The above-described devices are for the purpose of compelling a complete stroke of the handle in either direction before the handle can be reversed. When the roller 204 and arms 206 are in the position shown in Fig. 16, the handle can be completely moved toward the rear of the machine. If, however, it is attempetd to draw the handle forward before it has reached the end of its stroke, the roller 204 will become wedged between the cap 202 and the track 200, and consequently it will be impossible to draw the handle forward. When, however, the handle has reached the limit of its travel, as shown in Fig. 16, the hook 215 will engage the projection 212 on the arm 206, so as to reverse the arms and roller, so as to allow the handle to be moved forward. In order to insure sufficient movement of the handle to reverse the roller after the handle has reached the limit of its stroke, the pin 223 is provided. This pin striking against the roller 204 forces it back a slight distance, and thus gives sufficient play to enable the roller to be reversed when the handle is drawn forward. Upon the forward movement of the handle the hook 214 and pin 224 perform the same functions as the hook 215 and pin 223, above described.

The hook 215 is also provided with a rearward extension 218. The cradle 165, hereinbefore described, is provided with an upward extension 219, which carries a bent pin, Figs.

5 and 8, terminating below the rearward extension 218 of the hook 215. The cradle 178 is also provided with a bent pin 221, similar to the pin 220 and also terminating beneath the said rearward extension of the hook 215. The object of these pins 220 and 221 is to throw the hook 215 out of engagement with the extension 212 of the link 207, so that the handle cannot be pulled forward when any of the keys are depressed. The frame 84 is provided with pins 223 and 224, which are adapted to limit the movement of the roller 204, so as to allow the necessary movement of the arm 201 to reverse the roller.

When one of the order-keys is depressed to move the corresponding order-key bar 146, the rear end of the said key-bar through the cross-rod 180 moves the cradle 178 so as to cause the pin 231 to act on the tailpiece 218 of the hook 215 and move the said hook out of engagement with the projection 212, so that the reversing device for the handle-lock is thrown out of operation, and consequently the handle cannot be pulled forward until the order-key is released. In the same way when one of the numeral-keys 100 is depressed the action of the numeral-key bar 101 on the cross-rod 166 swings the cradle 165, and thus causes the rod 220 to act upon the tailpiece 218 in the same manner, so that the handle cannot be drawn forward while any of the numeral-keys are depressed.

In order to lock the keys against movement when one of the digit-keys has been depressed, we provide the cradle 178 with a pin 230 and also provide the cradle 265 with a pin 231. This pin 231 is adapted to strike against the tailpiece 232 of a hook 233 (see also Figs. 46 and 64) and cause the said hook to engage with the pin 230, and so lock the cradle 278 against movement. This hook 233 is carried on a stud 234. This stud 234 is journaled in the lug 194 and is surrounded by a coil-spring 235, which bears against a head 236 on the end of the said stud and against the lug, and thus holds the hook 233 by friction in any position in which it is moved. Extending rearwardly from the stud 234 is a bent arm 237. This arm 237 is in the path of a projection 238 formed on the cam-block 191, hereinbefore described, so that the said projection 238 strikes the arm 237 and moves the hook 233 out of engagement with the pin 230 when the handle is moved into its forward position.

It will be evident from the above that when any of the numeral-keys is depressed the action of the numeral-key bar on the cross-rod 166 will swing the cradle 165 so as to cause the pin 231 to move the hook 233 over the pin 230 on the cradle 178. This will lock the said cradle 178, and consequently none of the order-keys can be depressed while the parts are in this position. The hook 133 will be held in this position by means of the spring 235 until the handle is drawn forward. When the handle is drawn forward, the cam 238 will act upon the arm 237, so as to move the hook to its normal position, and thus release the cradle 178.

The handle-shaft 148 is provided near the left-hand side of the machine with an arm 240, as best shown in Figs. 3 and 62. This arm 240 is pivoted to a link 241, the end of which is connected, by means of a nut 242, Fig. 6, to a piston-rod 243, carrying a piston 244. The piston 244 works in a cylinder 245, acting as a dash-pot. This dash-pot 245 is pivoted at 246 (see also Fig. 2) in a bifurcated support 247, secured to the bed-plate of the machine. The rear end of the dash-pot 245 is provided with an outlet 248, controlled by needle-valve 249. This needle-valve 249 is secured in position by means of a lock-nut 250. The forward end of the dash-pot is provided with an inlet 251. Within the piston 244 is a sliding valve 252, which is adapted to close the passage through the piston when the piston is moving toward the rear, but to open the said passage when the piston moves forward. This valve 252 consists of a hollow stud having a head 253, adjacent to which are formed openings 254, communicating with the interior of the hollow stud. A pin 255 prevents the valve from moving out of the piston.

The object of the dash-pot 245 is to prevent sudden jars to the machine, especially upon the return of the handle, by means of the spring 624, hereinafter to be described. When the handle is drawn forward, the movement of the shaft 148 is communicated to the piston 244 of the dash-pot by means of the arm 240 and link 241. The piston is allowed to move forward freely by means of the valve 252. When, however, the handle is returned to its position, the valve 252 closes, so that the piston 244 can only move as rapidly as the air escapes through the opening 248, which, as above described, can be suitably regulated. The handle is thus compelled to move back more or less gradually, according to the size of the opening 248, thus preventing all jar on all parts of the machine upon the return of the handle.

The handle-shaft 148 terminates in a boss 260, Fig. 3, carried on the side frame 83. Adjacent to this boss 260 the said handle-shaft is provided with an arm 261, having on its end an antifriction-roller 262, Fig. 19. Rigidly carried by the side frame 83 in line with the handle-shaft 148 is a stud 263, Figs. 21 and 23. This stud 263 is surrounded by a hub 264, provided with a milled head 265. Surrounding the hub 264 is a collar 266. This collar 266 is rigidly secured to the stud 263 by means of a pin 267 passing through the collar and stud. The hub 264 is provided with cut-away portions 268, so as to allow the passage of the pin 267 and to allow the hub to rotate through about one-fourth of a revolution. Rigidly secured to the hub 264 is a sector 269, provided with teeth 270. Arranged between the sector 260 and the collar 266 is a coil-spring 271. Carried by the side frame 83 is a graduated arc 272, and carried by the sector 269 is a pointer 273, traveling adjacent to the said graduated arc. Pivoted to the frame 83 is an arm 274. The movement of this arm 274 is limited by means of a pin 275, carried by the frame 83 and passing through a short slot 276 in the said arm 274. The arm 274 is held in its normal position by means of a coil-spring 277. The arm 274 is provided with a curved projection 278, which is adapted to be struck by the antifriction-roller 262 when the handle-shaft is rotated, thus moving the arm 274 through a short distance. Pivotally mounted on the upper end of the arm 274 is a feed-pawl 279, adapted to engage with the teeth 270 on the sector 269. This pawl 279 is held in engagement with the teeth 270 by means of the coil-spring 280, attached at one end to the arm 274 and at the other to a short arm 281, rigidly connected with the said pawl.

282 is a retaining-pawl, pivoted to the frame 83 and engaging with the teeth 270 of the sector 269. The pawl 282 is held normally in engagement with the teeth by means of coil-spring 283, attached at one end to said pawl 282 and at the other end to a pin 284, secured in the frame 83.

The sector 269 is provided with a track 285 adjacent to the teeth 270 and preferably extending a slight distance beyond the said teeth. This track is provided at its rear end with an inclined portion 286, so that when the sector is in the position shown in Fig. 19 the sector can be pulled out by means of a milled head 265, so that the pawls 279 and 282 will be moved out of engagement with the teeth 270 and ride upon the track 285. The sector can then be turned toward the rear. As soon, however, as the sector is allowed to move in so that the pawls drop into engagement with the teeth it will be impossible to move the sector toward the rear, and the sector cannot again be pulled out until it has reached its extreme front position, as shown in Fig. 19.

288 is a bell adapted to sound when the sector is moved to its extreme forward position. This bell 288 is provided with a hammer 289, the stem of which extends down through an opening in the plate 86 and is attached to an arm 290. This arm 290 and a lever 291 are pivoted, by means of a screw 292, to a lug 293, extending downwardly from the plate 86. The lever 291 extends through an opening 294 in the frame 83 and is arranged in the path of a finger 295 on the sector 269. In order to operate the arm 290 from the lever 291, the said arm 290 has pivoted to it a pawl 296, which engages with a notch 297 on the said lever 291. The pawl 296 is held in engagement with the notch 297 by means of a spring 298 attached at one end of the said pawl and at the other to the lever 291. The lever 291 is normally held in a raised position by means of a coil-spring 299, attached at one end to the said lever and at the other to the plate 86. 300 is a spring attached at one end to the said arm 290 and at the other to the plate 86. Extending rearwardly from the pawl 296 is a pin 301. (Best shown in Fig. 20.) This pin rides upon an inclined face 302 on the lug 293, so that when the arm 291 has reached its lowest position, and consequently the arm 290 is drawn to its farthest position from the bell 288, the inclined face will cause the pawl 296 to move out of engagement with the notch 297, and so release the arm 290, which will then be drawn by spring 296, so as to strike the bell 288. This will indicate to the operator that the handle has been operated the number of times for which the counting mechanism was set. Rigidly connected to a short shaft 303 is a hook 304, which is adapted to engage with the repeat-key bar, as will be hereinafter described. Rigidly secured to the opposite end of the shaft 303 is a short lever 305, which is adapted to be actuated by the finger 295, so as to release the said hook. 306 is a coil-spring attached at one end to the said hook 304 and at the other to the frame 83.

The above-described device is useful either to determine the number of times which a number has been repeated in case the repeat-key is used or it may be used to give warning when the end of a sheet of paper is reached in case ordinary letter-heads or other sheets of paper are used in place of the strip of paper usually used in connection with adding-machines. To set the device, the sector 269 is drawn out by means of the milled head 265, so that the pawls 282 and 279 are brought into engagement with the track 286 in place of the rack 270. The sector can now be turned to the rear by means of the milled head until the pin 272 comes opposite the desired number. The sector is now allowed to move inwardly, so that the pawls come into engagement with the rack 270. At each movement of the handle after the sector has been set the roller 262 will come in contact with the curved arm 278 and move the arm 274 a sufficient distance to cause the pawl 279 to feed the rack forward one tooth. The pawl 282 will prevent the return of the rack as soon as the sector has been moved into the position shown in Fig. 19, which will occur when at the end of a number of strokes corresponding to the number at which the pin 273 was set the finger 295 will act upon the lever 291 to draw the hammer 289 back from the bell and also to release the hammer by means of the action of the pin 301 on the cam-face 302, so as to release the hammer and sound the bell. In case the repeat-key has been depressed and held in its depressed position by means of the hook 304 the action of the finger 295 on the arm 305 will release the said repeat-key.

The side frames 90 and 91 are connected by means of two rigid plates 310 and 311, Figs. 12, 24, 25, 27, and 31. Sliding in these plates 310 and 311 are bars 312. These bars 312 are preferably eighty-one in number, being arranged in nine rows of nine each. The first eight bars of each row act as stops for limiting the printing-sectors, as will be hereinafter described, while the last bar in each row operates as a releasing-bar. Each of the bars 312 is provided with a recess 314, adapted to engage with a spring 315 to retain the bar in its raised position. Each of the bars 312 is provided, near its lower end, with a short pin 316. Placed between the pins 316 and the plate 311 is a plate 317. This plate 317 is carried on the lower end of rods 318, passing up through the side frames 92 and 93, as best shown in Fig. 27. Each of the rods 318 is provided with a washer 319. Between this washer 319 and the side frame is interposed a coil-spring 320, which normally holds said rods in their raised position, thus bringing the plate 317 in contact with the plate 311. Projecting laterally from each of the rods 318 is a pin 321, by means of which the rods are forced downwardly, as will be hereinafter described. Below the plate 317 is a locking-plate 323, which is slidingly mounted on the plate 317 by means of screws 324, passing through the said plate 323 into the plate 317. These screws 324 pass through short slots 325 in the plate 323, so as to allow for the necessary movement between the plates 317 and 323. The plate 323 is provided with a number of slots 326, through which the bars 312 pass. These slots are made somewhat longer than the width of the bar, so as to allow for the necessary movement. Each of the slots 326 has at one end a recess 327, through which the pins 316 can pass when the plate 323 is in one position. When, however, the plate is moved into the other position, these recesses 327 will be moved out of the path of the pins, so that all of the bars which are elevated will be locked in their raised position, while all the remaining bars will be locked in their normal position. In order to partly raise any of the bars 312 which may have been only partially raised by the pins 135, we may cut the metal adjacent to the recesses 327 so as to form tongues 328, which are bent slightly downwardly, as shown in Figs. 25 and 26. Each of the bars 312, which act as stops for the sector, is provided with striking-faces 329. These faces 329 may either be made flat, as shown in Figs. 12 and 31, or they may be made curved, as shown in Fig. 25, so as to prevent the bars from being forced downwardly by the impact of the printing-sectors. In addition to the movable stops 312 we provide a fixed stop 330, Figs. 27, 31, and 32, arranged in front of the first movable stop. This fixed stop 330 stops the sector when the digit-key representing nine is struck. The locking-plate 323 is provided at each side with a downturned portion 331, in which is formed a slot 332 for operating the said locking-plate, as will be hereinafter described.

It will be evident that when the digit-keys have been operated, as hereinbefore described, the pins 135 in the cradle will act upon the various sector-stops 312 so as to release the sectors and also limit their movement, so that the desired numerals may be added into the machine and printed by the printing device, hereinafter to be described. The stops 312 are returned to their normal position by means of the depression of the plates 117 and 123. The depression of these plates is accomplished by means of mechanism hereinafter to be described, which acts upon the pins 231, carried by the rods 318. It will be evident that when the locking-plate is provided with tongues 328, curved in the form shown in Fig. 26, it will operate not only to lock the stops in position, but also will operate to raise any stop which may be only partially raised by means of the keys.

335, Figs. 10, 27, 30, 31, and 32, represents the printing-sectors. These sectors are pivoted on a shaft 336, carried by the side frames 92 and 93. Each of the sectors 335 is provided with a downward projection 337, adapted to strike against the face 329 of the bars 312 and corresponding in form to said faces. Each of the sectors 335 is provided with a number of movable type 338, (shown in detail in Fig. 29,) bearing digits from "0" to "9," inclusive. Each of these type 339 is removably secured to the sector 335 by means of two pins 339, carried by said sector and provided with enlarged heads. The type 338 are provided with openings 340 to allow the passage of these heads with slots 341 for enlarging the shanks of said pins. Each of said type is also provided with a spring 342, bearing against the rear pin 339, and thus holding the said type in its normal position. Each of the sectors 335 is provided on one side with a short pin 343, Figs. 31 and 32, adapted to engage with a hook 344. These hooks 344 are pivoted on a shaft 345. The shaft 345 is carried by levers 346, pivoted at 347 in the side frames 92 and 93. Each of the hooks 344 is provided with a downwardly-projecting arm 348, carrying a pin 349, adapted to be struck by one of the releasing-bars 312. Each of the hooks 344 is also provided with an upwardly-projecting finger 350, adapted to strike against a rod 351, carried by the side frames 92 and 93. The hooks 344 are normally in engagement with the pins 343 by means of coil-springs 352, each attached at one end to one of the downwardly-projecting arms 348 and at the other to a rod 353, carried by the levers 346. The levers 346 are held in their normal position by means of a spring 354, Fig. 31, attached at one end to one of said levers and at the other to the side frame 91. One of the pivots 347 extends through the side frame 93 and has rigidly secured to it an arm 355, Figs. 30 and 34, provided with a pin 356, by means of which the said arm is actuated, as will be hereinafter described.

The type-sectors 335 are swung upon the shaft or pivot-rod 336 each time a number is added into the machine or the sum of the numbers in the machine is taken. In case a number is added into the machine the movement of the sectors will be controlled by the sector-stops 312, as hereinbefore described, while when the sum of the numbers in the machine is taken the movement of the sectors is controlled by the adding mechanism, as will be hereinafter described. It is evident that the mode of moving the type 338 on the sectors allows limited movement of the type, so that the type may be forced against the platen by means of the printing-hammers, and at the same time this mode of connecting the type to the sectors allows the type to be readily removed by disengaging the springs 342 from the rear pin 339. The type can then be moved to such position that the enlarged heads of the pins 339 will pass through the openings 340 in the type. The sectors are held in their normal position by means of the engagement of the pin 343 with the hook 344. The hooks 344 are released from the sectors by means of the sector releasing-stops 312 in the operation of writing a number into the machine. When, however, the sum is to be taken, the levers 346 and 348 are moved by mechanism hereinafter to be described, so that the shaft 345 will be carried toward the sectors. This will cause all the fingers 350 to engage with the rod 351, and thus lift all the hooks 344 out of engagement with the pins 343, so that all of the type-sectors will be released and will be controlled only by the adding mechanism.

Pivoted in the forward end of the frames 92 and 93 is a rock-shaft 357, rigidly secured to which are two arms 358, connecting the upper ends of which is a rod 359, adapted to return the segments 335 to their normal position, as will be hereinafter described. Rigidly secured to the right-hand end of the rock-shaft 357 outside of the frame 92 is a bell-crank lever 360, (best shown in Fig. 30,) having a long arm 361 and a short arm 362. The long arm 361 is connected with the error-key bar, as will be hereinafter described, while the short arm 362 is connected with the printing-hammer section for purposes that will be hereinafter described. Each of the sectors 335 is provided with a segmental slot 364. Passing through these slots 364 and corresponding slots 365 in the side frames 92 and 93 is a rod or shaft 366. This rod or shaft 366 is carried by arms 367, mounted on the ends of the shaft 336, hereinbefore described. The arm 367 at the right-hand end of the shaft 336 is provided with a downwardly-projecting rod 368, the purpose of which will be hereinafter described.

369, Fig. 34, is a coil-spring attached at one end to the side frame 93 and at the other to the shaft 366 to hold said shaft in its normal position.

Pivoted to the frame 92 is a lever 370, the long end of which rests upon the bar or shaft 366, the short end of a finger 371 of which is adapted to operate the paper-feeding mechanism, as will be hereinafter described.

Each of the sectors 335 is provided with a number of teeth 372 for engaging with the wheels of the adding-section. The sectors 335 are moved, after being released, by means of springs 373, each of which is attached at one end to a link 374, pivoted to the sector, and at the other to a rod 375. This rod 375 is carried by rearward extensions 376 and 377, respectively, of the side frames 92 and 93. Pivoted in these rearward extensions 376 and 377 is a shaft 378, on which are rigidly mounted two curved levers 379. Carried by the lower ends of these levers 379 is a bar 380, which is angular in cross-section and which is adapted to engage with the teeth 372 of the sectors 335 in order to aline the type 338. The shaft 378 is provided at its right-hand end with an arm 381, Figs. 48 and 49, having at its lower end an antifriction-roller 382, and at the left-hand end with a rigid arm 383, Fig. 55, to which is pivoted a cam 384. These arms 381 and 383 operate the shaft 378, as will be hereinafter described. The cam 384 is provided with a finger 385 and is held in its normal position by means of a spring 386, attached at one end to the said cam and at the other to the arm 383. Secured on the right-hand end of the rod 378, adjacent to the arm 381, is a collar 387. Carried by this collar 387 is a rod 388, having an inturned end 389 for engaging with the pin 368, hereinbefore described.

390 is a pin which pivots the cam 384 to the arm 383 and also projects beyond the face of said arm, so as to form a locking-pin for a purpose to be hereinafter described.

When the error-key is depressed, the bell-crank lever 360 will be operated to rock the shaft 357, and consequently to bring the rod 359 against the type-sectors 335, and thus return all the said type-sectors which have been released to their normal position. In the normal operation of the machine, however, the type-sectors are returned by means of the shaft 366, working in the slots 364 in the said type-sectors. The movement of this shaft 366 also operates the lever 370, carrying the finger 371, in order to operate the paper-carriage, as will be hereinafter described. The teeth 372 on the type-sectors engage with intermediate gearing, which in turn communicates with the adding-wheels, so that the individual bars are transferred from the type-sectors to the adding-wheels, and the sum in the adding-wheels is transferred back from the adding-wheels to the type-sectors. The levers 379, carried by the shaft 378, are operated so as to bring the angular bar 380 into engagement with the teeth 372 each time a number is printed, so as to perfectly aline the type. The object of the rod 388 is to engage with the pin 368, and thus hold the shaft 366 against the type-sectors and also to hold the angular bar 380 in engagement with the teeth of the type-sectors during a part of the stroke of the handle, so as to insure the return of the type-sectors to normal position after they have been released.

395 and 396, Figs. 35 and 39, are the two end pieces of the paper-carriage. These end pieces 395 and 396 are connected by means of a guide-bar 397. This guide-bar 397 coöperates with rolls 398, pivoted between two cross-bars 399, which are carried by the casing 81. The pieces 395 and 396 are also connected by means of a rod 400. Secured to this rod 400 is a block 401, through which passes a rod 402, provided with notches 403. Engaging with these notches is a detent 404, carried by a block 401. The ends of the rod 402 are supported in blocks 405, which are secured to lugs on the casing 81 and by means of nuts 406, as shown in Fig. 1. The ends of the rods 402 are provided with milled heads 407, by means of which the said rod can be rotated through a short distance. Secured in one of the blocks 405 are two pins 408, Fig. 40, and in the rod is secured a pin 409, which is adapted to make contact with these pins 408, and thus limit the movement of this rod.

410 is the feed-roll, which is mounted on a shaft 411, such shaft being journaled in the end frames 395 and 396.

412 is a milled head by means of which the roll 410 can be rotated manually.

414 is a bar which is provided with a groove or trough 415 and which is pivoted in the end plates 395 and 396 by means of trunnions 416. The groove 415 is adapted to receive the short curved end of a finger 371 of the lever 370, hereinbefore described. Secured to one end of the bar 414 is a plate 417. This plate is provided with a short slot 418, through which passes a pin 419 for limiting the movement of the bar and plate. Pivoted to the plate is one end of the link 420, the other end of which is pivoted to a block 421, slidingly carried in an arm 422. The arm 422 is mounted on the shaft 411 of the feed-roll. In order to adjust the point of engagement of the link with the arm, a threaded rod 423 passes through the block 421 and is provided with a head 424, by means of which it can be rotated. Rigidly secured to the arm 422 is an arm 426, to the end of which is pivoted a pawl 427, adapted to engage with a ratchet-wheel 428 on the end of the feed-roll. The pawl 427 is held in its normal position by means of a coil-spring 429, secured at one end to said pawl and at the other to the arm 426.

In order to prevent overrotation of the feed-roll, we provide the right-hand end of the same with a friction-disk 430, which is held in contact with the end of the roll by means of a coil-spring 431, surrounding the shaft 411 and bearing against the said disk and the end-plate 395. In order to prevent the disk 430 from rotating, it is provided with a short sleeve 432 and the end plate 395 is provided with a stud or pin 433, which enters the said sleeve. Below the feed-roll 410 is a rod 435, which is pivoted in the end plates 395 and 396. Rigidly secured to this rod 435 are arms 436 and 437. In these arms 436 and 437 is pivoted a small roll 438, which coöperates with the feed-roll. The arm 436 is in engagement with a cam 439, pivoted to the end plate 395 and provided with a handle 440, by means of which the said cam may be operated to throw the roll 438 out of contact with the feed-roll 410. The arms 436 and 437 are held in a normal position by means of springs 441, secured to said arms and to the end plates. Pivoted to the arms 436 and 437 are two arms 442, carrying a plate 443, adapted to bear against the feed-roll 410. These arms are held in their normal position by means of springs 445, secured to the said arms 442 and to the arms 436 and 437. The bar 414, hereinbefore described, is provided with an arm 446, to which is attached at one end a coil-spring 447, the other end being attached to the rod 435, hereinbefore described. This spring 447 holds the bar 414 in its normal position.

448 is a plate for supporting the paper. This plate is secured to the guide-bar 397 and extends from a point above the rods 400 and 402 to a point immediately below the center of the feed-roll 410. The plate 448 is adapted either to support an ordinary sheet of paper or the narrow strip of paper usually used in adding-machines. In case such narrow strip is used the roll of paper is supported on the rod 449, Fig. 1, journaled in uprights 450, carried by the casing 81.

The paper-carriage is normally held against lateral movement by the engagement of the detent 404 with the notches 403 in the rod 402. By turning this rod, however, so that the notches are moved out of engagement with the detent the carriage can be moved laterally across the machine until the desired position is reached. The finger 371 rocks the shaft 414 each time the handle is drawn forward. The movement of the shaft 414 is communicated, through the plate 417 and link 420, to the arm 422. This in turn operates the arm 426, carrying the dog 427, which engages with the ratchet-wheel 428, and thus moves the feed-roll to feed the paper forward. The amount of movement communicated to the feed-roll depends upon the position of the sliding-block 421, which can be regulated by means of the screw 423. The roll 438, coöperating with the feed-roll 410, may be drawn away from the said feed-roll by movement of the lever 440, which through the cam 439 acts on the arm 436, and thus moves the roll 438 away from the roll 410.

455, Figs. 41 and 44, represents a series of printing-hammers, which are journaled on a shaft 456, carried in the frames 87 and 88 and adapted to coöperate with the type 338 on the printing-segments 335. The hammers 455 are held in their normal position by means of springs 457, secured at one end to said hammers and at the other end to a rod 458, carried in the frames 87 and 88. Each of the printing-hammers 455 has formed in it a notch 459, which is adapted to be engaged by a hook 460. Each of the hooks 460 is pivoted to a plate 462, which is pivoted in a groove in a rock-shaft 463. The hook 460 rests against a pin 461 in the plate 462. Each of the hooks 460 is provided with a tail 464, adapted to be engaged by a blade 465, carried in a rock-shaft 466. The hooks 460 are held in their normal position with respect to the plate 462 by means of a spring 467. Each of the plates 462 is provided with a pin 468, adapted to be engaged by a comb 469, carried by the rock-shaft 463.

470 is a coil-spring attached at one end to the plate 462 and at the other to a rod 471, carried by the frames 87 and 88. The plates 462 are normally held against the tension of the springs 470 by means of detents 472 engaging with notches 473 in the said plates. These detents 472 are pivoted on a rod 474, carried by the frames 87 and 88. Each of the detents 472 is provided with a downwardly-projecting tailpiece 475. These tailpieces 475 are arranged in the path of the blade 142 of the carriage, so that the detents 472 will be released by the action of the beveled forward end of said blade upon the front edges of said tailpieces. The detents 472 are normally held in engagement with the notches 473 by means of coil-springs 476, secured at one end to the tailpieces 475 and at the other to a rod 477, carried by the frames 87 and 88. The detents 472 are also provided with upwardly-extending fingers 478, each of which carries a half-pin 479. These half-pins 479 are adapted to be engaged by the ends of the teeth of a comb 480. This comb 480 is carried by a rock-shaft 481, journaled in the frames 87 and 88. Pivoted on this rock-shaft 481 are a number of pawls 482, adapted to engage with notches 483, Fig. 31, in the periphery of the printing-sectors 335, hereinbefore described. The pawls 482 are normally held in engagement with these notches by means of coil-springs 484, secured at one end to said pawls and at the other to a cross-bar 485, carried by the side frames 87 and 88. Journaled on the shaft 481 are two plates 486 and 487, respectively. Carried by these plates 486 and 487 are two rods 488 and 489. The rod 488 is adapted to bear against the detents 482, so as to move the said detents out of engagement with the notches 483 when the plates 486 and 487 are rocked on the shaft 481. In order to move the plates 486 and 487, the plate 487 is provided with an extension 490. This extension 490 is connected to a short arm 491. The arm 491 is rigidly connected to a long arm 492 and together with it is loosely journaled on the end of the shaft 481. The lower end of the long arm 492 is provided with an antifriction-roller 493. The roller 493 engages with a track 494, Fig. 64, carried by the cam-block 191, hereinbefore described. This track 494 has an inclined portion 495 for moving the arm 492 to release the detents 482. The arm 492 is held in its normal position by means of a coil-spring 496, attached at one end to said arm and at the other to frame 88.

In order to rotate the shaft 481, and thus move the comb 480 into engagement with the pins 479, this shaft 481 has rigidly secured to its end a short arm 497. Pivoted to this arm 497 is a link 498, the end of which is attached to the repeat-key, as will be hereinafter described.

In order to rotate the shaft 463 to actuate the printing-hammers, we provide the end of said shaft with a short arm 500, to which arm is pivotally attached a link 501. The lower end of this link 501 is provided with a bifurcated portion 502, Fig. 63, which straddles the handle-shaft 148. One arm of this bifurcated portion 502 is provided with a pin 503, adapted to be acted upon by a cam 504, rigidly secured to the said handle-shaft 148. The shaft 463 is held in its normal position by a coil-spring 505, secured at one end to the link 501 and at the other to the frame 87. Secured to the opposite end of the shaft 463 is an arm 506. Pivoted to one end of the arm 506 is a link 507, the opposite end of which is pivoted to a lever 508, journaled on the ribbon-feed shaft 509. The opposite end of the lever 508 is pivoted to the feed-block 510, carrying a pair of star-wheels 511, adapted to engage with ratchet-wheels 512 and 513. The ratchet-wheel 512 is secured to the ribbon-feed shaft 509, while the ratchet-wheel 513 is carried by a ribbon-spool 514, loosely mounted on said shaft. The other ribbon-spool 515 is rigidly mounted on the shaft 509. It will be understood that by this arrangement of parts the ribbon-feed will be self-reversing. The ribbon passes from spool 514 over a pin 516, carried by the frame 88, and thence around a vertical roller 517, also carried by the said frame 88. From this roller 517 it passes between the upper row of type 338 and the paper-feed roll 410. Thence it passes around a roll 518 similar to the roll 517 and over a pin 519 to the spool 515. The arm 506 is also provided with a pin 520, adapted to engage with a downward projection 521 on a link 522. This link 522 is pivoted to the short arm 362 of the bell-crank lever 360, Figs. 1 and 30, hereinbefore described. The front end of the link 522 is guided by means of a screw 523, passing through a slot 524, formed in said link. Pivoted to the link 532 is a finger 525, which is held in its normal position by means of a coil-spring 526. The end of this finger 525 is adapted to come in contact with a pin 527, carried by an arm 528, rigidly secured to the end of the shaft 466.

When the carriage 130 is moved toward the left of the machine either by the operation of one of the order-keys or by the operation of the total-key, the beveled end of the blade 142, carried by the said carriage, comes in contact with one or more of the tailpieces 474 of the detents 472, and consequently the said detents will be disengaged from the notches 473 in the plates 462. The said plates will thus be free to move under the influence of the springs 470, so as to bring the hooks 460 into engagement with the notches 459 in the printing-hammers 455. If while the parts are in this position the handle is drawn forward so as to rock the shaft 463, the plates will be drawn back while the hooks 460 are in engagement with the hammers, and the hammers will thus be operated to deliver a printing blow upon the corresponding type of the type-sectors. In case, however, an error has been made and the error-key is depressed before the handle is drawn forward the shaft 466 will be rocked to bring the blade 465 into engagement with the tailpieces 464, thus moving the hooks 460 out of engagement with the notches 459, so that when the shaft 463 is rocked the plates 462 will be returned to their normal position without affecting the type-hammer. In case it is desired to repeat a number after it has been set up in the machine and the repeat-key is depressed the operation of the repeat-key will rock the shaft 481, thus moving the comb 480 into the position shown in Fig. 43. In this position the ends of the teeth of the comb will engage with the half-pins 479 on all the plates 478 which have been moved to release the plates 462, and consequently said plates, with their corresponding detents 472, will be held out of operative position when the repeat-key is released, and consequently the corresponding printing-hammers will be operated each time the handle is drawn forward. Each time the shaft 463 is rocked the consequent movement of the lever 506 will be communicated, by means of the curved link 507, to the lever 508. This lever 508 carried the star-wheels 511, which operate the spool 514 or 515 to feed the inking-ribbon.

Secured between the side frames 94 and 95 is a frame 535, Figs. 32, 34, 45, and 47, in which is supported the carrying mechanism, as will be hereinafter described. The forward ends of the frames 94 and 95 are provided with arms 536, which are pivoted, by means of screws 537, to the side frames 90 and 91 of the sector stop mechanism. Carried by the frames 94 and 95 is a stationary shaft or rod 538, on which are loosely mounted a number of idle wheels 539. These idle wheels 539 are adapted to engage with the teeth 372 on the segments 335 when the side frames 94 and 95 are swung on the pivots 537, but are normally out of engagement with said segments. The idle wheels 539 are separated by washers 540, surrounding the said shaft or rod 538. 541 represents detents which engage with the teeth of the idle wheels 539 and are pivoted on a rock-shaft 542, carried by the side frames 94 and 95. Rigidly secured to the rock-shaft 542 are a pair of arms 543, carrying a rod 544. This rod 544 bears against tailpieces 545 on the detents 541. The detents are normally held in position by means of coil-springs 546, secured at one end to the tailpieces 545 and at the other end to a rod 547, carried by the side frames 94 and 95. Secured to the rock-shaft 542 outside of the frame 94 is an arm 548, carrying a pin 549 for actuating the rock-shaft, as will be hereinafter described. 552 represents the order stop-pawls, which are pivoted in grooves formed in a rock-shaft 553, said rock-shaft being carried by the said frames 94 and 95. The upper ends of the order stop-pawls 552 are provided with fingers 554, Fig. 32. Adjacent to these fingers 554 is a rod 556. The fingers 554 are normally held in contact with the rod 556 by means of coil-springs 557, secured at one end to the order stop-pawls 552 and at the other to a rod 558, carried by the side frames 94 and 95. Pivoted to each of the order stop-pawls 552 is a pawl 559, the upper end of which is adapted to be thrown into engagement with the teeth of one of the idle wheels 539. The lower end of each of these pawls 559 is provided with a detent 560, adapted to engage with a notch 561, formed in the rock-shaft 553. These pawls 559 are held in their normal position by means of springs 562, secured to said pawls and bearing against pins 563 on the order stop-pawls 552. The upper ends of the pawls 559 are provided on each side with a half-pin 564 so arranged as best shown in Fig. 33, that when one of the said pawls is tripped it will trip the next pawl to the right thereof.

The adding-wheel frame 96, hereinbefore described, is loosely pivoted on a rock-shaft 566, and the lower ends of the two sides of said frames are connected by means of a cross plate or bar 567. The rock-shaft 566 is provided with a blade 568, adapted to engage with the cross-bar 567 to swing the frame 96. The rock-shaft 566 has rigidly secured to it outside of the frame 95 an arm 569, bearing at its upper end an antifriction-roller 570. This arm 569 is also provided with a finger 571 for purposes hereinafter to be described. Secured in the upper ends of the adding-wheel frame 96 is a shaft 574. Loosely mounted on this shaft 574 are the adding-wheels 575, which are adapted to be swung into engagement with the idle wheels 539, hereinbefore described. Each of the adding-wheels 575 are provided with twenty teeth adapted to engage with the teeth of the idle wheels and with two auxiliary teeth 576, carried on the sides of the wheel at diametrically opposite points. The outer ends of these teeth 576 are adapted to coöperate with the carrying mechanism, as will be hereinafter described, while their inner ends are reduced, as best shown in Fig. 28. Slidingly mounted in the shaft 574 is a comb 577, provided with teeth 578. This comb in its normal position is out of the path of the teeth 576; but when forced toward the right-hand end of the machine it is adapted to be brought into the path of the inner reduced ends of said teeth. The comb 577 is provided with a projecting end 579, by means of which the comb is moved, as will be hereinafter described. The comb is held in its normal position by means of a coil-spring 580, bearing at one end against said comb and at the other against a screw 581 in the end of the shaft 574. The side of the frame 96 adjacent to the frame 95 is provided with a projection 582, Figs. 32 and 47, for purposes hereinafter to be described.

Sliding in the frame 535, hereinbefore referred to, are a number of carrying-bars 585, corresponding in number to the adding-wheels 575. Each of the carrying-bars 585 is provided with a tooth 586, normally meshing with the teeth of one of the adding-wheels.

587 represents coil-springs attached at one end to the carrying-bars 585 and at the other to a rod 588, supported in the side frames 94 and 95. The carry-bars 585 are held in their normal position against the tension of the springs 587 by means of detents 589, pivoted on a rod or shaft 590, secured in the side frames 94 and 95. These detents 589 are held in a normal position by means of coil-springs 591, secured at one end to the said detents and at the other to the rod 558, hereinbefore described. Each of the detents 589 is provided with a pin 592, against which bears the lower end of a pawl 593, pivoted at 594 to the carrying-bar 585 at the right-hand side of the bar with which said detent engages. The upper end of each of the pawls 593 is provided with a finger 595, adapted to be tripped by the auxiliary teeth 576 of the adding-wheels. Pivoted in the frames 94 and 95 below the lower ends of the carrying-bars 585 is a rock-shaft 596, provided with a blade 597 for returning the said carrying-bars to their normal position after they have been tripped. The rock-shaft 596 is provided outside of the frame 95 with an arm 598, carrying at its end an antifriction-roller 599. The rock-shaft 596, together with the blade 597, and arm 598, are held in their normal position by means of a coil-spring 600, secured at one end to the arm 598 and at the other to a pin 601, secured in the frame 95.

The idle-wheels 539 and the adding-wheels 575 are normally in the position shown in Fig. 32, so that when the type-sectors 335 are released no movement will be communicated to either set of wheels. When, however, the type-sectors are returned by the pull of the handle, the idle-wheels 539 are first moved into engagement with the teeth 372 on the type-sectors 335, and the adding-wheels 575 are next moved into engagement with the said idle wheels, so that when the type-sectors are returned to their normal position their movement will be communicated through the idle wheels to the adding-wheels. In case any of the adding-wheels 575 are moved such a distance as to require the carrying of one to the next left-hand adding-wheel the auxiliary tooth 575 will come in contact with the finger 595 on the pawl 593 of the corresponding adding-bar. The action of this pawl 593 on the pin 592 of the pawl 589 of the next left-hand bar will move the said pawl 589 out of engagement with the bar, and thus release the bar, so that upon pull of the handle the corresponding adding-wheel will be moved forward one tooth, thus carrying one to the next left-hand order. The pawls 552, which we have termed the "order stop-pawls," are used to stop the carriage in the required order whenever the sum is taken. Whenever the total-key is depressed to take the sum, the shaft 553 is rocked so as to bring the pawls 559 into engagement with the teeth of the idle wheels 539. If now any of the idle wheels are rotated, the pawls 559 will be operated to release the detents 560 from engagement with the notches 561 in the rock-shaft, so that the pawls can move under the influence of the springs 557, and thus be moved out of the path of the tailpiece 134 of the carriage. Whenever one of the pawls 559 is released, all the pawls to the right thereof will also be released, owing to the interlocking action of the half-pins 564, carried by the various pawls.

In order to actuate the rock-shaft 553, we rigidly secure to the end of said shaft outside of the frame 94 an arm 602, Fig. 34, carrying a pin 603, adapted to coöperate with the total-lever, as will be hereinafter described. The side frames 95 and 94 are provided with inclined faces 604, which coöperate with cams, hereinafter to be described, for swinging the rear section of the machine to throw the idle wheels into engagement with the type-sectors. In order to limit the movement of the rear section, we provide the frames 94 and 95 with pins 605, adapted to strike against the frames 92 and 93. In order to limit the movement of the frame 96 when it is swung to bring the adding-wheels into engagement with the idle wheels, we provide the frame 94 with a stop 606, against which the projecting end of the shaft 574 strikes. To retain the adding and idle wheels in mesh, we pivot to the frame 93 a hook 607, adapted to engage the shaft 574. The hook 607 is under the tension of a coil-spring 608, secured at one end to said hook and at the other end to the frame 93. The hook 607 is provided with a downward extension 609, carrying a pin 610, by means of which the shaft 574 is released when the total-lever returns to its normal position, thus allowing the adding-wheels to move out of mesh with the idle wheels.

Rigidly secured to the handle-shaft 148 outside of the casing 81 is an arm 620, Fig. 1, carrying on its upper end a handle 621, by means of which the machine is operated. Secured to the shaft 148 inside of the frame 84 is an arm 622, Fig. 76. To this arm 622 is pivoted one end of a short link 623. To this link 623 is attached a coil-spring 624, the opposite end of which is attached to the frame 98, as shown in Fig. 1.

625 is a long link which is pivoted at one end to the arm 622 and at the opposite end to a toothed sector 626 (see also Figs. 66 and 67) by means of a screw 627. The link 625 carries near its central part a pin 628, to which is attached one end of a coil-spring 629, Fig. 1, the opposite end of which is secured to the frame 98. The spring 629, together with the spring 624, serves to return the handle 620 and connected parts to their normal positions after the said handle has been drawn forward. The toothed sector 626 is rigidly secured to a sleeve 630, loosely mounted on a shaft 631. This shaft 631 is mounted in the end of frames 97 and 98. Secured to the opposite end of the sleeve 630 is a plate 632, adjacent to which is an annular member 633. Formed in the annular member 633 is a notch 634, adapted to receive one end of a pawl 635, which is pivoted at 636 to the plate 632. The end of the pawl 635 is normally held in the notch 634 by means of a spring 637, attached at one end to the plate 632 and at the other end to a pin 638, passing through a slot 639 in the plate 632. This pawl 635 is adapted to coöperate with the roller 599 on the arm 598, so as to operate the carrying-bars hereinbefore described. The pawl is so arranged that when the handle is drawn forward it passes over the roller 599, and hence the shaft 596 is not operated, and consequently the carrying-bars are not affected. When, however, the handle returns to its normal position, the pawl engages the roller, as shown in Fig. 68, so that the shaft 596 is operated and the blade 597 is moved against the lower ends of the carrying-bars, thus operating all the carrying-bars which have been released to carry.

640 is a plate attached to the cross-bar 132 (see Figs. 4 and 48) and loosely surrounding the shaft 631. This plate 640 has an upward extension carrying a pin 641, upon which rests the finger 571 of the arm 569. The pin 641 is rigid and simply serves to hold the arm 569 in its normal position when it is not operated on by the cam hereinafter to be described.

The toothed sector 626 engages with a second toothed sector 645, Figs. 1, 71, and 72, rigidly secured to the rock-shaft 646. This rock-shaft 646 is pivoted in the frames 97 and 98. Slidingly mounted in the shaft 646 is a bar 647. Secured to this bar 647 are two short collars 648, attached to each of which is a cam 649. These cams 649 when in their normal position are adapted to coöperate with the inclined faces 604 on the side frames 94 and 95, so as to swing the rear section of the machine when the rock-shaft 646 is moved, and thus bring the idle wheels 539 into engagement with the type-sectors 335. When, however, the bar 647 is moved, the cams 649 will be moved out of contact with the faces 604. The collar 648 at the right-hand end of the machine is also provided with a finger 650, which is adapted to come in contact with the projection 582 on the swinging frame 96, so as to hold the adding-wheels 575 firmly in engagement with the idle wheels 539. The sliding bar 647 is also provided with two inclined projections 651 and 652, respectively. By means of these inclined projections 651 and 652 the bar 647 is moved when the error-key or total-key is operated, as will be hereinafter described. The projection 651 is operated on by the error-key, and the projection 652 is operated on by the total-key. Secured to the right-hand end of the shaft 646 is a short collar 653 and to the left-hand end a similar collar 654. To each of the collars 653 and 654 is secured a cam 655. These cams 655 coöperate with rollers 656, Figs. 50 and 59, secured in the ends of short arms 657, carried by the cradle-arms 658, which bear upon the pins 32, hereinbefore described. These cradle-arms 658 are rigidly secured to a shaft 659, journaled in the end frames 97 and 98. The shaft 659 is movable longitudinally in the frames 97 and 98 and is held in its normal position by means of a coil-spring 660, surrounding the said shaft and bearing at one end against the frame 98 and at the other end against one of the cradle-arms 658. The opposite end of the shaft 659 is surrounded by a collar 661, provided with a notch 662, (see also Fig. 78,) in which is a rounded projection 663, carried by the frame 97. In order to rotate the collar 661, and thus move the shaft 659 longitudinally, the said collar 661 is provided with an arm 664. This arm 664 is provided with a pin 665, which is engaged by the bifurcated end of an arm 667, which arm is rigidly secured to the repeat-key bar 668. This bar 668 is provided at its forward end with a repeat-key 669, Figs. 2 and 3.

The object of moving the shaft 659 longitudinally when the repeat-key is depressed is to move the antifriction-rollers 656 out of engagement with the cam 655, so that when the handle is drawn forward the cradle-arms 658 will not be operated, and consequently the sector-stops will not be returned to their normal position.

Secured to the repeat-key bar 668 by means of a screw 670, Figs. 5 and 62, is an L-shaped piece 671. Between the bar 668 and the arm of the L-shaped piece 671 is a pin 672, which is carried upon an arm 673. This arm 673 is rigidly secured to a rock-shaft 674, journaled in the plates 122, hereinbefore described. (See also Fig. 12.) The rock-shaft 674 is provided with two upwardly-extending arms 675, each of which is provided with an inwardly-extending pin 676, (see also Fig. 4,) adapted to engage with the slots 332, with downturned parts 331 of the locking-plate 323, so as to move the said locking-plate when the repeat-key is operated. The object of the above-described connections is to move the locking-plate 323 when the repeat-key is depressed, thus locking all the sector-stops which have been raised in their raised position and also locking those which have not been raised in their normal position. Adjacent to the L-shaped piece 671 the bar 668 is provided with a pin 678, passing through a short slot 679 in the lower end of the link 498, hereinbefore described. The object of this connection is to operate the rock-shaft 481 when the repeat-key is depressed, thus moving the teeth of the comb 480 into the path of the pins 479 on the detents 478, so that all the printing-hammers which have been actuated to operate before the repeat-key is depressed will be again operated each time the handle is drawn forward until the repeat-key is released. Adjacent to this pin 678 the bar 668 is provided with a curved guide 680. This guide 680 coöperates with an inward projection 681 and the end of the arm 240, hereinbefore described. The object of the guide 680 is twofold—first, when the repeat-key is not depressed the pin 681 passes below the guide 680 each time the handle is drawn forward, and consequently the repeat-key cannot be operated while the handle is out of its normal position; second, when the repeat-key is depressed and the handle is drawn forward the pin 681 passes above the guide 680, and consequently locks the repeat-key in its depressed position, so that it cannot return to normal position until the stroke has been completed and the handle is again in its normal position. The bar 668 is also provided with a pin 682, which normally engages with a shoulder 683, formed in the locking-hook 304, hereinbefore described. When, however, the bar 668 is depressed, this pin is brought into position to engage with a notch 684 in said hook. The object of the hook 304 is to lock the repeat-key in its depressed position. This will take place whenever the toothed segment 269, Fig. 19, is moved out of its normal position. Consequently the repeat-key will remain in its depressed position until the handle has been operated a sufficient number of times to return the toothed segment to normal position.

The rock-shaft 646, Figs. 71 and 75, has secured to it adjacent to the collar 653 a disk 690. This disk 690 is provided with a reduced portion 691, forming a guide for the antifricton-roller 382 (see also Fig. 48) on the arm 381. This reduced portion 691 terminates in an incline or cam face 692, which is adapted to operate the arm 381 through the roller 382.

693 is a cam-block carried on an arm 694, pivoted, by means of a pin 695, to a stud 696 on the said disk 690. This cam-block 693 is provided with an incline face 697, adapted to operate the arm 381 when the disk is moved in one direction. The other end of the cam-block is provided with a beveled face 698, by means of which the cam-block is forced out of the path of the roller 382 when the disk is moved in the opposite direction. The cam-block is held in its normal position by means of a spring 699, secured at one end to the arm 694 and at the other to a pin 700, secured to the disk 690. This spring 699 passes through an opening 701 in the disk 690. The action of the cams 692 and 697 on the arm 381 rocks the shaft 387, thus bringing the angular bar 380 into engagement with the teeth of the type-sectors, thus accurately alining the said type-sectors prior to printing. The disk 690 also has pivoted to it by a pin 702 a curved guide 703, adapted to coöperate with the anti-friction-roller 570 on the ram 569. The guide 703 is provided with a pin 704, extending through a slot 705 in the disk 690 and attached to one end of a coil-spring 706, the opposite end of which is attached to the disk 690 by a pin 707. The action of the guide 703 on the arm 569 rocks the shaft 566 so as to bring the blade carried by said shaft into contact with the cross-bar 567 of the frame carrying the adding-wheels, thus moving the adding-wheels into engagement with the idle wheels. The guide is so arranged that in one operation of the machine the wheel passes along one side of the guide and is operated, while in another operation of the machine the wheel passes along the other side of the guide and is not operated. The disk 690 is also provided with a pin 708, passing through a slot 709 in one end of a link 710. The opposite end of the link 710 is provided with a slot 711, through which passes the pin 366 of the arm 367, hereinbefore described. The link 710 thus connects the disk 690 with the arm 367 of the rock-shaft 336, and consequently when the disk is operated the shaft 366 is actuated to return the type-sectors to their normal position. The object of the slots 709 and 711 is to allow a certain amount of lost motion between the disk and the shaft.

Secured to the rock-shaft 646 adjacent to the collar 654 is a disk 712. This disk 712 is provided on one side with an antifriction-roller 713 and at the other with a pin 714. This roller 713 and pin 714 are adapted to coöperate with parts attached to the total-key, as will be hereinafter described.

720, Fig. 1, is the error-key, carried by the error-key bar 721. The error-key bar 721 is secured to a plate 722, (see also Fig. 17,) loosely pivoted on a shaft 723, Figs. 2, 48, 55, and 56, carried in the frames 97 and 98. The plate 722 is provided with a downwardly-projecting end 724, to which is attached one end of a link 725, the opposite end of which is pivoted to a member 726, Fig. 65, loosely surrounding the collar 630 on the shaft 631. The lower end of this member 726 is attached to mechanism for locking the keys, which will be hereinafter described. The plate 722 is provided with a pin 727, which projects over the arm 657, so that when the error-key is depressed the cradle-arms 658 will also be depressed to return any of the sector-stops which have been elevated. The cradle-arm 658 adjacent to the plate 722 is provided with a pin 728, which is normally out of the path of the downward extension 724 of the said plate 722; but when the shaft 659 is moved longitudinally this pin 728 is moved into the path of the downward extension 724, so that the error-key cannot be depressed while the repeat-key is depressed. The bar 721 is connected with the long arm 361 of the bell-crank lever 360 by a screw 729, passing through a slot 730 in the bar and entering the said arm 631, as shown in Fig. 1. The connection of the bar 721 with the bell-crank lever 360 operates the rock-shaft 357 when the error-key is depressed, thus bringing the cross-rod 559 against any of the type-sectors which have been released and returns the said type-sectors to their normal position.

732, Fig. 2, is the total-key carried by the total-key bar 733. This key-bar 733 is secured to a plate 734, Figs. 55, 56, 60, and 61. The plate 734 is loosely mounted on the shaft 723, hereinbefore described, and is provided with a downward extension 735, which is connected, by means of a link 736, with an arm 737, rigidly secured to the rock-shaft 631, as best shown in Fig. 56. The rock-shaft 631 is provided with a pair of disks 738, Fig. 67, each provided with a flattened portion 739, upon which flattened portions rests the lower edges of the end frames 94 and 95, so that when the shaft 631 is rotated by the depression of the total-key the rear section of the machine will be swung so as to bring the idle wheels 539 into mesh with the teeth of the type-sectors 335. The plate 734 has secured to its inner face a bevel-edged plate 740, Fig. 60, adapted to coöperate with the rounded end 579 of the comb 577 when the total-key is depressed. The said plate 734 also has secured to its inner face a rounded plate 741 for engaging with the projecting end of the shaft 574, so as to hold the adding-wheels firmly in engagement with the idle wheels when the total-key is depressed. Loosely mounted on the shaft 723, adjacent to the plate 734, is an arm 742. This arm 742 is provided with a flange 743, adapted to coöperate with the beveled extension 652 of the sliding bar 647 and to engage with a notch 744 in the said extension, as best shown in Figs. 60 and 61. The plate 742 is normally held against a pin 745 in the plate 734 by means of a coil-spring 746, secured at one end to the said arm 732 and at the other to the plate 734. Pivotally connected to the arm 742 is a plate 747, the end of which rests against the flange 743, hereinbefore described. This plate 747 is held in its normal position by means of a coil-spring 748, attached at one end to the said plate and at the other to the arm 742.

When the total-key is depressed, the action of the flange 743 on the beveled projection 652 moves the bar or feather 647 longitudinally and the flange engages with the notch 744 in the said projection, so that the bar is held in its altered position even after the total-key has returned to its normal position, and consequently the said bar or feather 647 cannot return to its normal position until the handle has been drawn forward to rock the shaft 646, and thus move the projection 652 out of engagement with the said flange 743. The pivoted plate 747 is not necessary to the operation of the machine, but is simply provided in order to secure sufficient room for the required movement.

Loosely mounted on the shaft 723, adjacent to the arm 742, is a stop 749, adapted to engage with the roller 713 on the disk 712, Fig. 55. This stop 749 is provided with a pin 750, which is normally held in engagement with a pin 751 in the plate 734 by means of a coil-spring 752, attached at one end to the said stop and at the other to the downward extension 735 of the plate 734. The object of the stop 749 is to engage with the roller 713 on the disk 712 when the total-key is held down during the movement of the handle, and thus prevent the complete return of the handle until the total-key is released. The plate 734 is provided with two cam-slots 753 and 754, which engage with the pins 603 and 356, respectively. The said plate is also provided with a cam-surface 755, adapted to operate the pin 549. The total-key bar 733 is provided with an upward extension 756, to which is pivoted the catch 757, adapted to engage the finger 385 of the cam 384, hereinbefore described. This catch 757 is held in its normal position by means of a coil-spring 758, Fig. 56, secured at one end to the said catch and at the other to the total-key bar 733. The catch 757 is provided with a finger 759, which engages with a pin 760 on the side frame 94. The total-key bar 733 also has pivoted to it a lever 761, provided with a catch 762, which is adapted to engage with the pin 390 of the arm 383. The lever 761 has an upwardly-extending portion 763, adapted to engage with the pin 714 on the disk 712, so as to release the catch 762 from the pin 390.

The engagement of the catch 762 with the pin 390 holds the angular bar 380 in engagement with the teeth on the type-sectors, so that the type-sectors are held in alinement. When, however, the handle returns to its normal position after the depression of the total-key the pin 714 will come in contact with the extension 763 of the lever 761, thus releasing the catch 762 from the pin 390, so that the said angular bar may return to its normal position.

Extending across the front of the machine and under the key-bars is a stationary comb 765, Figs. 3 and 77, provided with slots 766, adapted to receive the lower edges of the key-bars. This comb 765 is carried by uprights 767 upon the bed of the machine 80.

768 is a movable comb which is attached to the stationary comb 765 by means of screws 769, passing through slots 770 in the said movable comb. The movable comb 768 is provided with slots 771, normally registering with the slots 766 in the fixed comb 765. The comb 768 is held in its normal position by means of a coil-spring 772, attached at one end to the said movable comb and at the other to a pin 773, passing through a slot 774 in said comb.

The object of the fixed and movable comb is to lock the order and numeral keys against depression during various operations in the machine, so as to prevent injury to the machine by the operation of these keys at improper times, as when the error-key is depressed or when the total-key is depressed or during the movement of the operating-handle.

The comb 768 is provided at one end with an incline 775, adapted to engage with the repeat-key bar 668 when the said bar is depressed, so as to move the comb toward the right and lock all the remaining key-bars.

The shaft 631 is provided with an arm 778, Fig. 56, to which is pivoted the upward extension 779 of a locking-bar 780. The end of this locking-bar 780 projects through an opening 781 in the fixed comb 765 and an opening 782 in the movable comb 768.

783 is a locking-cam which is slidingly connected to the locking-bar 780 by means of screws 784, passing through a slot 785 in the said cam and into the locking-bars 780. The cam-bar 783 is held in its normal position by means of a spring 786, attached at one end to the said cam and at the other to the locking-bar 780. The forward beveled end of the cam-bar 783 is adapted to engage with the movable comb 768 when the total-key is depressed, and so move the said comb to lock all the key-bars. The locking-bar 780 has secured to it a plate 787, provided with an incline face 788, as best shown in Figs. 5 and 62. This incline face 788 is adapted to engage with the finger 173, Fig. 15, on the lever 169, hereinbefore described, and thus operates said lever when the locking-bar is moved forward by the depression of the total-key. The said locking-bar is also provided with an upward extension 789, adapted to engage with the pin 790 on the repeat-key bar 668, so that the total-key cannot be depressed while the repeat-key is depressed. At the opposite side of the machine is a second locking-bar 791, Figs. 65 and 76, provided with an upward extension 792. Formed in this upward extension 792 is a slot 793. This slot 793 embraces a reduced portion of the handle-shaft 148 and is provided at its lower side with a notch 794, adapted to be engaged by a pin 795 in the handle-shaft, so that the locking-bar 791 will be operated whenever the handle-shaft 148 is rotated. The locking-bar 791 is provided with a sliding cam-block 796. This cam-block projects through openings in the fixed and movable combs 765 and 768, respectively, as shown in Fig. 3, and is provided with a beveled face 797, which operates the movable comb to lock the key-bars when the cam-bar 791 is moved to the rear. The cam-block 796 is secured to the bar 791 by means of screws 798 passing through a slot 799 in the said cam-block. The cam-block is held in its normal position by means of coil-spring 800, secured at one end to said cam-block and at the other to the locking-bar 791. A third locking-bar 801 is arranged adjacent to the locking-bar 791 and is pivoted at its rear end to the member 726, hereinbefore described. This locking-bar 801 is provided at its forward end with a cam-block 802, (see Fig. 3,) which is in all respects like the cam-block 796, hereinbefore described, and therefore will not be described in detail. The locking-bar 801 is also provided with an upward extension 803, which engages with the pin 804 on an arm 805. This arm 805 is rigidly secured to the cam-block 191, hereinbefore described, so that when the locking-bar 801 is moved to the rear by means of the error-key the cam-block 191 will be rotated to return the carriage of the machine to its normal position.

808, Figs. 2, 3, 51, and 53, is a shaft which is supported in brackets 809, formed on the plate 86, hereinbefore described. This shaft 808 has loosely mounted on it a number of members, each consisting of a pair of plates 810, rigidly connected by means of two pins 811. Each of the plates 810 is provided near its lower end with a recess 812 and an inclined face 813, the recess and face of the two plates of the pair being turned in opposite direction. Each of the plates 810 is also provided with a half-pin 814, as best shown in Fig. 53, which half-pin engages with a corresponding half-pin of the adjacent plate of the next pair. The key-bars 101 and 146 are each provided with a pair of pins 815, adapted to engage with the inclined faces 813 when one of the said bars is depressed, so as to cause the recesses 812 of the remaining plates to engage with the pins of the remaining key-bars, and thus lock the said key-bars against movement. The various pairs of bars 810 are separated by washers 816, surrounding the shaft 808.

820, Figs. 1 and 2, is a removable portion of the casing 81. This portion 820 is adapted to cover the upper front part of the machine, where the type-sectors are exposed when keys are depressed. The casing 820 is provided with a glazed portion 821, through which the type-sectors may be seen. The portion 820 engages with the main portion of the casing by means of hooks 822, as best shown in Fig. 1, and by means of a lock 823, also shown in Fig. 2. When the bolt of the lock 823 is moved to engage with the main portion of the casing 821, the removable portion 820 will be firmly held in position. When, however, the bolt of the lock is released from the main casing, the removable portion 820 can be slightly tilted and withdrawn from the machine, so as to leave the upper and forward part of the machine exposed.

The operation of our machine is as follows: The order-key 145, corresponding to the numerical order of the left-hand digit of the required number, is first depressed. This swings the corresponding key-bar 146, Figs. 10 and 12, on its pivot, thus elevating its rear end. The elevation of the rear end of the bar 146, by means of the cross-rod 180, swings the cradle 178, Figs. 8 and 64. The pin 221, carried by the cradle 178, acts upon the arm 218 to move the hook 215 out of engagement with the tailpiece 212 on the yoke 206, Figs. 16 and 18, so that the handle 621, Fig. 1, cannot be drawn forward while the order-key is depressed. The swinging of the cradle 178 on its pivot also acts, through the pin 177, Figs. 5 and 15, upon the pin 176, carried by the downward extension of the U-shaped lever 169. This raises the left-hand end of said lever and through the pin 168 raises the pawls 157 and 158 out of engagement with the rack 156, so that the carriage 130 can be moved toward the left by the spring 185, Fig. 3. The end of the key-bar 146 is, however, interposed in the path of the carriage 130, so as to limit its movement, and thus bring it into the proper numerical order. The projection 151, Fig. 12, upon the lever 146 engages with the locking-plate 150, so that the key-bar cannot return to its normal position until the carriage has reached its destination. As the carriage reaches its destination the pin 154 on the plate 152, Figs. 13 and 14, secured to the lower side of the carriage, strikes against the end of the key-bar 146, and thus forces the tailpiece 153 against the locking-plate 150, thus releasing the locking-plate and allowing the return of the key-bar. The return of the key-bar allows the cradle 178 to move back into its normal position, thus dropping the pawls 157 and 158 into engagement with the rack 156, and thus locking the carriage in the position desired. The movement of the carriage also controls the action of the printing-hammers. As the carriage moves toward the left the beveled forward end of the blade 142, carried by the carriage, as best shown in Fig. 4, comes in contact with the rear edges of the tailpieces 475 of the detents 472. (See Fig. 43.) This disengages the said detents from the plate 462, so as to allow the said plates to move under the influence of the spring 470, so as to bring the hook 460 into engagement with the shoulder of the printing-hammers 455. When the handle is drawn forward to print and register the number, as will be hereinafter described, the engagement of the hooks with the hammers will cause the desired number of hammers to be operated. After the carriage has been positioned in the desired order, as above described, one of the digit-keys 100, bearing the digit of the first order of the desired number, is depressed. This will swing the corresponding key-bar 101 on its pivot. Supposing that the "9" key is the one that is struck, the stop 106, Figs. 5 and 12, on said key-bar will depress the cross-bar 116, thus swinging upwardly the front end of the rear cradle 111. The cross-bar 112 of this cradle will operate upon the rear pin 135 of the carriage, thus elevating the sector-releasing bar 312 of the order in which the carriage is situated. This sector-releasing bar 312 will come in contact with the pin 349, Fig. 31, on the lever 348, thus moving the detent 344 out of engagement with the pin 343 on the type-sector and releasing the said type-sector. The type-sector will now swing under the influence of the spring 373 until it is stopped by the engagement of its downward projection 337 with the fixed stop 330. If any other digit-key than the "9" key had been depressed in addition to the stop 106 on the key-bar, the stop 107 would have raised a second cradle 112, so as to move another of the pins 135 in the carriage, thus raising one of the sector-stops 312 into the path of the downward projection 337 of the type-sector 335, so that the said sector would be stopped in position to bring the type corresponding to the keys struck into position to print on the roll 410. The sector-stops 312 are held in their raised position by the spring-detents 315. These detents 315 by reason of their form also serve to completely raise any sector-stop which has been only partially raised by the action of the pin 135, and thus insure the proper operation of the machine. The periphery of each type-sector is provided with numbers, as shown in Fig. 54, so that the operator can see the number set up in the machine before pulling the handle, and if the number is incorrect he can remove it by the use of the error-key, as will be hereinafter described. The bar 101 also depresses the rod 166, and thus swings the cradle 165 on its pivot. The movement of the cradle 165 swings the lever 160 through the pin 162 and arm 161, as said pin 162 rests on the rod 164 of the cradle. The movement of the lever 160 draws the dog 158 toward the left, so that it engages with the next notch of the rack-bar 156. When the key is released, the lever 160 is moved back to its normal position by the spring 167, Fig. 5, and through the dog 158 feeds the carriage one space to the right, so that it is in position for the next figure. As soon as the various type-sectors 335 have been positioned the operating-handle 621 is drawn forward. The forward movement of this handle 621 rotates the main shaft 148, thus drawing the carriage back to its normal position by means of the cam 190 acting on the roll 189, Fig. 3, and thus swinging the lever 187. The motion of the lever 187 is communicated through the link 186 to the lever 183, controlling the movement of the carriage. At the same time the movement of the shaft 148 is communicated through the arm 622 and link 625 (see also Figs. 1 and 76) to the toothed sector 626. The motion of this toothed sector 626 is communicated to the toothed sector 645, thus rotating the shaft 646, carrying said sector. The rotation of the shaft 646 rotates the disk 690, carried by said shaft, thus bringing the inclined face 697 of the cam-block 693, Figs. 72 and 75, into contact with the downwardly-projecting arm 381, Figs. 48 and 49, on the shaft 378. This rocks the said shaft 378, bringing the angular bar 380 into engagement with the teeth of the type-sectors 335, and thus bringing the type into perfect alinement. The rotation of the shaft 646 through the action of cams 655 on the roller 656, Fig. 50, rocks the cradle 658, thus causing the ends of the cradle-arms to bear upon the pins 321, thus forcing the rods 318 downwardly. This forces the plate 317, Fig. 27, downwardly, returning all the sector-stops which have been elevated to their normal position. The plate 317 is returned by the action of the springs 320, surrounding the rods 318. At the same time the bar 501, Figs. 3 and 63, is drawn downward by the action of the cam 504 on the pin 503. This operates the arm 500, thus rocking the shaft 463, so as to operate all of the plates 462, Figs. 31, 43, and 44, which have been released by the action of the carriage on the tailpieces 475 of the detents 472. The movement of these plates 462 will draw back the corresponding hammers 455 by means of the hooks 460. When, however, the hooks have reached their normal position, they will release the hammers 455 and allow them to impinge against the type 338, which have been brought into alinement with the printing-roll, and thus print the desired number. The right-hand end of the shaft 463 has secured to it the arm 506, Fig. 41, and the movement of the shaft is communicated through this arm and the link 507 to the lever 508 of the ribbon-feed mechanism. The upper end of the lever 508 will be thus moved toward the rear, and hence will be in position to feed the ribbon upon the return of the handle. As the ribbon-feed mechanism is in itself old, its operation will not be particularly described. At the same time that the printing is taking place the roller 493 on the end of the lever 492, Figs. 41 and 64, will come in contact with the incline 495 on the cam-block 191, and thus move the said lever 492 to rock the plate 487. The rocking of this plate 487 will cause the cross-bar 488 to engage the detents 482 and move them out of engagement with the printing-sectors. At the same time the rotation of the shaft 646, Figs. 10, 47, 71, and 73, through the action of the cams 649 on the beveled faces 604 of the side frames 94 and 95, will swing the rear section of the machine on the pivots 537, Figs. 32 and 34, thus bringing the idle wheels 539 into engagement with the teeth 372 of the type-sectors 335. The engagement of the antifriction-roll 570, Figs. 47 and 48, on the lever 569 with the guide 703 (see also Figs. 71 and 75) on the disk 690 will rock the shaft 566 so as to bring the blade 569 into engagement with the cross-bar 567, and thus swing the adding-wheels 575 into engagement with the idle wheels 539. Upon the return movement of the disk 690, however, the roller 570 will pass along the inside of the guide 703, so that the adding-wheels may be held in engagement with the carrying mechanism. The further movement of the shaft 648 brings the stop 650, Fig. 47, into engagement with the projection 582 on the frames 96, so as to hold the adding-wheels and idle wheels firmly in engagement. After the idle wheels have been brought into engagement with the type-sectors and the adding-wheels into engagement with the idle wheels the bar 380 is allowed to drop out of engagement with the teeth of the type-sectors by the movement of the cam-block 693 out of engagement with the roll 382. At the same time the movement of the disk 690 is communicated through the link 710 to the lever 367, and consequently to the cross-bar 366. The previous movement of the disk 690 has not been communicated to the said levers because of the slots 709 and 711 in the link 710. As the cross-bar 366 is moved in the slots 365, Figs. 30 and 32, it comes in contact with the various type-sectors which have been released and returns them to their normal position, thus moving the corresponding idle wheels and adding-wheels a distance proportional to the amount of movement of the various sectors. As the cross-bar 366 reaches its extreme position the roll 382, Fig. 48, comes in contact with the incline 692, thus again moving the angular bar 380 into engagement with the teeth of the type-sectors and causing the inturned end 389 of the rod 388 to engage with the rod 368, carried by the arm 367, thus locking the said arm in this position, and consequently holding the cross-bar 366 against the type-sectors. A further movement of the disk 690 is allowed by the slots 709 and 711 in the link 710. Upon the return movement of the handle the link 710 is a second time brought firmly against the rod 366, so as to again force the rod against the type-sectors and cause the locking of any sector which might have failed to catch on the first movement. As soon as the roller 382 passes down the incline 692 the rod 388 will release the rod 368, so that the arms 367 and cross-bar 366 can return to their normal position. At the same time the rear section of the machine is allowed to swing back to its normal position and bring the idle-wheels out of engagement with the type-sectors and to bring the adding-wheels into engagement with the teeth 586 of the carrying-bars 585. At the same time the above operations are taking place the cams 655, Figs. 50 and 71, on the collars 653 and 654 will act upon the rollers 656 (see also Fig. 59) of the arms 657, thus forcing the cradle 658 downward and through the pins 321, moving the plates 317 and 323, Figs. 24, 27, 31, and 32, downwardly. The plate 317 by coming in contact with the pins 316 on the sector-stops 312 will return any of the said stops which have been raised to their normal position. During the forward movement of the handle the roller 599, Figs. 47, 48, 68, and 69, on the arm 598 will pass between the collar 633 and the pawl 635, so that the rock-shaft 596 will not be operated. This is permitted by the spring 637 and slot 639. Upon the return movement of the handle, however, the roller 599 will be engaged by the pawl 635, so as to operate the rock-shaft 596 and bring the blade 597, Fig. 45, into contact with the lower end of any of the carrying-bars 585 which have been released, thus returning said carrying-bars and causing them to move the corresponding adding-wheels one tooth forward. When the key 145 is depressed, as hereinbefore described, the pins 815, Figs. 51 and 53, on the key-bar strike the inclined faces 813 of the adjacent plates 810, so as to move all of the said plates to the left of said bar toward the rear and to move all of those to the right of the bar toward the front of the machine, so that the engagement of the notches 812 with the pins 815 of the remaining key-bars will lock all said key-bars against motion, and hence no other key can be depressed until the first key has been returned to its normal position. As this action takes place each time any one of the keys 100 or 145 is depressed, it will not be hereinafter described. When the first key-bar 101 is depressed, the movement of the cradle 165, Fig. 8, will cause the pin 231 to strike against the tailpiece 232 of the locking-pawl 233 and cause said pawl to engage with the pin 230 on the cradle 178, so as to lock said cradle in position, and consequently to prevent the depression of any of the order-keys 145. The locking-pawl 233 will remain in this position until the handle is drawn forward. When the handle is drawn forward, the cam 238, Fig. 64, will strike against the arm 237 and return the locking-pawl 233 to its normal position, so as to again leave the order-keys free to be depressed. When the handle is drawn forward, the pin 795, Fig. 65, in the handle-shaft 148 will engage with the notch 794, so as to move the lock-bar 791 toward the rear of the machine. This will cause the inclined face 797 of the cam-block 796 to engage with the movable comb 768, Fig. 77, so as to move the slots 771 out of register with the slots 766 of the fixed comb 765, and thus lock all the key-bars against movement while the handle is in its forward position. The cam-block 796 is slidingly mounted, as has been hereinbefore described, so that in case anything should obstruct the movement of the comb the bar 791 can be drawn to the rear without moving the cam-block, the connection between the cam-block and bar being by means of the spring 800. If after depressing the keys to move the type-sectors into position it is found by inspection of the figures on the periphery of the sectors that the wrong number has been placed in the machine, the number can be removed before drawing forward the handle 621 by depressing the error-key 720, Fig. 1. Upon depressing the error-key 720 the pin 727, Fig. 17, on the plate 722 will engage with the arm 657 adjacent to it, and so swing the cradle 658, (see also Figs. 50 and 59,) and thus cause the sector-stops which have been elevated to return to their normal position by means of the plate 317. At the same time the bell-crank lever 360, Figs. 1, 27, and 30, will be operated by means of its connections with the bar 721 of the error-key. As the bell-crank lever 360 is rigidly connected to the rock-shaft 357, the movement of the bell-crank lever will operate this rock-shaft. This will cause the arms 358, which are rigidly secured to the rock-shaft, to be moved toward the rear, thus bringing the cross-bar 359, carried by said arms, into contact with the type-sectors 335, which have been released, and thus return said type-sectors to their normal position. Before the type-sectors can be returned, however, it is necessary to disengage the detents 482 from the said sectors. This is accomplished by the movement of the cam-block 191 in the same manner as hereinbefore described, except that the said block instead of being operated by the handle is operated by the locking-bar 801, as hereinafter described. As the sector-stops have been returned to their normal position, as hereinbefore described, the detents 344 will be free to engage the pins 343 on the sectors, and thus lock them in their normal position. The short arm of this bell-crank lever 360 is pivoted to the lever 522, Fig. 41, and hence this lever will be drawn toward the rear of the machine. As the lever 522 moves toward the rear end the pivoted finger 525 will come in contact with the pin 527 on the arm 528, and thus move said arm, and consequently operate the rock-shaft 466 to bring the blade 465, Fig. 43, against the tailpieces 464 of the hooks 460, which have been brought into engagement with the printing-hammers. The action of the blade 465 on the tailpieces 464 will raise the hooks 460 out of engagement with the shoulders 459 of the printing-hammers without disturbing said hammers. The further movement of the bar 522 will bring the downward projection 521 into engagement with the pin 520 on the lever 506, and so operate the rock-shaft 463 to return the plates 462, which have been released, to their normal position, so that they will be engaged by the detents 472. As the lever 522 moves toward the rear of the machine the downward motion of the pin 527 will carry it out of engagement with the finger 525. The pin together with the arm 528 can then immediately return to its normal position, the upward movement of the pin 527 being allowed because of the pivotal movement of the finger 525. The movement of the error-key is communicated through the link 725, Figs. 17 and 65, to the locking-bar 801, which moves the comb 768 in the same manner as the locking-bar 791, hereinbefore described, so that none of the keys can be depressed while the error-key is depressed. At the same time the upward extension 803 of the locking-bar 801, through the pin 804 and arm 805, rotates the cam-block 191 and returns the carriage in the same manner as when the handle is operated and also releases the detents 482, as has been hereinbefore described. The movement of the cam-block independently of the handle-shaft 148 is permitted by the slot 197, Fig. 64. If after a number has been set up in the machine, as hereinbefore described, it is desired to repeat said number several times, the repeat-key 669, Figs. 2 and 3, is depressed before pulling the handle 621. The depression of the repeat-key 669 will move the repeat-key bar 668, and consequently the arm 667, Figs. 4, 5, 62, and 78, which is rigidly secured to said repeat-key bar. The bifurcated end of the arm 667 engages with the pin 665 on the arm 664. This will rotate the collar 661 (see also Fig. 59) on the shaft 659, and on account of the engagement of the recess 662 in the said collar with the rounded projection 663 on the frame 97 the collar will be moved toward the right-hand side of the machine, thus forcing the entire shaft 659 in that direction against the pressure of the spring 660. This will move the rollers 656, Fig. 50, out of engagement with the cams 655, so that the cradle 658 will not be operated to return the sector-stops when the handle is drawn forward. As the pin 672, Figs. 5, 12, and 62, on the arm 673 is held between the repeat-key bar 668 and the L-shaped piece 671, this arm 673 will be forced downward with the repeat-key bar, and hence will operate the rock-shaft 674, to which it is secured. This will swing the arms 675 (see also Fig. 7) forward. As the pins 676 on the arms 675 are in engagement with the slots 332 of the locking-plate 323, this locking-plate will be moved forward to lock all the sector-stops in position—that is, it will pass below the pins 316 of all the sector-stops which have been raised, so that they cannot be returned, and will pass above all the pins 316 of all the sector-stops which have not been raised, so as to hold them down to prevent them from being brought into action. The movement of the repeat-key also draws the link 498 downward, and thus through the arm 497 rocks the shaft 481, Figs. 43 and 44, and thus brings the ends of the teeth of the comb 480 in the path of the half-pin 479 on the detents 472, which have been released, and thus prevent the said detents from again engaging the plates 462 until the repeat-key is released. In consequence of this the hammers which have been brought into operation by the carriage will be operated each time the handle is drawn forward, as hereinafter described. If now the handle 621 is drawn forward, the operation will be the same as has been above described, except that the sector-stops will not be returned, and consequently when the sectors are returned to their normal position they will not be locked, but upon the return of the handle will immediately move back to their previous positions, so that each time the handle is pulled the number will be printed and registered into the machine. Each time the handle is drawn forward while the repeat-key is depressed the inward projection 681, Fig. 62, on the arm 240 passes above the curved guide 680, and thus locks the repeat-key bar down, so that it cannot return until the handle has completed its stroke. This guide is also useful in the ordinary operation of the machine when the repeat-key is not depressed, as the projection 681 then passes below the said guide and prevents the repeat-key from being operated while the handle is out of normal position. When the number has been repeated as many times as desired, minus one, the repeat-key is released, and hence on the next pull of the handle the sector-stops will be moved to their normal position, and the sectors consequently locked in their normal position. The key-bar 668 in its downward movement strikes the inclined face 775 on the movable comb 768 and actuates said comb to lock the keys while the repeat-key is depressed. The mechanism shown in Figs. 19 to 23, inclusive, for counting the number of strokes of the handle 621 is useful in connection with the repeat-key mechanism above described. In using this device in connection with the repeat-key the milled head 265 is drawn out, so that the arm 269 can be moved toward the rear and the arm then rotated toward the rear until the pointer 273 is opposite the figure denoting the number of times it is desired to repeat the number. The arm is then allowed to move in until the detents 279 and 282 come into engagement with the teeth 270 on the segment 269. The movement of the projection 295 out of contact with the arm 305 releases the hook 304. Consequently the said hook moves to the rear under the influence of the spring 306 when the repeat-key is depressed, and thus the notch 684 engages with the pin 682 of the repeat-key bar 668. This will lock the repeat-key bar in its depressed position until the finger 295 again comes in contact with the arm 305 and releases the said repeat-key bar. As the sector 269 is fed forward one notch for each pull of the handle 621, it will be evident that the repeat-key bar will be released as soon as the handle has been pulled the desired number of times. When it is desired to take the sum of the numbers which have been added into the machine, the total-key 732, Fig. 2, is depressed. This through the total-key bar 733 swings the plate 734, Figs. 55, 56, 60, and 61, on the shaft 723. The motion of the plate 734 is communicated through the downwardly-projecting arm 735, link 736, and arm 737 to the rock-shaft 631, to which said arm 737 is rigidly secured. The rock-shaft 631 has secured to it a second arm 778, which is pivotally connected to the upward extension 779 of the locking-bar 780.

The rotation of the shaft 631 thus forces said locking-bar forward, and by means of the cam-block 783 of said bar the movable comb 768 is moved so as to lock all the order and digit keys so that they cannot be operated while the total-key is depressed. The rotation of the shaft 631 also swings the rear section of the machine upon its pivots 537 through the action of the cams 738, Figs. 10 and 67, carried by the said rock-shaft 631. This brings the idle wheels 539 into engagement with the teeth of the type-sectors 335 at the same time the cam-plate 741, Figs. 60 and 61, on the rear of the plate 734 comes in contact with the end of the shaft 574, thus swinging the frame 96 and bringing the adding-wheels 575 into engagement with the idle wheels 539. At the same time the cam-plate 740 comes in contact with the rounded end 579 of the comb 577 and moves said comb so that the teeth 578, Fig. 28, are moved into the path of the teeth 576 on the adding-wheels. At the same time the cam-slot 754, Fig. 56, acts upon the pin 356, thus moving the arm 355, Fig. 34, and consequently the pivots 347, to one of which the aid arm is rigidly secured. This through the plates 346, Figs. 31 and 32, moves the detents 344 so that the fingers 350, carried by said detents, come in contact with the cross-bar 351. This releases all of the type-sectors 335. The type-sectors will now move under the influence of the springs 373 until the teeth 576 of the corresponding adding-wheels come into contact with the teeth of the comb 577, and consequently the type-sectors will be moved into position to print the sum of the various numbers which have been added into the machine. At the same time that the arm 355 above referred to is moved the cam-face 755, Fig. 56, of the plate 734 will act on the pin 549 so as to swing the arm 548, Fig. 34, and consequently rotate the rock-shaft 542, thus bringing the rod 544, Fig. 45, against the tailpiece 545 of the dogs 541 and moving the said dogs out of engagement with the idle wheels 539, so that the said idle wheels will be allowed to move under the influence of the sectors, as has been above described. At the same time the cam-slot 753, Fig. 56, of the plate 734 will act upon the pin 603 and through the arm 602, Fig. 34, rock the shaft 553, Fig. 45, so as to move the dogs 559 into engagement with the teeth of the idle wheels 539, so that when the idle wheels are rotated by the type-sectors the plates 552 will be positioned in the path of the tailpiece 134 of the carriage, so as to position the carriage in the proper order to print the sum. The carriage is released by the movement of the locking-bar 780, Figs. 5 and 62, which has been hereinbefore described. The cam-face 788 of the block 787, carried by the said locking-bar 780, comes in contact with the projecting end 173 (see also Fig. 15) of the U-shaped lever 169, and hence moves said lever on its pivot 170 and through the pin 168 draws the pawls 157 and 158 out of engagement with the rack-bar 166, thus releasing the carriage and allowing it to move toward the left until stopped by the contact of the tailpiece 134 of the carriage with the plates 552, above referred to. When the plate 734 reaches the limit of its movement, the hook 757, Figs. 55 and 56, engages with the finger 385 on the cam-block 384. Upon the return of the plate 734 this hook draws up upon the finger 385, and thus through the cam-block 384 and roller 713 forces the arm 383 forward, thus rotating the rock-shaft 378, and thus moving the arms 379 to bring the angular bar 380 into engagement with the teeth of the type-sectors and holding the type in alinement. When the plate has reached its normal position, the action of the pin 760 on the finger 759 will release the hook 757 from the finger 385. In the meantime, however, the hook 762 on the bar 761 will engage the pin 390 on the arm 383, and thus hold the angular bar 380 in engagement with the teeth of the type-sector after the finger 385 has been released. Upon pulling the handle, however, the disk 712 will be rotated so as to bring the pin 714 into contact with the beveled end of the arm 763, thus releasing the hook 762 from the pin 390 and allowing the angular bar 380 to move out of engagement with the teeth of the type-sectors. The downward movement of the plate 734 also brings the flange 743 of the arm 742 into contact with the inclined projection 652 of the bar 647, thus moving the said bar longitudinally, so as to move the cams 649, Figs. 47 and 71, out of engagement with the rear section of the machine. The notch 744 in the projection 652 engages with said flange 743, so as to hold the arm 742 down after the plate 734 has returned, and consequently this bar 647 is held in this position until the shaft 646 is rotated sufficiently to disengage the projection 652 from the plate 747. The plate 747 is pivoted to the arm 742, so as not to interfere with the return movement of the shaft by contact with the projection 652. When the plate 734 returns to its normal position, the rear section of the machine is allowed to swing so as to bring the idle wheels out of contact with the type-sectors, and consequently when the type-sectors are returned by the pull of the handle the adding-wheels will remain in their normal position, and thus the machine will be brought to zero. In case it is desired to take the sum of the numbers without bringing the machine to zero—that is, to take an impression of the sum or total in the machine and still leave the said total in the machine, so that more numbers can be added thereto—the total-key is depressed in the manner hereinbefore described, and the same operations will take place upon the depression of the key. In place, however, of releasing the key before the handle 621 is drawn forward the key is kept depressed while the handle is operated. This will hold the idle wheels in engagement with the type-sectors and the adding-wheels in engagement with the idle wheels while the sectors are returned by the forward movement of the handle, and consequently the adding-wheels will be moved back into the same position in which they were before the total-key was depressed, and consequently the sum will remain in the machine. In this operation the movement of the roller 570, Fig. 48, relative to the guide 703 is changed, the said roller passing along the inside of said guide during the forward movement of the disk and along the outside of the guide on the return of the disk, so that the adding-wheels may be held in engagement with the idle wheels during the return of the printing-sectors. When the handle is allowed to return, the roller 713 on the disk 712 will come in contact with the hook 749 if the total-key is kept depressed, and this will lock the movement of the parts, so that it will be necessary for the operator to release the total-key before the handle can return to its normal position. The sum may also be exhibited without printing it. In this operation, as in the one above described, the position of the adding-wheels is the same after the operation as before. To exhibit the sum, the total-key is depressed. This causes the various type-sectors to move through a distance proportional to the movement of the corresponding adding-wheels, as hereinbefore described. The sum or total can now be observed on the peripheries of the type-sectors. After the sum has been observed the error-key is depressed, the total-key being still held down. The depression of the error-key returns the type-sectors and carriage to their normal position and also restores the printing-hammer mechanism to its normal position, all as has been hereinbefore described. The idle wheels, however, will be held in mesh with the type-sectors and the adding-wheels with the idle wheels, so that the return of the sectors will restore the adding-wheels to the same position as before the total-key was depressed. The lower edge of the plate 722 also comes in contact with the inclined face of the upward extension 651, Fig. 71, and moves the bar 647 toward the left. This movement of the bar 647 takes place each time the error-key is depressed; but as it has no function in the ordinary operation of the error-key it has not been hereinbefore described. In the above operation, however, the movement of the bar 647 serves to disengage the slot 744, Figs. 60 and 61, from the flange 743 of the arm 742, and consequently when the total-key is released the said arm 742 will return to its normal position instead of being held down, as in the ordinary operation of the total-key. If now the error-key be released, all the parts of the machine will be in the same position as before the total-key was depressed to display the sum.

The paper-carriage is so arranged that the machine may be used not only with the ordinary roll of narrow paper supported on the rod 449, Fig. 1, but may also be used with ordinary letter-heads or other wide sheets of paper. When wide paper is used, the carriage may be moved laterally across the machine by turning one of the milled heads 407, Fig. 38, to move the notch 403 out of engagement with the dog 404. The carriage may then be slid laterally to bring any desired portion of the paper in position to be printed upon by the type. The angular bar 414 maintains engagement with the finger 371 in all positions of the carriage, so that the roll 410 is fed by the action of said finger each time the handle 621 is drawn forward. As the feeding of the paper takes place immediately after printing, the number is at once brought into view above the ends of the printing-sectors. The number can then be seen immediately before printing on the type-sectors, as has been hereinbefore described, and immediately after printing on the paper, thus greatly lessening the liability of error due to carelessness of the operator. The pressure of the friction-disk 430 against the end of the roll 310 prevents the said roll from moving except when fed forward by the feeding mechanism, and hence the distance between the numbers printed upon the paper is kept uniform. The counting device (shown in Figs 19 to 23, inclusive, and hereinbefore described) is useful in connection with the carriage for holding sheets of paper, as it can be set so as to indicate the number of separate amounts which can be contained in the length of the sheet, and hence when the bottom of the sheet is reached it will be indicated by the ringing of the bell 288, which will be caused by the contact of the finger 295 with the end of the lever 291.

Having fully described our invention, what we claim as new, and desire to secure by Letters Patent of the United States, is—

1. In an adding-machine, the combination with adding devices corresponding to the numerical orders, of a series of keys, movable members each actuated by one of said keys, a movable member actuated by all of said keys, and a translating device bringing said adding devices successively within control of both of said movable members.

2. In an adding-machine, the combination with adding devices corresponding to the numerical orders, of a series of keys, cradles each actuated by one of said keys, a cradle actuated by all of said keys, and a translating device bringing said adding devices successively within control of both of said cradles.

3. In an adding-machine, the combination with adding devices corresponding to the numerical orders, of indicating devices for said adding devices, a series of keys, movable members each actuated by one of said keys, a movable member actuated by all of said keys, and a translating device bringing said indicating devices successively within control of both of said movable members.

4. In an adding-machine, the combination with adding devices corresponding to the numerical orders, of a series of keys, a plurality of cradles each actuated by one of said keys, a cradle actuated by all of said keys, and a translating device bringing said adding devices successively within control of both of said cradles.

5. In an adding-machine, the combination with adding devices corresponding to the numerical orders, of a series of keys, a plurality of cradles each actuated by one of said keys, a cradle actuated by all of said keys, a carriage, and movable members mounted in said carriage, each movable member coöperating with a single cradle and successively bringing said adding devices within control of both of said cradles.

6. In an adding-machine, the combination with adding devices corresponding to the numerical orders, of a set of keys, a plurality of cradles provided with cross-bars, a translating device for bringing said adding devices successively within control of said cross-bars, pendent links pivoted to said cradles, cross-bars carried by said links, and means for actuating said latter cross-bars from said keys.

7. In an adding-machine, the combination with adding devices corresponding to the numerical orders, of a series of keys, cradles provided with cross-bars, a translating device for bringing said adding devices successively within control of said cross-bars, pendent links pivoted to said cradles, cross-bars removably carried in said links, and means for actuating said latter cross-bars from said keys.

8. In an adding-machine, the combination with adding devices corresponding to the numerical orders, of a series of keys, supporting devices provided with hooks, cradles pivotally mounted in said hooks, translating devices for successively bringing said adding devices within control of said cradles, pendent links pivoted to said cradles and arranged below said supporting members, whereby the displacement of the cradles is prevented, cross-bars carried by said links, and means for actuating said cross-bars from said keys.

9. In an adding-machine, the combination with adding devices corresponding to the numerical orders, of a series of keys, cradles, a translating device successively bringing said adding devices within control of said cradles, pendent links pivoted to said cradles, cross-bars carried by said links, guides for said cross-bars, and means for operating said cross-bars from said keys.

10. In an adding-machine, the combination with adding devices corresponding to the numerical orders, of a series of keys, cradles, a translating device successively bringing said adding devices within control of said cradles, pendent links carried by said cradles, cross-bars carried by said links, a set of stops on said keys each adapted to coöperate with one of said cross-bars, and a second set of stops each adapted to coöperate with a different cross-bar.

11. In an adding-machine, the combination with adding devices, of a translating device, a series of order-keys controlling said translating device, a set of digit-keys controlling said adding devices, a movable member actuated by the operation of said order-keys, and a locking mechanism operated by the movement of said digit-keys for locking said movable member and thereby said order-keys.

12. In an adding-machine, the combination with adding devices, of a translating device, order-keys controlling said translating device, digit-keys controlling said adding devices, a movable member actuated by said order-keys, a locking device actuated by said digit-keys to lock said movable member, an operating-handle, and means for releasing said locking device by the movement of said handle.

13. In an adding-machine, the combination with adding devices, of digit-keys controlling said adding devices, an operating-handle, a full-stroke device for said handle, reversing means for said full-stroke device, and connections for rendering said reversing means inoperative.

14. In an adding-machine, the combination with adding devices, of digit-keys controlling said adding devices, an operating-handle, a full-stroke device for said handle, reversing means for said full-stroke device, and connections operated by the movement of said digit-keys for rendering said reversing device inoperative.

15. In an adding-machine, the combination with adding devices, of a translating device, order-keys for controlling said translating device, an operating-handle, a lock for said handle, and mechanism operating through the movement of said order-keys for controlling said lock.

16. In an adding-machine, the combination with adding devices, of a translating device, order-keys for controlling said translating device, digit-keys for controlling said adding devices, an operating-handle, a lock for said handle, mechanism controlled by the movement of said order-keys for controlling said lock, and a second mechanism operated by the movement of said digit-keys for controlling said lock.

17. In an adding-machine, the combination with adding devices corresponding to the numerical orders, of a plurality of stops controlling said adding devices, keys for positioning said stops, positive locking means for locking said stops in position, and a repeat-key for actuating said locking means.

18. In an adding-machine, the combination with adding devices corresponding to the numerical orders, of a plurality of stops for controlling said adding devices, keys for positioning said stops, locking devices for said stops, mechanism for returning said stops to normal position, and a repeat-key for operating said locking devices and throwing said mechanism out of operation.

19. In an adding-machine, the combination with adding devices corresponding to the numerical orders, of a plurality of stops controlling said adding devices, keys for positioning said stops, a locking-plate locking said stops in position, and a repeat-key for operating said plate.

20. In an adding-machine, the combination with adding devices corresponding to the numerical orders, of a plurality of stops controlling said adding devices, keys for positioning said stops, a plate for returning said stops to normal position, and a locking-plate carried by said first-named plate and movable relative thereto.

21. In an adding-machine, the combination with adding devices corresponding to the numerical orders, of a plurality of stops controlling said adding devices, keys for positioning said stops, a plate for returning said stops to their normal position, and a locking-plate slidingly mounted on said first-named plate.

22. In an adding-machine, the combination with adding devices corresponding to the numerical orders, of a plurality of stops controlling said adding devices, keys for positioning said stops, and a locking-plate for locking said stops, said locking-plate being provided with means for completely positioning any stop which has been partly positioned.

23. In an adding-machine, the combination with adding devices corresponding to the numerical orders, of a plurality of stops controlling said adding devices, pins carried by said stops, keys for positioning said stops, a locking-plate coöperating with said pins to lock said stops, and inclined tongues carried by said locking-plate for operating on said pins to position any stop which has been partially positioned.

24. In an adding-machine, the combination with adding devices corresponding to the numerical orders, of a plurality of stops controlling said adding devices, pins carried by said stops, keys for positioning said stops, a plate coöperating with said pins to return said stops to their normal position, and a locking-plate carried by said first-named plate and coöperating with said pins to lock said stops in position.

25. In an adding-machine, the combination with adding devices corresponding to the numerical orders, of a plurality of stops controlling said adding devices, pins carried by said stops, keys for positioning said stops, a plate coöperating with said pins to return said stops to their normal position, and a locking-plate slidingly carried by said first-named plate and coöperating with said pins to lock said stops in position.

26. In an adding-machine, the combination with adding devices corresponding to the numerical orders, of a plurality of stops for controlling said adding devices, keys for positioning said stops, and a spring-mounted plate movable in the direction of the length of said stops for returning said stops to their normal position.

27. In an adding-machine, the combination with digit-keys, of printing devices controlled thereby, hammers coöperating with said printing devices, actuating mechanism for said hammers, and an error-key for throwing said actuating mechanism out of operation.

28. In an adding-machine, the combination with digit-keys, of printing devices actuated thereby, hammers for said printing devices, pivotally-mounted plates, hooks carried by said plates and adapted to engage said hammers, and a translating device for positioning said plates to cause the engagement of said hooks and hammers.

29. In an adding-machine, the combination with digit-keys, of printing devices controlled thereby, hammers for said printing devices, pivoted plates, hooks carried by said pivoted plates and adapted to engage with said hammers, a translating device for causing said hooks to engage with said hammers, and an error-key for disengaging said hooks from said hammers.

30. In an adding-machine, the combination with digit-keys, of printing devices controlled thereby, hammers for said printing devices, pivotal plates, hooks mounted on said plates, a translating device for causing the engagement of said hooks and hammers, and an error-key for disengaging said hooks and hammers.

31. In an adding-machine, the combination with digit-keys, of printing devices controlled thereby, hammers for said printing devices, pivoted plates, hooks pivotally carried by said plates and adapted to engage with said hammers, an operating-handle for actuating said plates to operate said hammers, and an error-key for moving said hooks independently of said plates to disengage said hooks and hammers.

32. In an adding-machine, the combination with digit-keys, of printing devices controlled thereby, hammers for said printing devices, pivotal plates carrying hooks adapted to engage said hammers, detents controlling said plates, and a translating device for releasing said detents.

33. In an adding-machine, the combination with digit-keys, of printing devices controlled thereby, hammers for said printing devices, pivotal plates, hooks pivoted on said plates and adapted to engage said hammers, detents controlling said plates, a translating device for releasing said detents, and an error-key for moving said hooks independently of said plates to release said hooks from said hammers.

34. In an adding-machine, the combination with digit-keys, of printing devices controlled thereby, hammers for said printing devices, mechanism for operating said hammers, a translating device for positioning said operating mechanism, and a locking device for locking said mechanism in its operative position.

35. In an adding-machine, the combination with digit-keys, of printing devices controlled thereby, hammers for said printing devices, operating mechanism for said hammers, a translating device for positioning said operating mechanism, a locking device for locking said mechanism in operative position, and a repeat-key controlling said locking device.

36. In an adding-machine, the combination with digit-keys, of printing mechanism controlled thereby, hammers for said printing mechanism, pivotal plates for operating said hammers, detents controlling the position of said plates, and a locking device for said detents.

37. In an adding-machine, the combination with digit-keys, of printing devices controlled thereby, hammers for said printing devices, pivotal plates operating said hammers, detents controlling the position of said plates, a locking device for said detents, and a repeat-key controlling said locking device.

38. In an adding-machine, the combination with digit-keys, of printing devices controlled thereby, hammers for said printing devices, pivotal plates, hooks pivoted on said plates and adapted to actuate said hammers, a member adapted to coöperate with said hooks to release the same from said hammers, and means for actuating said member.

39. In an adding-machine, the combination with digit-keys, of printing devices controlled thereby, hammers for said printing devices, pivotal plates, hooks pivoted on said plates and adapted to actuate said hammers, a movable member adapted to release said hooks from said hammers, and an error-key for actuating said member.

40. In an adding-machine, the combination with digit-keys, of printing devices controlled thereby, hammers for said printing devices, pivotal plates, hooks pivoted on said plates and adapted to actuate said hammers, projections carried by said hooks, a blade adapted to coöperate with said projections and release said hooks from said hammers, and an error-key for actuating said blade.

41. In an adding-machine, the combination with digit-keys, of printing devices controlled thereby, hammers for said printing devices, pivotal plates, hooks pivoted to said plates and adapted to actuate said hammers, projections carried by said hooks, a blade for coöperating with said projections to release said hooks from said hammers, an error-key, a sliding member actuated by said error-key, and a pivotal finger carried by said sliding member and adapted to operate said blade.

42. In an adding-machine, the combination with digit-keys, of printing devices controlled thereby, hammers for said printing devices, pivotal plates, hooks carried by said plates and adapted to actuate said hammers, an error-key, mechanism operated by said error-key for moving said hooks independently of said plates to release said hooks and hammers, and mechanism also operated by said error-key for returning said plates to their normal position.

43. In an adding-machine, the combination with digit-keys, of printing devices controlled thereby, detents for said printing devices, an error-key, and connections operated by said error-key for releasing said detents.

44. In an adding-machine, the combination with adding devices, of pivotal members controlling said adding devices, digit-keys controlling said pivotal members, a total-key, and an alining device for said pivotal members operated by said total-key.

45. In an adding-machine, the combination with adding devices, of printing-sectors provided with teeth for engaging said adding devices, digit-keys controlling said printing-sectors, an alining device engaging with the teeth of said sectors to aline the printing, and a total-key for operating said alining device.

46. In an adding-machine, the combination with printing-sectors, of pivoted hooks engaging directly with said printing-sectors, stops for individually releasing said hooks, digit-keys for operating said stops, and a total-key for simultaneously releasing all of said hooks.

47. In an adding-machine, the combination with printing-sectors, of a pivotally-mounted shaft, hooks pivoted on said shaft, means for individually swinging said hooks on said shaft and releasing the sectors, and means for swinging said shaft to release all of said sectors.

48. In an adding-machine, the combination with printing-sectors, of a pivotally-mounted shaft, hooks pivoted on said shaft and engaging said sectors, an abutment, projections carried by said hooks, digit-keys for individually swinging said hooks on said shaft and releasing said sectors, and a total-key for swinging said shaft to bring said projections in engagement with said abutment and release all of said sectors.

49. In an adding-machine, the combination with a plurality of toothed members corresponding to the numerical orders, of idle wheels and carrying devices immovable toward and away from each other but movable toward and away from said toothed members, and adding-wheels movable relatively to said idle wheels and carrying devices.

50. In an adding-machine, the combination with a plurality of pivoted toothed members corresponding to the numerical orders, of idle wheels and carrying devices immovable toward and away from each other but movable toward and away from said pivoted toothed members, and adding-wheels movable relatively to said idle wheels and carrying devices.

51. In an adding-machine, the combination with a plurality of toothed printing-sectors, of idle wheels and carrying devices immovable toward and away from each other but movable toward and away from said printing-sectors, and adding-wheels movable relatively to said idle wheels and carrying devices.

52. In an adding-machine, the combination with a plurality of toothed members corresponding to the numerical orders, of a movable frame, idle wheels and carrying devices carried by said frame, a second frame carried by said first-named frame, and adding-wheels carried by said second frame and movable relatively to said idle wheels and carrying devices.

53. In an adding-machine, the combination with a plurality of pivoted toothed members corresponding to the numerical orders, of a movable frame, idle wheels and carrying devices carried by said frame, a second frame carried by said first-named frame, and adding-wheels carried by said second frame and movable relatively to said idle wheels and carrying devices.

54. In an adding-machine, the combination with a plurality of toothed printing-sectors, of a movable frame, idle wheels and carrying devices carried by said frame, a second frame carried by said first-named frame, and adding-wheels carried by said second frame and movable relatively to said idle wheels and carrying devices.

55. In an adding-machine, the combination with a plurality of toothed members corresponding to the numerical orders, of a pivoted frame, idle wheels and carrrying devices carried by said frame, a second frame movably carried by said first-named frame, and adding-wheels carried by said second frame and movable relatively to said idle wheels and carrying devices.

56. In an adding-machine, the combination with a plurality of pivoted toothed members corresponding to the numerical orders, of a pivoted frame, idle wheels and carrying devices carried by said frame, a second movable frame carried by said first-named frame, and adding-wheels carried by said second frame and movable relatively to said idle wheels and carrying devices.

57. In an adding-machine, the combination with a plurality of toothed printing-sectors, of a pivoted frame, idle wheels and carrying devices carried by said frame, a second movable frame carried by said first-named frame, and adding-wheels carried by said second-named frame and movable relatively to said idle wheels and carrying devices.

58. In an adding-machine, the combination with a plurality of toothed members corresponding to the numerical orders, of a pivoted frame, idle wheels and carrying devices carried by said frame, a second frame pivoted to said first-named frame, and adding-wheels carried by said second-named frame.

59. In an adding-machine, the combination with a plurality of pivoted toothed members, of a pivoted frame, idle wheels and carrying devices carried by said frame, a second frame pivoted to said first-named frame, and adding-wheels carried by said second frame.

60. In an adding-machine, the combination with a plurality of toothed printing-sectors, of a pivoted frame, idle wheels and carrying devices carried by said frame, a second frame pivoted to said first-named frame, and adding-wheels carried by said second-named frame.

61. In an adding-machine, the combination with a plurality of toothed members corresponding to the numerical orders, of digit-keys controlling said toothed members, a movable frame, idle wheels carried by said frame, carrying mechanism also carried by said frame, and adding mechanism normally in engagement with said carrying mechanism, and means for moving said adding mechanism into engagement with said idle wheels.

62. In an adding-machine, the combination with a plurality of toothed members corresponding to the numerical orders, of digit-keys controlling said toothed members, a movable frame, idle wheels carried by said frame and normally out of engagement with said toothed members, adding mechanism also carried by said frame, a second movable frame, adding-wheels carried by said movable frame and means for moving said adding-wheels out of engagement with said carrying mechanism into engagement with said idle wheels.

63. In an adding-machine, the combination with a plurality of toothed members corresponding to the numerical orders, of digit-keys controlling said toothed members, idle wheels normally out of engagement with said toothed members, adding-wheels operated by said idle wheels, a total-key, and connections operated by said total-key for moving said idle wheels into engagement with said toothed members.

64. In an adding-machine, the combination with a plurality of toothed members corresponding to the numerical orders, of digit-keys controlling said toothed members, a movable frame, idle wheels carried by said frame and normally out of engagement with toothed members, adding mechanism also carried by said frame, a second movable frame, adding-wheels carried by said second frame, an operating-handle, connections operated by said handle for moving said first-named frame to bring said idle wheels into engagement with said toothed members, and means also operated from said handle for moving said adding-wheels into engagement with said idle wheels.

65. In an adding-machine, the combination with a plurality of toothed members corresponding to the numerical orders, of digit-keys controlling said toothed members, a pivotal frame, idle wheels carried by said frame and normally out of engagement with said toothed members, carrying mechanism also carried by said frame, a second pivotal frame, adding-wheels carried by said frame and normally in engagement with said adding mechanism, means for moving said idle wheels into engagement with said toothed members, and means for moving said adding-wheels into engagement with said idle wheels and out of engagement with said carrying mechanism.

66. In an adding-machine, the combination with a plurality of toothed members corresponding to the numerical orders, of digit-keys controlling said toothed members, a pivotal frame, idle wheels carried by said frame and normally out of engagement with toothed members, carrying mechanism also carried by said frame, a second pivotal frame, adding-wheels carried by said second frame and normally in engagement with said carrying devices, an operating-handle, means actuated by said handle for moving said idle wheels into engagement with said toothed members, and mechanism also operated by said handle for moving said adding-wheels into engagement with said idle wheels.

67. In an adding-machine, the combination with a plurality of toothed members corresponding to the numerical orders, of digit-keys controlling said toothed members, a movable frame, idle wheels carried by said frame and normally out of engagement with said toothed members, carrying mechanism also carried by said frame, adding-wheels normally in engagement with said carrying mechanism, a total-key, and connections operated by said total-key for moving said idle wheels into engagement with said toothed members and said adding-wheels into engagement with said idle wheels.

68. In an adding-machine, the combination with a plurality of toothed members corresponding to the numerical orders, of digit-keys controlling said toothed members, a movable frame carrying idle wheels adapted to be brought into communication with said toothed members, a second pivotal frame carrying adding-wheels adapted to be brought into communication with said idle wheels, means for simultaneously swinging said frames, and means for returning said toothed members to actuate said adding-wheels.

69. In an adding-machine, the combination with a plurality of toothed members corresponding to the numerical orders, of digit-keys for limiting the movement of said toothed members, a frame carrying idle wheels adapted to be brought into communication with said toothed members, a second frame carrying adding-wheels adapted to be brought into communication with said idle wheels, means for moving said frames to connect said wheels and toothed members, and means for releasing said toothed members.

70. In an adding-machine, the combination with a plurality of toothed members corresponding to the numerical orders, of digit-keys for limiting the movement of said toothed members, a movable frame carrying idle wheels, mechanism for moving said frame to bring said idle wheels into communication with said toothed members, an operating-handle for operating said mechanism, a total-key, and connections operated by said total-key for throwing said mechanism out of operation.

71. In an adding-machine, the combination with a plurality of toothed members corresponding to the numerical orders, of digit-keys for limiting the movement of said toothed members, a movable frame carrying idle wheels adapted to be brought into mesh with said toothed members, a second frame carrying adding-wheels adapted to be brought into communication with said idle wheels, an operating-shaft, mechanism for moving said first-named frame and operated by said shaft, said mechanism also moving said second frame to hold said adding-wheels and idle wheels in mesh.

72. In an adding-machine, the combination with a plurality of toothed members corresponding to the numerical orders, of digit-keys controlling said toothed members, adding-wheels normally out of operative connection with said toothed members, a non-rotatable stop for said adding-wheels normally out of the path thereof, means for moving said adding-wheels into operative engagement with said toothed members, and means for moving said stop into the path of said adding-wheels.

73. In an adding-machine, the combination with a plurality of toothed members corresponding to the numerical orders, of digit-keys controlling said toothed members, adding-wheels normally out of operative connection with said toothed members, a non-rotatable stop for said adding-wheels normally out of the path thereof, a total-key, connections operated by said total-key for bringing said adding-wheels into operative connection with said toothed members, and connections also operated by said total-key for moving said stop into the path of said adding-wheels.

74. In an adding-machine, the combination with a plurality of toothed members corresponding to the numerical orders, of digit-keys controlling said toothed members, idle wheels normally out of engagement with said toothed members, adding-wheels normally out of engagement with said idle wheels, a non-rotatable stop for said adding-wheels normally out of the path thereof, means for moving said idle wheels into engagement with said toothed members, means for moving said adding-wheels into engagement with said idle wheels, and means for moving said stop into the path of said adding-wheels.

75. In an adding-machine, the combination with a plurality of toothed members corresponding to the numerical orders, of digit-keys controlling said toothed members, idle wheels normally out of engagement with said toothed members, adding-wheels normally out of engagement with said idle wheels, a non-rotatable stop for said adding-wheels normally out of the path thereof, a total-key, connections operated by said total-key for moving said idle wheels into engagement with said toothed members, connections operated by said total-key for moving said adding-wheels into engagement with said idle wheels, and means also operated by said total-key for moving said stop into the path of said adding-wheels.

76. In an adding-machine, the combination with indicating devices corresponding to the numerical orders, of digit-keys controlling said indicating devices, adding devices, a total-key for transferring the sum from said adding devices to said indicating devices, and an error-key for retransferring the sum from said indicating devices to said adding devices.

77. In an adding-machine, the combination with a plurality of indicating devices corresponding to the numerical orders, of digit-keys controlling said indicating devices, adding devices, a rotary member for bringing said adding devices into connection with said indicating devices, a total-key, and connections operated by said total-key for throwing said rotary member out of operation.

78. In an adding-machine, the combination with a plurality of indicating devices corresponding to the numerical orders, of digit-keys controlling said indicating devices, adding devices, a member bringing said adding devices into connection with said indicating devices, an operating-handle for actuating said member, a total-key, and connections operated by said total-key to shift said member and render it inoperative.

79. In an adding-machine, the combination with a plurality of indicating devices corresponding to the numerical orders, of digit-keys controlling said toothed members, adding devices, a rotary member for bringing said adding devices into connection with said indicating devices, an operating-handle for operating said rotary member, a member movable longitudinally of said rotary member, a total-key, and means carried by said total-key for actuating said longitudinally-movable member.

80. In an adding-machine, the combination with a plurality of indicating devices corresponding to the numerical orders, of digit-keys controlling said indicating devices, adding devices, a rotary member, actuating mechanism carried by said rotary member for bringing said adding devices into connection with said indicating devices, an operating-handle for actuating said adding devices, and a total-key for throwing said operating connections out of action.

81. In an adding-machine, the combination with a plurality of indicating devices corresponding to the numerical orders, of digit-keys controlling said indicating devices, adding devices, an operating-handle, operating connections actuated by said handle for throwing said adding devices into connection with said indicating devices, a second set of operating connections, and a total-key for actuating said second set of connections and throwing first set of connections out of action.

82. In an adding-machine, the combination with a plurality of indicating devices, corresponding to the numerical orders, of digit-keys controlling said indicating devices, a movable frame, adding devices carried by said frame, a rotary member, a cam on said rotary member for moving said frame to bring said adding devices into connection with said indicating devices, and means for moving said cam out of operation.

83. In an adding-machine, the combination with a plurality of indicating devices corresponding to the numerical orders, of digit-keys controlling said indicating devices, a movable frame, adding devices carried by said frame, a rotary member for moving said frame to bring said adding devices into connection with said indicating devices, an operating-handle for actuating said rotary member, and a total-key for throwing said rotary member out of operative connection with said frame.

84. In an adding-machine, the combination with a plurality of indicating devices corresponding to the numerical orders, of digit-keys controlling said indicating devices, a movable frame, adding devices carried by said frame, a rotary member, an operating-handle actuating said rotary member, a cam carried by said rotary member and coöperating with said frame, said cam being movable longitudinally of said rotary member, and means for moving said cam longitudinally of said member to disengage said cam from said frame.

85. In an adding-machine, the combination with a plurality of indicating devices corresponding to the numerical orders, of digit-keys controlling said indicating devices, a pivotal frame, adding mechanism carried by said frame, a rotary member, a cam carried by said rotary member and coöperating with said frame to move said adding devices into operative connection with said indicating devices, an operating-handle for actuating said rotary member, a second rotary member also coöperating with said frame to move said adding devices into connection with said indicating devices, a total-key, operating connections actuated by said total-key for operating said second rotary member, and operating connections also actuated by said total-key for moving said first rotary member out of operation.

86. In an adding-machine, the combination with a plurality of indicating devices corresponding to the numerical orders, of digit-keys controlling said indicating devices, adding mechanism, operating devices for moving said adding mechanism into connection with said indicating devices, mechanism for throwing said devices out of operation, a total-key for actuating said connections, and an error-key also actuating said connections.

87. In an adding-machine, the combination with a plurality of indicating devices corresponding to the numerical orders, of digit-keys controlling said indicating devices, adding devices, a rotary member, a cam carried by said rotary member for moving said adding devices into engagement with said indicating devices, a total-key, connections operated by said total-key for throwing said cam out of operation, an error-key, and connections operated by said error-key for throwing said cam out of operation.

88. In an adding-machine, the combination with a plurality of indicating devices corresponding to the numerical orders, of adding devices, a total-key, operating connections actuated by said total-key for moving said adding devices into engagement with said indicating devices, and operating connections also actuated by said total-key for releasing said indicating devices.

89. In an adding-machine, the combination with a plurality of indicating devices corresponding to the numerical orders, of adding devices, a total-key, means operated by said total-key for moving said adding devices into engagement with said indicating devices, operating connections also operated by said total-key for releasing said indicating devices, a locking device for said adding devices, and means operated by the return of said total-key for releasing said locking device.

90. In an adding-machine, the combination with a plurality of indicating devices corresponding to the numerical orders, of adding devices, a total-key, means operated by said total-key for moving said adding devices into engagement with said indicating devices, and a pivoted detent controlled by said total-key for holding said adding devices into engagement with said indicating devices.

91. In an adding-machine, the combination with a plurality of indicating devices corresponding to the numerical orders, of adding devices, a total-key, means operated by said total-key for moving said adding devices into engagement with said indicating devices, a pivoted hook for engaging with said adding devices to hold the same in engagement, and a projection carried by said hook and extending in the path of said total-key.

92. In an adding-machine, the combination with a plurality of indicating devices corresponding to the numerical orders, of adding devices, a total-key, a cam carried by said total-key for moving said adding devices into engagement with said indicating devices, a locking device for said adding devices, and means operated by the return of said total-key for releasing said locking device.

93. In an adding-machine, the combination with a plurality of indicating devices corresponding to the numerical orders, of a movable frame carrying idle wheels, a second movable frame carrying adding-wheels, a total-key, connections operated by said total-key to move the said first-named frame to connect said idle wheels and indicating devices, means also operated by said total-key to connect said adding-wheels and idle wheels, a detent engaging said second frame, and means operated by the return of said total-key for releasing said detent.

94. In an adding-machine, the combination with a plurality of indicating devices corresponding to the numerical orders, of adding devices actuated by said indicating devices, a total-key, connections operated by said total-key for bringing said adding device into engagement with said indicating devices, an operating-handle, and a locking device operated by the movement of said total-key for preventing the return of said handle.

95. In an adding-machine, the combination with a plurality of indicating devices corresponding to the numerical orders, of adding devices actuated by said indicating devices, a total-key, mechanism operated by said total-key for bringing said adding devices into engagement with said indicating devices, an operating-handle, a locking device operated by the movement of said total-key for preventing the return of said handle, and mechanism operated by the release of said total-key for disengaging said locking device.

96. In an adding-machine, the combination with a plurality of indicating devices corresponding to the numerical orders, of adding devices actuated by said indicating devices, a total-key, mechanism operated by said total-key for bringing said adding devices into engagement with said indicating devices, an operating-handle, a rotary member actuated by said handle, a detent, and connections between said detent and total-key for moving the former into the path of said rotary member.

97. In an adding-machine, the combination with a plurality of indicating devices corresponding to the numerical orders, of adding devices actuated by said indicating devices, a total-key mechanism operated by said total-key for bringing said adding devices into engagement with said indicating devices, an operating-handle, a rotary member actuated by said handle, a detent, and yielding connections between said detent and total-key for moving the former into the path of said rotary member.

98. In an adding-machine, the combination with a plurality of indicating devices corresponding to the numerical orders, of digit-keys controlling said indicating devices, means for returning said indicating devices, an operating-handle, and a slotted link communicating the movement of said handle to said returning means.

99. In an adding-machine, the combination with a plurality of indicating devices corresponding to the numerical orders, of digit-keys controlling said indicating devices, means for returning said indicating devices, an operating-handle, a rotary member actuated by said handle, and a slotted link connecting said rotary member and returning means.

100. In an adding-machine, the combination with a plurality of indicating devices corresponding to the numerical orders, of digit-keys controlling said indicating devices, means for returning said indicating devices, and locking devices for said returning means.

101. In an adding-machine, the combination with a plurality of indicating devices corresponding to the numerical orders, of digit-keys controlling said indicating devices, means for returning said indicating devices, an operative handle, connection between said handle and returning means, a locking device for said returning means, and connections between said handle and locking device.

102. In an adding-machine the combination, with a plurality of indicating devices corresponding to the numerical orders, of digit-keys controlling said indicating devices, means for returning said indicating devices, an operating-handle, a rotary member actuated by said handle, a slotted link connecting said rotary member and returning means, a locking device for said returning means, and a cam carried by said rotary member for actuating said locking device.

103. In an adding-machine, the combination with a plurality of indicating devices corresponding to the numerical orders, of digit-keys controlling said indicating devices, means for returning said indicating devices, an operating-handle, connections bringing said handle into operative connection with said returning device both on the forward stroke and on the return of said handle, and means for locking said returning device.

104. In an adding-machine, the combination with a plurality of indicating devices corresponding to the numerical orders, of digit-keys controlling said indicating devices, means for returning said indicating devices, an operating-handle, a rotary member actuated by said handle, a slotted link operatively connecting said rotary member with said returning means both on the forward stroke and the return of said handle, a locking device for said returning means, and a cam carried by said rotary member for operating said locking devices.

105. In an adding-machine, the combination with a plurality of indicating devices corresponding to the numerical orders, of digit-keys controlling said indicating devices, means for returning said indicating devices, an operating-handle, and a locking device for said returning means operative upon the forward movement of said handle, said locking devices being inoperative upon the return of said handle.

106. In an adding-machine, the combination with a plurality of indicating devices corresponding to the numerical orders, of digit-keys controlling said indicating devices, means for returning said indicating devices, locking devices for said returning means, an operating-handle, a rotary member actuated by said handle, and a cam carried by said rotary member and operating said locking devices during the forward movement of said handle, said cam being inoperative upon the return of the handle.

107. In an adding-machine, the combination with a plurality of indicating devices corresponding to the numerical orders, of digit-keys controlling said indicating devices, means for returning said indicating devices, an operating-handle, a rotary member actuated by said handle, a slotted link operatively connecting said rotary member with said returning means both on the forward stroke and the return of the handle, a locking device for said returning means, and a cam carried by said rotary member and actuating said locking device during the forward movement of the handle, said cam being inoperative upon the return of the said handle.

108. In an adding-machine, the combination with a plurality of indicating devices corresponding to the numerical orders, of keys controlling said indicating devices, a repeat-key, and a locking device operated by said repeat-key lor locking said first-named keys against movement.

109. In an adding-machine, the combination with a plurality of indicating devices corresponding to the numerical orders, of operating-keys controlling said indicating devices, a comb locking said operating-keys, a repeat-key, means operated by said repeat-key for actuating said comb, a total-key, means actuated by said total-key for actuating said comb, an operating-handle, and connections operated by said handle for operating said comb.

110. In an adding-machine, the combination with a plurality of adding devices, of operating-keys controlling said adding devices, locking devices coöperating with said keys, and means operated by the depression of one of said keys for moving the locking devices on one side thereof in one direction and the locking devices on the other side thereof in the other direction to lock all the remaining keys.

111. In an adding-machine, the combination with a plurality of indicating devices corresponding to the numerical orders, of operating-keys controlling said indicating devices, locking devices coöperating with said keys, and means operated by the depression of one of said keys for moving the locking devices on one side thereof in one direction and the locking devices on the other side thereof in the other direction to lock all the remaining keys.

112. In an adding-machine, the combination with a plurality of indicating devices corresponding to the numerical orders, of operating-keys for said indicating devices, locking devices for said keys consisting of a plurality of sets of connected plates, projections carried by said sets and interlocking, and means carried by said keys for moving said plates.

113. In an adding-machine, the combination with a plurality of indicating devices corresponding to the numerical orders, of operating-keys therefor, a plurality of sets of connected plates, interlocking devices between said sets, inclined faces carried by said plates, and pins carried by said keys for engaging with said inclined faces.

114. In an adding-machine, the combination with adding devices, of operating-keys for said adding devices, locking-plates arranged between said keys and interlocking connections between said plates, whereby the depression of two keys at the same time is prevented.

115. In an indicating device for adding-machines, the combination with a toothed segment, of feeding-dogs coöperating with said segment, a track adjacent to said toothed segment, and means for moving said segment to bring said dogs into engagement with said track.

116. In an indicating device for adding-machines, the combination with a toothed segment yielding laterally, of an indicator adjacent to said toothed member, a pointer carried by said toothed member, feeding-dogs normally in engagement with said toothed member, and means for disengaging said dogs by the lateral movement of said segment.

117. In an indicating device for adding-machines, the combination with a member movable step by step, of an arm in the path of said member, a hammer pivoted to said arm, a bell adapted to be struck by said hammer, connections between said arm and hammer for moving the latter, and means for throwing said connections out of operation.

118. In an indicating device for adding-machines, the combination with a member movable step by step, of an arm in the path of said member, a second arm pivoted to said first-named arm, a dog pivoted to said second-named arm and engaging with said first-named arm, means for releasing said dog, a hammer carried by said second arm, and a bell adapted to be struck by said hammer.

119. In an adding-machine, the combination with adding mechanism, of printing devices therefor, a platen coöperating with said printing devices, a feed-dog for said platen, an arm connected with said feed-dog, an adjustable block in said arm, a rock-shaft, a link connecting said adjustable block and rock-shaft, and means for actuating said rock-shaft from said adding mechanism.

In testimony whereof we have hereunto set our hands in the presence of the two subscribing witnesses.

GEORGE N. HINCHMAN.
HENRY SCHROEDER.

Witnesses:
W. A. ALEXANDER,
D. C. BETJEMAN.